(12) United States Patent
Sakakura et al.

(10) Patent No.: US 6,867,768 B2
(45) Date of Patent: Mar. 15, 2005

(54) THREE-DIMENSIONAL VIRTUAL ASSEMBLING METHOD, COMPUTER PROGRAM AND SYSTEM, WIRING HARNESS DESIGNING METHOD, COMPUTER PROGRAM AND SYSTEM

(75) Inventors: Kouichi Sakakura, Yokkaichi (JP); Masahiro Imai, Yokkaichi (JP); Tsutomu Nakamura, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 92 days.

(21) Appl. No.: 10/171,244

(22) Filed: Jun. 13, 2002

(65) Prior Publication Data

US 2003/0020711 A1 Jan. 30, 2003

(30) Foreign Application Priority Data

| Jun. 13, 2001 | (JP) | 2001-178980 |
| Jul. 9, 2001 | (JP) | 2001-208233 |
| Oct. 29, 2001 | (JP) | 2001-330851 |
| Nov. 7, 2001 | (JP) | 2001-341509 |
| Nov. 7, 2001 | (JP) | 2001-341629 |
| Nov. 14, 2001 | (JP) | 2001-348580 |

(51) Int. Cl.[7] .............................................. G06T 15/00
(52) U.S. Cl. ............................................................ 345/419
(58) Field of Search ....................... 345/419, 420, 345/421, 427, 619, 629

(56) References Cited

U.S. PATENT DOCUMENTS

| 5,138,698 A | * | 8/1992 | Aldrich et al. ............... 345/427 |
| 5,771,043 A | * | 6/1998 | Nigawara et al. ............. 345/419 |
| 6,041,171 A | * | 3/2000 | Blaisdell et al. .............. 703/6 |
| 6,226,560 B1 | * | 5/2001 | Hama et al. ................... 700/97 |
| 6,457,165 B1 | | 9/2002 | Ishikawa et al. .............. 716/12 |
| 6,596,942 B2 | * | 7/2003 | Ito et al. ..................... 174/72 A |

FOREIGN PATENT DOCUMENTS

EP          0 304 864          3/1989

OTHER PUBLICATIONS

Alibozek Tim: "Smart software builds a better harness" Machine Design Penton Publ Inc, Cleveland, OH, USA, vol. 70, No. 8, (May 7, 1988), pp. 89–92, XP001092826.

Hergenrother E et al: "Installation and manipulation of a cable harness in virtual environments" Proceeding of the Iasted International Conference Robotics and Manufacturing, Proceedings of Iasted International Conference on Robotics and Manufacturing (RM 2001, Cancun, Mexico, May 21–24, 2001, pp. 240–244, XP 001131961 2001, Calgary, Alta., Canada, Iasted/Acta Press, Canada ISBN: 0–88986–281–8.

* cited by examiner

*Primary Examiner*—Phu K. Nguyen
(74) *Attorney, Agent, or Firm*—Gerald E. Hespos; Anthony J. Casella

(57) ABSTRACT

A curved state and other states of a wiring harness are displayed by dividing wires into wire segments and applying a polygon processing, and are compared with a 3D shape of the wiring harness represented by a reference layout data displayed as a background image. As compared to a case where a trial product is produced, an operation efficiency can be considerably improved.

12 Claims, 45 Drawing Sheets

| 3D Virtual Image | 3D Design Data |
|---|---|
| NO. 1 | "Z1" |
| NO. 2 | "Z2" |
| ⋮ | ⋮ |
| NO. n | "Zn" |

THREE-DIMENSIONAL VIRTUAL ASSEMBLING METHOD, COMPUTER PROGRAM AND SYSTEM, WIRING HARNESS DESIGNING METHOD, COMPUTER PROGRAM AND SYSTEM

BACKGROUND OF THE INVENTION

1. Field of the Invention

The invention relates to a three-dimensional (3D) virtual assembling method, and a computer program and system for displaying 3D design data of a wiring harness in a virtual 3D space based on inputted data. The invention also relates to a wiring harness designing method, and to a computer program and system for designing a wiring harness by displaying three-dimensional (3D) design data of the wiring harness in a virtual 3D space.

2. Description of the Related Art

Wiring harnesses are used as electric wiring in automotive vehicles and electric appliances. A wiring harness is produced by first making a 3D wiring design of the wiring harness based on mount positions of various parts in the automotive vehicle, electrical appliance or like wire layout object. The wiring harness then is drafted on a two-dimensional (2D) drawing sheet based on the result of the 3D wiring design. FIG. 14 shows a typical assembly board 1 for assembling the wiring harness. Supporting jigs 2 are mounted at selected locations on the assembly board 1 based on the 2D drawing of the wiring harness. Wires then are supported on the jigs 2 and are bundled with resin tape or the like to produce a wiring harness 3.

The wiring harness design typically is evaluated by generating 2D drawings of the wiring harness and the vehicle or appliance for which the wiring harness is being designed. These 2D drawings typically are made by a design assisting system, such as a CAD. A designer checks the drawings and points out problems. The acceptability of this method varies widely depending on the skill of the designer and it is difficult to establish a uniform standards.

Alternatively, a trial wiring harness 3 is produced and is actually laid in an automotive vehicle, electric appliance or other such wire layout object 4, as shown in FIG. 15. The acceptability of the wiring harness is investigated by checking whether the trial wiring harness 3 can be laid properly in the wire layout object 4 so that connectors 5 and wires are in proper locations.

This latter method points out the three-dimensional problems. However, a wiring harness assembling process generally depends mostly on manual operations. Accordingly, the production of the trial product is a labor-intensive operation and requires huge expenditures of labor and time.

A conventional development method for a wiring harness is shown in the flow chart of FIG. 23, and includes drafting a preliminary drawing in Step T1 based on a summary of an object in which a wiring harness is to be used. Design and development operations then are performed in Step T2.

Trial products are produced at Step T3 based on the design developed in Step T2. The production of trial products in Step T3 requires jigs 2 and other parts for the actual wiring harness to be arranged on an assembling table, as shown in FIG. 14. A skilled worker or a research engineer then assembles an actual wiring harness 3 as a trial product.

The design developed in Step T2 and the trial product produced in Step T3 are assessed based on several factors, including: an error in certain design rules for the wiring harness 3, such as insufficient dimensions or exertion of an unnatural load at a mount angle; the possibility of human errors; the presence of a mutual hardware interference for the jigs 2; and difficulties during the assembling operation. Factors that adversely affect productivity and/or quality are pointed out, and plans that could remove such adverse factors are studied. The results of the trial product investigation eventually are reflected on the content of the trial product design. Trial products usually are produced several times in Step T3. A production preparation stage (Step T4) and a mass production stage (Step T5) eventually are entered.

Research engineers play a key role at the trial production stage of a wiring harness in an effort to design improved operation steps for the subsequent mass production stage. Actual trial products are produced and trial product operations are inspected in an effort to improve the assembly of the wiring harness by human hands. Operations that are difficult and/or that have low operability are addressed early in the trial production stage in an effort to develop an improvement plan that will obtain high productivity at the mass production stage. The improvement plan frequently is associated with an improved design of the wiring harness, and the improvement plan is drafted with a view to giving improvement feedback to the design at an early stage.

The preparation for the trial production is illustrated in the flow chart of FIG. 46. In particular, a wiring harness is designed in Step S201 and research engineers draft a full-size drawing in Step S202. The research engineers produce and study production planning information in Step S203, such as: an initial schedule and the number of harnesses that will be produced; factory information, including the type of existing facilities, manufacturing system standards and producing abilities at factory facilities. This step is carried out while looking at the full-size drawing. Thereafter, separate designing of first subassemblies is drafted in Step S204, and a specific mass production line is designed in Step S205.

As shown in FIG. 47, the subassemblies (subassemblies 1, 2, . . . n in FIG. 48) designed in Step S204 are intermediate products produced at an intermediate stage as small-size components of a wiring harness 2 (final harness product in FIG. 48). The subassemblies 1 normally are designed for sections of automotive vehicles, such as engines and doors. The final product of the wiring harness 2 is an assembly of these subassemblies 1 and is an aggregate of many kinds of parts 3, including, wires (e.g. 100 to 150 wires) and covering parts (e.g. dozens to several hundred covering parts) such as protectors, covers and tapes. The wires and the covering parts are cut and connected, as indicated schematically by the numeral 4. The parts 3 are assembled most efficiently by first producing small-size minor subassemblies 1 with machines 5 or by assembling by human hands 6. The subassemblies 1 are arranged and combined successively on a harness assembling table. Wires 7 and parts 8 that are not included in the subassemblies 1 in FIGS. 47 and 48 are independent parts 9 that are connected independently and separately from the subassemblies 1 to form the final wiring harness 2.

A procedure for the separate designing of the subassembly in Step S204 is shown in FIG. 49. In particular, harness design information is obtained in Step S211 from a production designing system (HIS) as a software program of a computer. Wires and connectors for the wiring harness are outputted and are converted into a matrix table as shown in FIG. 50 based on the harness design information in Step S212. Forms, such as a subassembly 1a in FIG. 51A and a subassembly 1b in FIG. 51B (Step S213), are grouped and sampled repeatedly while the outputted matrix table is observed. The separate operations are repeated to optimize matters, such as: whether the subassemblies have sizes easy to handle by workers; whether a terminal insertion rate is at maximum; and whether the wire laying operation can be performed smoothly. The division of the subassemblies is completed when these operations are ended. However, the designing of the subassemblies (Step S204) using the matrix table (see Step S212) is performed on paper, and the result of the designing needs to be verified using an actual product.

When the separate designing of the subassemblies of Step S204 is completed (Step S214 in FIG. 49), the parts 3 actually are prepared as shown in FIG. 47 and the subassemblies 1 actually are produced. Further, a harness assembling table to assemble an actual wiring harness is manufactured in accordance with the contents of the full-size design (see Step S202 in FIG. 46) to investigate an assembling operation.

An order of using the respective subassemblies 1 and an assembling procedure on the harness assembling table are determined beforehand in accordance with industrial engineering theory. A research engineer then performs an assembly operation in accordance with the assembling procedure. Operability is inspected and improved, with great importance placed on matters to be investigated in terms of a wire laying operability and an operation procedure as listed in TABLE-1 below.

TABLE 1

| MATTERS TO BE INVESTIGATED | CONFIRMATION POINTS | REMEDIES |
| --- | --- | --- |
| Wire Laying Operability | Any unnecessary operation when an operator handles subassemlies? | Make subassemblies smaller or change the forms thereof to increase a first insertion rate |
| | Subassemblies can be smoothly laid in one direction (from left side to right side on board)? operations? | Correct the designs of the subassemblies to conform to a layout of the board |
| | Many overlapping wire laying operations? | Reconsider and optimize the forms of all the subassemblies |
| Operation procedure | Any unnecessary operation between operation steps? | Reconsider and change the operation procedure |

Confirmation points concerning the wire laying operability include: whether there is any unnecessary operation while a worker is handling the subassemblies 1; whether the wires can be laid in one direction, i.e. from left to right on the harness assembling table; and whether there are many overlapping wire laying operations. Further, investigation is made as to whether there is any unnecessary operation between the operation steps. Remedies for the identified problems shown in the column of "Remedies" in TABLE-1 are studied.

Improved operability can be made by repeatedly producing actual trial products. The remedies proposed at this time include those related to the divided forms of the subassemblies and those accompanied by design changes. A design change plan is put into shape immediately and feedback is given to the design department for improvements.

The aforementioned process is carried out to prepare a production environment for actual products. The actual products then are assembled and productivity- and quality-related hindering factors at the trial production stage are pointed out. An improvement requirement is presented to a client or an internal design department so that the result of the investigation can be reflected on a next trial production. Thus, many operation steps and a long time (about 1 month) are required to complete and evaluate one trial product.

Many trial products are produced and evaluated despite a growing demand from the client to shorten the development period. Therefore, it has become difficult to have sufficient time and to perform a sufficient number of operation steps. As a result, the trial production process often is delayed and inspection precision is reduced. This results in problems being carried over to a next trial production process or a reduction in productivity and quality at the mass production stage.

Accordingly, an object of the present invention is to enable an efficient wire layout investigation by virtually investigating a wire layout for a wiring harness design.

SUMMARY OF THE INVENTION

The invention is directed to a 3D virtual assembling method or wiring harness layout method for displaying 3D design data of a wiring harness in a virtual 3D space. The 3D design data is displayed on a display means that is controlled by a control means based on data inputted by a data input means. The method comprises inputting or retrieving layout data representing a 3D layout of the wiring harness in a specified wire layout object (e.g. a vehicle). The method may also comprise using the input means for inputting or retrieving the 3D design data that represents a 3D layout of a wiring harness designed for production. The method may then comprise displaying or determining an image represented by the reference layout data as a background image in the virtual 3D space. The method may also comprise superimposing the 3D design data on the background image, and a 3D design data deforming step for displaying the shape of the wiring harness represented by the 3D design data and changing the shape of the wiring harness according to input made by the input means.

Accordingly, an efficient wire layout investigation can be made by virtually investigating the wire layout conforming to the result of the design without actually producing a trial product. Thus, time and labor can be reduced considerably as compared to the prior art methods, and development time can be shortened remarkably.

The method may further comprise adding coordinates for a direction normal to a primary plane of an assembling board used during the production of the wiring harness to 2D data for the primary plane to generate 3D design data.

The 3D design data may be divided into a plurality of wire segments and each segment may include vector information on the coordinates of the respective wire segments. Accordingly, the curved state and/or other states of the wiring harness can be subjected to a polygon processing and displayed by dividing the wiring harness into wire segments. Thus, an operation load of the control means can be reduced as compared to a case of performing an operation assuming an actually curved state as physical data.

The vector information of each concerned wire segment may be changed as the shape of the wiring harness is changed assuming that center axes of adjacent wire segments are substantially continuous.

Data on phase difference or angular relationship of adjacent wire segments may be given to each wire segment. Accordingly, the continuous state of the wire segments can be maintained even after deformation by dividing the wiring harness into a plurality of wire segments. Thus, processing can be performed to deform the wiring harness in a manner that approximates an actual curved state of the wiring harness.

A surface line substantially parallel with a center axis may be drawn virtually on the outer surface of the wiring harness before changing the shape of the wiring harness. The surface line then is displayed on the display means while being twisted according to a twist angle of the wiring harness. Accordingly, any unnatural twist can be determined visually or automatically by displaying a change of the phase difference on the display means.

The 3D design data of a covering part of the wiring harness may be used instead of the 3D design data of the wire segments. Accordingly, the 3D shape of covered parts can be represented like a real wiring harness.

The invention also is directed to a 3D virtual assembling method or wiring harness layout method for designing a wiring harness. The method in accordance with this aspect of the invention comprises providing input means for receiving or retrieving input. The method then comprises storing 3D harness design data for at least part of the wiring harness in a storage means, and displaying the harness design data stored in the storage means in a virtual 3D space on a display. The method also comprises correcting a section of the harness design data related to the content of changes based on input made via the input means and reflecting a correction result on display contents of the display means and stored contents of the storage means.

Accordingly, when a designer changes part of the harness design data via the input means, the section of the harness design data related to the change is corrected automatically and the correction is reflected automatically on the display means and in the stored contents of the storage means. Thus, it is not necessary for the designer to correct data related to the change, and the form of the harness design data after the change can be confirmed immediately. As a result, the wiring harness can be designed more efficiently.

The method may further comprise storing 3D design data of an assembling board corresponding to the harness design data in the storage means. The harness design data and the board design data are displayed in the virtual 3D space while setting the harness design data on the board design data. Sections of the harness design data and/or sections of the board design data may be changed via the input means and such changes are reflected on the display contents of the display and the stored contents of the storage.

The board design data preferably includes jig data corresponding to jigs for holding the wiring harness on the assembling board. If the length or path shape of a section of the harness design data is changed, a correction is made by moving the coordinates in the virtual 3D space of a section of the harness design data more toward an end than the changed section. The coordinates of the jig data corresponding to the end section of the harness design data are changed according to an amount of the change in the length of the changed section and/or according to a changed content of the path shape.

The invention also is directed to a computer program comprising a computer readable medium, having thereon computer program code means. The program, when loaded, makes the computer execute a 3D virtual assembling method as described above. Thus, the program causes a computer to carry out the respective steps of the 3D virtual assembling method to implement the 3D virtual assembling method in the computer.

The invention also provides a computer-readable storage medium for storing a computer program with means for causing a computer to control the execution of a wiring harness designing method as described herein.

The invention also is directed to a 3D virtual assembling system or wiring harness layout system that implements the method described herein for displaying 3D design data of a wiring harness in a virtual 3D space on a display means by means of a control means and based on a data inputted by a data input means. The data input or retrieving means is for inputting or retrieving data representing the shape of the wiring harness in the form of reference layout data that represents a 3D layout of the wiring harness in a specified wire layout object (e.g. a vehicle). The data input or retrieving means also inputs or retrieves 3D design data that represents a 3D layout of a wiring harness designed for production. The control means causes the display means to display a reference layout data image represented by the reference layout data as a background image in the virtual 3D space. The display means superimposes the 3D design data on the background image, and changes the shape of the wiring harness represented by the 3D design data according to input made by the data input means.

The 3D design data may be divided into wire segments and may include vector information on the coordinates of the respective wire segments. Vector information of the wire segments may be changed when the shape of the wiring harness changes. The changes may assume that center axes of adjacent wire segments are substantially continuous.

The invention also is directed to a wiring harness designing system or wiring harness layout system, which is a 3D virtual assembling system for designing a wiring harness. The system comprises: an input or retrieving means for receiving an input or for retrieving data; a storage means for storing harness design data including 3D design data of at least part of the wiring harness; a display means; and a control means for displaying the harness design data stored in the storage means in a virtual 3D space displayed on the display means. The harness design data may be changed by an input made via the input means. The system may then automatically correct sections of the harness design data related to the change and reflects a correction result on displayed contents of the display means and stored contents of the storage means. Thus, it is not necessary for the designer to correct all the data related to the content of the change, and the form of the harness design data after the change can be confirmed immediately. As a result, the wiring harness can be designed more efficiently.

The storage means also may store 3D design data of an assembling board corresponding to the harness design data. The control means displays the harness design data and the board design data in the virtual 3D space and sets the harness design data on the board design data. If the harness design data is changed by an input made via the input means, the control means corrects sections of the harness design data and/or sections of the board design data related to the change and reflects correction results on the display contents of the display means and the stored contents of the storage means.

The control means makes a correction if the length or path shape of a section of the harness design data is changed. The correction automatically moves the coordinates in the virtual 3D space of a section of the harness design data more toward a corresponding end than the changed section. The coordinates are moved according to an amount of the change in the length of the changed section and/or according to a changed content of the path shape without changing the 3D shape of the end section.

The board design data may include jig data for jigs that hold the wiring harness on the assembling board. If the length or path shape of a section of the harness design data is changed, the control means also moves the coordinates of the jig data included in the board design data corresponding to the end section of the harness design data. The coordinates of the jig data are moved according to an amount of the change in the length of the changed section and/or according to a changed content of the path shape.

The harness design data preferably includes accessory data corresponding to accessories mounted on wires of the wiring harness. If the accessory data are changed, the control means corrects the jig data included in the board design data and related to the accessory data.

The storage means preferably stores a plurality of harness design data having a common data configuration and related to each other. If any harness design data stored in the storage means are changed by an input made via the input device, the control means corrects sections of the harness design data related to the change. The control means also reflects a correction result on the display contents of the display means and the stored contents of the storage means, and reflects the content of the change on the other harness design data related to the changed harness design data. These corrections preferably are made automatically. Thus, the plurality of related harness design data easily can be changed at once. Accordingly, data administration, such as data renewal (including corrections) and deletion can also be performed easily.

A main part of the harness design data representing a wire path preferably is formed by connecting joints along the wire path. Accordingly, the length of a section of the wire path can be changed easily by increasing or decreasing the number of joints in the section or by increasing or decreasing the length of the joints in the section.

The invention also relates to a wiring harness designing method or wiring harness layout method for designing a wiring harness. The method uses a wiring harness designing system with input means, storage means and display means. The method comprises three-dimensionally modifying 3D design data of a wiring harness displayed in a virtual 3D space by the display means. The display is achieved by inputting or retrieving an instruction via the input or retrieving means for generating a plurality of 3D design data of different 3D shapes. The method also includes storing the generated 3D design data in the storage means and forming them into a database. The method then includes selecting part of the 3D design data stored in the storage means by an instruction inputted via the input means and displaying the same in the virtual 3D space via the display means. Accordingly, the 3D design data displayed in the virtual 3D space can be switched easily to the other stored 3D design data. Thus, the contents of the design can be inspected while switching the 3D design data displayed in the virtual 3D space, thereby making the wiring harness designing operation more efficient.

The 3D design data stored in the storage means may comprise related sections that have a common data configuration. If one of part of 3D design data stored in the storage means is changed by an instruction inputted via the input means, the change is reflected on the other 3D design data related to the changed 3D design data. These changes preferably are made automatically. Accordingly, the effect of a change in one part of the 3D design data on other 3D design data can be confirmed easily by switching the 3D design data displayed on the display means, and the contents of the designs of the 3D design data can be changed and investigated more efficiently. Consequently, data administration, such as renewal of data (including corrections) and deletion, can be performed easily.

The 3D design data stored in the storage means preferably include basic 3D design data developed in a plane in the virtual 3D space so as to conform to the wiring harness set on an assembling board. The data stored in the storages means may also include 3D design data representing a layout of the wiring harness in a vehicle body. These data are generated by three-dimensionally deforming the basic 3D design data in the virtual 3D space and are three-dimensionally deformed in the virtual 3D space to conform to a form of the wiring harness laid in the vehicle body.

Accordingly, the basic 3D design data developed in a plane is used to attain various improvements for better productivity and quality of the wiring harness at the production of the wiring harness and to verify, for example, whether the assembling operation holds. Similarly, the 3D design data representing the layout in the vehicle body are used to inspect the layout of the wiring harness in the vehicle body. Thus, the designing operation can be made even more efficient by making verifications and inspections while switching the 3D design data displayed in the virtual 3D space between the basic 3D design data and the 3D design data representing the layout in the vehicle body.

The 3D design data stored in the storage means may further include 3D design data of an intermediate shape created during a shape transitioning process. Thus, the 3D design data representing the layout in the vehicle body are generated by deforming the basic 3D design data. The basic 3D design data, the 3D data of the intermediate shape and the 3D design data representing the layout in the vehicle body are switched and displayed successively in the virtual 3D space via the display means in an order corresponding to the shape transitioning process. Accordingly, an operation of laying the wiring harness in the vehicle body can be inspected and demonstrated by the 3D design data switched and displayed in this order.

A main part of the 3D design data representing a wire path is formed by connecting joints along the wire path. Accordingly, the length of a specific section of the wire path can be changed easily by increasing or decreasing the number of the joints in the specific section or increasing or decreasing the length of the joints in the specific section.

The invention also is directed to a computer program comprising a computer readable medium, having thereon computer program code means. The program, when loaded, makes the computer execute a wiring harness designing method as described herein.

These and other objects, features and advantages of the present invention will become more apparent upon reading of the following detailed description of preferred embodiments and accompanying drawings. It should be understood that even though embodiments are described separately, single features thereof may be combined to additional embodiments.

BRIEF DESCRIPTION OF THE DRAWINGS

FIGS. 63(a) to 63(c) are diagrams showing 3D design data at intermediate stages of a shape transitioning process.

DETAILED DESCRIPTION OF THE PREFERRED EMBODIMENTS

A 3D virtual assembling system according to one embodiment of the invention can detect incompatible points in the design of a wiring harness. The system generates 3D digital design data that represents the shape of the designed wiring harness and image-displays 3D digital reference layout data of a wiring harness layout path in a product in which the wiring harness is to be mounted. The system then superimposes the 3D design image on the image-displayed reference layout data while positioning the 3D design data and deforming curves and the like for a virtual comparison.

Figure 1:
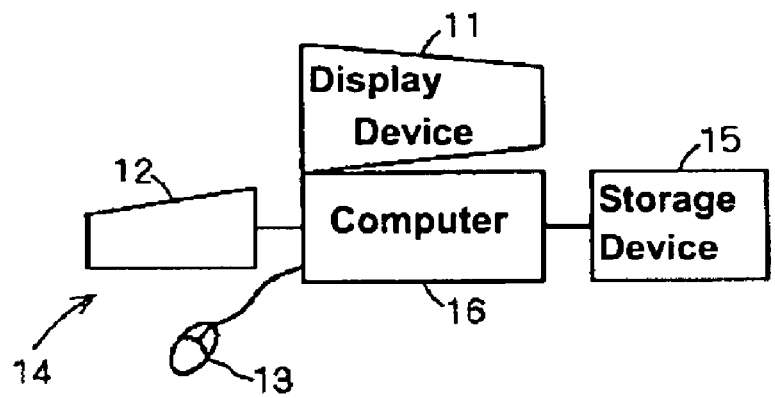
FIG. 1 is a block diagram showing a hardware construction of a 3D virtual assembling system or wiring harness designing system according to one preferred embodiment of the invention.

FIG. 1 shows a 3D virtual assembling system or wiring harness designing system according to the invention. As shown in FIG. 1, the 3D virtual assembling system has: a display device, such as a CRT display; input devices 14, including a keyboard 12 and a mouse 13; a storage device 15, such as a hard disk drive; and a computer 16, including a CPU and a main memory. The storage device 15 stores a software program specifying a procedure for operating the CPU of the computer 16 using various data stored in the storage device 15 in accordance with input made by of the input device 14.

Although not shown, the input devices 14 may also include a reader for reading a storage medium, such as a magnetic disk, CD-ROM, floppy disk, DVD, magneto-optical disk, or the like and a communication device for receiving data via a communication network, such as LAN.

Figure 2:
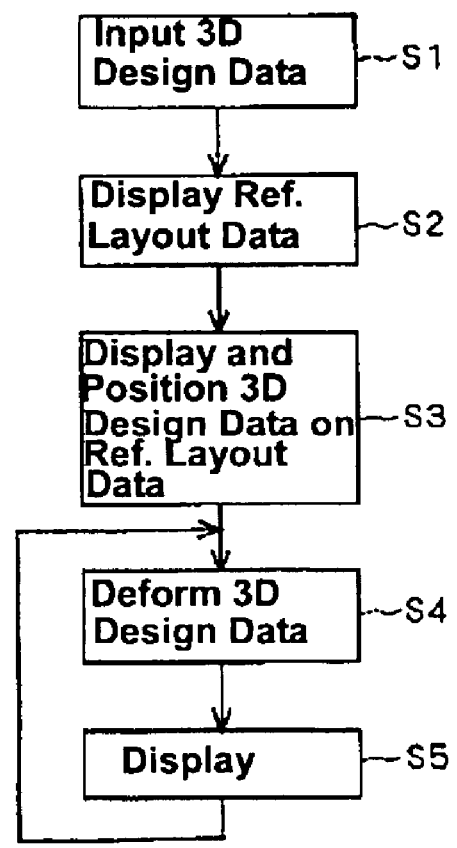
FIG. 2 is a flow chart showing a 3D virtual assembling method according to one embodiment of the invention.

The hardware sources 11 to 16 are used in combination to perform the operation steps of a 3D virtual assembling method shown in a flow chart of FIG. 2. The software program stored beforehand in the storage device 15 preferably implements the operation steps.

The reference layout data is inputted to or retrieved by the computer 16, preferably beforehand. The reference layout data is electronic data of a 3D layout of the wiring harness in a 3D space modeling the wire layout object. For example, the 3D layout of the wiring harness is designed beforehand for a wire layout object, such as an automotive vehicle or an electric appliance, based on the mount positions of parts in the wire layout object and coordinate information on the shape of the wiring harness in the 3D space. Coordinate information of parts to be mounted on the wiring harness are generated into 3D electronic data as a 3D drawing using a design assisting software program, such as a CAD. These 3D electronic data are inputted to the computer 16 and stored in the storage device 15 (see FIG. 1). The CAD software program may be implemented on the same equipment on the computer 16 and the data on the shape of the wiring harness 3 may be inputted or obtained manually by the input devices 14 or otherwise retrieved or inputted. Alternatively, the 3D electronic data generated in another CAD system may be transferred to the computer 16 via communication or a specified storage medium, such as a magnetic disk, CD-ROM, floppy disk, DVD, magneto-optical disk, or the like.

The 3D design data are electronic data representing coordinates of 2D electronic data used to produce a wiring harness on a two-dimensional assembling board 1 in the 3D space.

Figure 14:
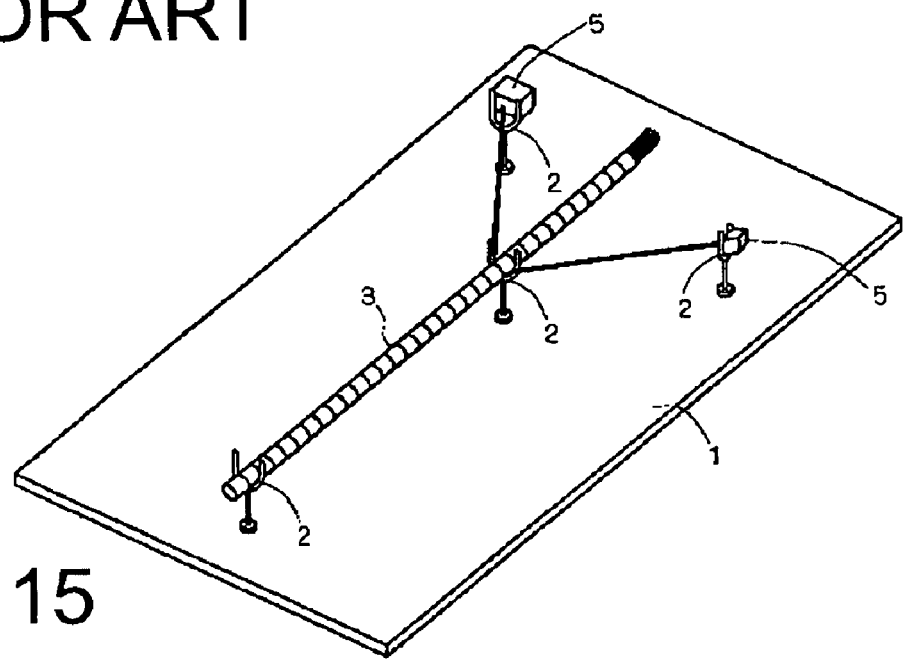
FIG. 14 is a diagram showing an operation of producing a wiring harness on a assembling board.

First, dimensions, such as lengths between branches of the wiring harness 3 and mount positions of connectors are designed in Step S1 of FIG. 2 based on the 3D drawing. The 2D drawing of the wiring harness 3 is generated in the form of 2D electronic data using a design assisting software program such as a CAD, considering the production of the wiring harness 3 on the assembling board 1 as shown in FIG. 14, and the generated 2D electronic data is inputted to the computer 16.

A coordinate axis (z-axis) normal to a coordinate plane of the inputted 2D electronic data is combined with the 2D electronic data in the computer 16, and the resulting 3D design data are stored in the storage device 15. The 2D electronic data may be inputted manually to the computer 16 using the input devices 14. Alternatively, the 3D electronic data generated by another CAD system may be transferred to the computer 16 via communication or a specified storage medium, such as a magnetic disk, CD-ROM, floppy disk, DVD, magneto-optical disk, or the like.

Figure 3:
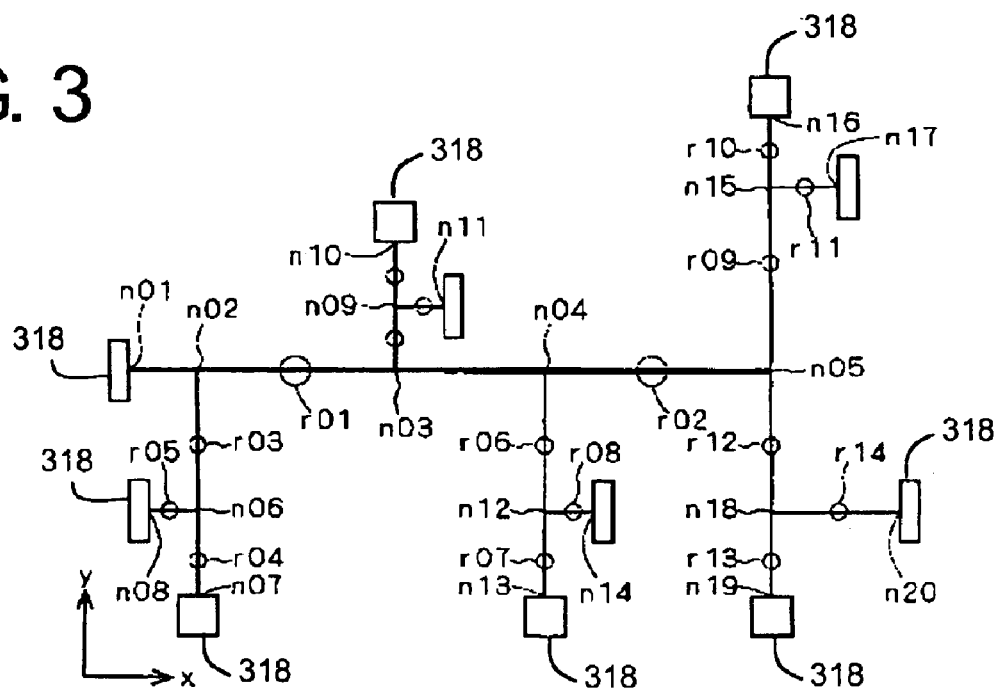
FIG. 3 is a diagram showing an image represented by a 2D data.

Information to be inputted as the 2D data include a 2D coordinate information of nodes n01 to n20 for specifying the shape of the respective wires of the wiring harness on the assembling board 1, as shown in FIG. 3, wire link information on links of the respective nodes n01 and n20, and information on diameters r01 to r14 of the wires linking the nodes n01 to n20.

Figure 4:
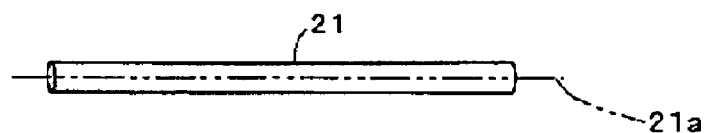
FIG. 4 is a diagram showing a wire model in a 3D space.
Figure 5:
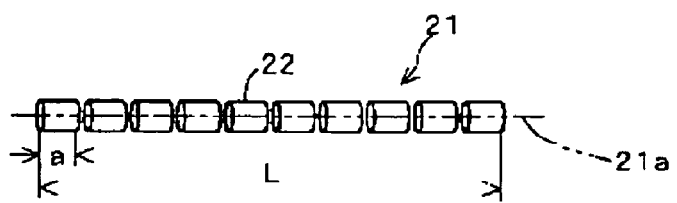
FIG. 5 is a diagram showing a state where a wire is divided into a plurality of wire segments.

Each wire 21 has a longitudinal axis 21a as shown in FIG. 4. Realistic deformation of the respective wires 21 of the wiring harness 3 in a 3D design data deforming step is achieved by dividing each wire 21 along its length L into short wire segments 22 that have a length "a" as shown in FIG. 5. The length "a" of the respective wire segments 22 also is inputted in Step S1 considering that the respective wires 21 are deformed with the wire segment 22 as a unit. The length "a" is desirably from about 5 mm to about 15 mm, preferably about 10 mm. The respective wire segments may be equal or different.

Weight data of the wires of the wiring harness 3 also are inputted. The weight data is a parameter representing a degree of difficulty to deform or bend the respective wires in the 3D design data deforming step to be described later. The larger the value of the weight data, the more difficult it is to deform the wire. Further, as the value of the weight data increases, the wire is more likely to be curved in its entirety instead of being deformed only at a point of deformation. Weight data is obtained empirically according to the diameters of the wires and other factors, and may result from experiments and/or simulation of the deformation properties of the wires 21 depending on wire specifications (such as material, cross-section, structure, coating, etc.). The chosen length "a" of the wire segments 22 is longer when the wire 21 is stiffer or more difficult to bend, while the chosen length "a" of the wire segments 22 is shorter when the wire 21 is softer or easier to bend.

In Step S2, the reference layout data inputted beforehand are plotted in a virtual 3D space for three-dimensional display on the display device 11. In this virtual 3D space (as a 2D projection on the display means 11 or as a 3D virtual imaging technique e.g. based on a red/green display necessitating corresponding eyeglasses), a virtual viewpoint can be changed, for example, in accordance with an operation of the input device 14, such as the mouse 13.

These reference layout data define a background image when the 3D design data are displayed. The virtual 3D display of the wiring harness 3 specified by the reference layout data is made, for example, in achromatic color to distinguish these data from the 3D design data.

Next, in Step S3, the 3D design data inputted in Step S1 are displayed superimposed on the reference layout data displayed in Step 2.

Figure 6:
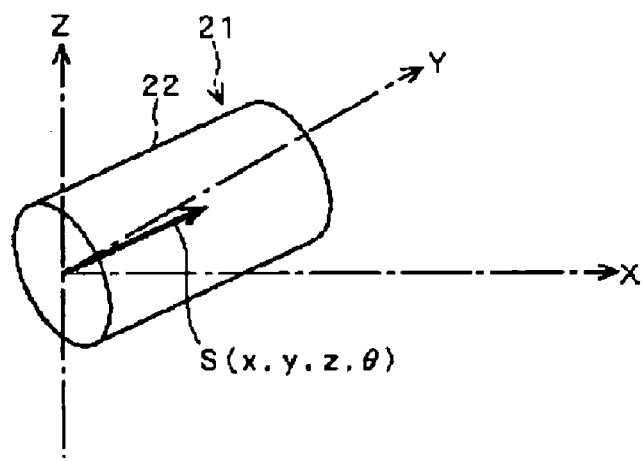
FIG. 6 is a graph showing a vector information of the wire segment.

Individual wires 21 or the wire segments 22 of a plurality of wires are represented, for example, using cylindrical shapes as shown in FIGS. 4 and 6. However, the wires 21 may be represented using other shapes, such as square, rectangular, elliptic or other cross section.

A vector S extending in a direction passing the center of a cylinder and having a length is defined for the wire segment 22 of length "a", as shown in FIG. 6. The vector S can specify a single absolute position and a twisting degree by specifying direction information and length information in a 3D space defined by x-, y- and z-axes, and angle of rotation information from a reference point by a twist angle (angle of rotation centered on the axis of the wire) between this wire segment and the wire segment adjacent thereto.

Figure 7:
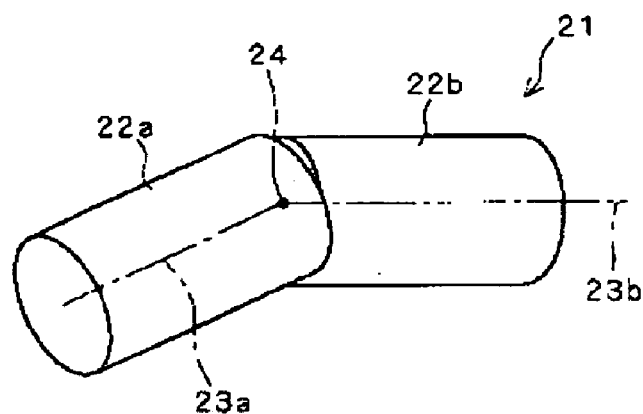
FIG. 7 is a diagram showing a state where two wire segments are continuously connected with each other.

Data of the individual wire segments 22 can be displayed to be connected continuously with each other. The continuous connection, as shown in FIG. 7, is such that the coordinates of end points of center axes 23a, 23b substantially coincide if the wire segments 22a, 22b are to be connected.

The entire 3D design data are moved within the virtual 3D space using the input device 14, such as the mouse 13, to adjust the positional relationship between the 3D design data and the reference layout data. Step S3 ends when the 3D design data are at a position considered desirable by an operator.

In Step S4, the operator manually deforms the virtual shape of the wire 21 represented by the 3D design data using the input device 14, such as the mouse 13, so that the shape coincides with the image of the reference layout data displayed as a background image.

It is possible to represent the flexibility of the wire segment 22 by data using a function of a typical 3D simulation system. However, such an operation is quite cumbersome, and the result of the operation may not necessarily reflect the operator's intention. Accordingly, in this 3D virtual assembling system, the processing described below is performed to enable the representation of a flexible characteristic as intended by the operator.

Figure 8:
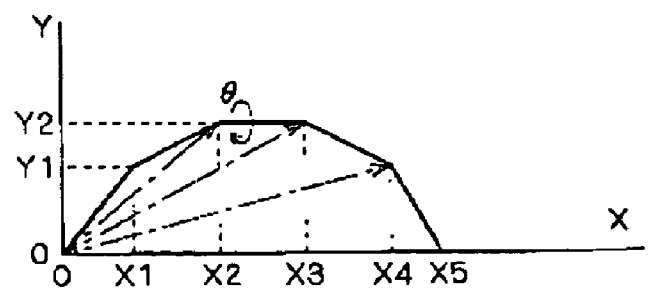
FIG. 8 is a graph showing a curved state of the wire.

The recognition of the respective wire segments 22 in the computer main body 16 is made by vector variables, i.e. vectors S (x, y, z, θ) in the 3D space, as described above. Variable θ denotes a twist angle between two continuous wire segments 22a, 22b, as shown in FIG. 8. Vectors are shown in the x, y plane and the z-axis is omitted in FIG. 8 to facilitate the description. However, the same applies to the 3D coordinate systems that have z-axis.

For example, the vectors S of five wire segments 22 have the following values in FIG. 8:

vector S1=(X1, Y1, Z, θ)
vector S2=(X2, Y2, Z, θ)
vector S3=(X3, Y2, Z, θ)
vector S4=(X4, Y1, Z, θ)
vector S5=(X5, 0, Z, θ).

After setting the vectors S as above, an end point of the wire segment 22 is moved within the 3D space by a special operation of the mouse 13 called "drag". The drag operation may include manipulating a button of the mouse 13.

The continuous wire segments 22a, 22b are held virtually connected with each other at a connection point 24, as shown in FIG. 7. The continuous connection results in the representation of a curve of the wiring harness 3 if the position of the end point of the wire segment 22 is moved. Thus, if tension is exerted on one of the continuous wire segments 22, the other wire segment 22 is dragged. A movement vector of the other wire segment is set by a specified operational equation based on empirical rules that depend on a variation vector of the connection point. Accordingly, the wiring harness 3 can be deformed without losing information on the continuity of all the wires.

If the position of point (X5, 0) in FIG. 8 is moved by the input device 14, an influence of such a movement on the other connection points differ in degree. In other words, the connection points closer to the point moved by the input device 14 are moved more than those more distant therefrom. Here, it is assumed that values of the vectors S after the change of the positions of the respective connection points are as follows:

vector S1=(X1, Y1, Z, θ1)
vector S2=(X2, Y2, Z, θ2)
vector S3=(X3, Y2, Z, θ3)
vector S4=(X4, Y1, Z, θ4)
vector S5=(X5, 0, Z, θ5)
where θ1<θ2<θ3<θ4<θ5.

In this way, the curved shape of the wiring harness 3 can be represented by both the absolute coordinates and the twist angles, and flexible representation such as a deflection can be made freely. Relationships of θ1 to θ5 that reflect the bending characteristic of the wire 21 are set beforehand e.g. based on empirical rules and are defined beforehand as a software program implementing the operations of the 3D virtual assembling system.

Weight parameters that represent difficulties of the respective wires to deform are considered for the mutual influences of the different wires in the wiring harness 3. Specifically, using a specified operational equation, a larger value for the weight data indicates a stiffer or more rigid wire 21, hence a smaller movement is made, at least locally, during the deformation. Further, as the value of the weight data of the wire increases, the wire is more likely to curve moderately in its entirety instead of being deformed only at a point.

The wiring harness 3 frequently is comprised of an aggregate of wires and covering parts (e.g. vinyl tubes, corrugate tubes, taping, etc.) 26 mounted around the wires 21. Accordingly, the shapes of the covering parts 26 need to be represented with the shape data of the wires 21.

Data with the same configuration as the wires 21, i.e. information on the length and the diameter, may be generated for the individual covering parts 26. The data of the wire segments 22 in ranges where the covering parts 26 are mounted are deleted and the data of the covering parts 26 are inserted. Thus, the data of the wire segments 22 are replaced by the data of the covering parts 26. A processing independent of the one for the wires 21 can generate data on diameters, designs and the dimensions of the covering parts 26. Therefore, the 3D shape of the wiring harness is represented realistically.

Parameters of a relative twist angle φ about the center axis of each wire segment are given as described above. However, this information can be utilized only if the operator can recognize twisted states when looking at the 3D shape displayed on the display device 11. Thus, a visual representation of the "twist characteristic" on the display device 11 is desirable for an effective 3D simulation. Accordingly, a substantially straight line is added on the outer circumferential surface of the wire segment 22 at an initial stage of the generation of data on the wire segment 22. These data are used with a 3D model of the wire 21 shown in FIGS. 10 and 11. It is assumed that the twist angle φ, which is a parameter of the vector S, is set at a desired fixed value.

First, each wire segment 22 is displayed in cylindrical form, and a straight surface line is added on the outer circumferential surface of each cylindrical wire segment 22 along its longitudinal direction separately from the center axis thereof. Initially, the surface lines of all the wire segments 22 form a straight line in each wire 21.

Figure 10:
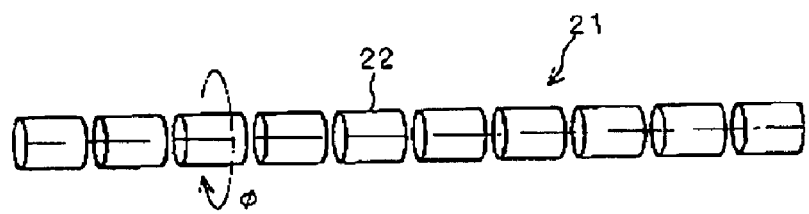
FIG. 10 is a diagram showing a state where surface lines are drawn on the outer circumferential surfaces of the respective wire segments.

The twist angles φ of all the wire segment data may be the same in the wire segments 22 continuously connected with each other. Thus, the straight lines in the longitudinal direction on the outer surfaces of all the cylinders are represented as a continuous straight line, as shown in FIG. 10. In this way, a state free from "twist" can be represented visually.

Figure 11:
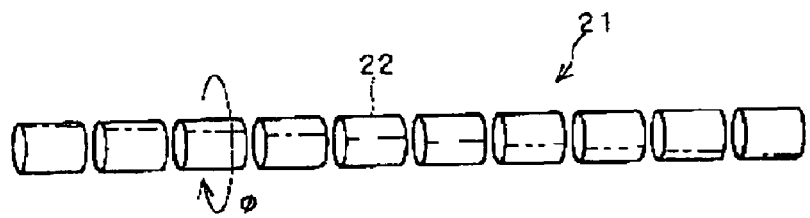
FIG. 11 is a diagram showing a state where the wire is twisted with the surface lines drawn on the outer circumferential surfaces of the respective wire segments.

On the other hand, the twist angle φ may be changed in some wire segments 22. Thus, the surface lines on the outer surfaces of the respective wire segments 22 are displayed in a twisted manner as shown in FIG. 11 according to a degree of the angular change. In other words, if a certain wire segment 22 is twisted due to a movement of a branch wire, the wire segments 22 adjacent thereto are displayed to represent a twist with the twist angle φ reduced in accordance with a specified law, preferably based on a relaxation method. The "twist characteristic" can be represented visually merely by the lines on the outer surfaces of the cylindrical wire segments 22 and can be investigated.

Figure 12:
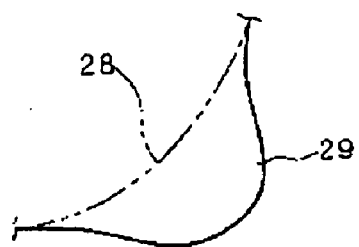
FIG. 12 is a diagram showing a case where the wire is found out to be excessively long.
Figure 13:
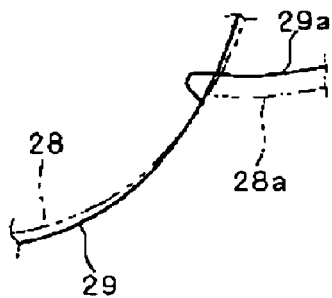
FIG. 13 is a diagram showing a case where a branch wire is found to be drawn out in an opposite direction.

The deformation results of the 3D design data of the wires 21 are displayed on the display device 11 e.g. with the aid of a conventional CAD-software such as ENVISION™, while being superimposed on the image of the reference layout data displayed as a background image, and a degree of coincidence or a degree of discrepancy of the two images is confirmed visually. For example, loosening of an image of the 3D design data with respect to an image 28 of the reference layout data as a background image may be large as shown in FIG. 12. This indicates that the wire is excessively long. Further, a branch wire 29a of the 3D design data may be drawn out from base wires 28, 29 in a direction opposite from the branch wire 28a of the reference layout data as a background image as shown in FIG. 13. Thus, a design change is made to change a forming direction of the branch wire 29a with respect to the base wire 29. Other problems including excessively short lengths of the wires and excessive twists can also be confirmed easily using the display result or content on the display device 11.

The above-described 3D virtual assembling method enables an efficient wire layout investigation without producing an actual trial product. Accordingly, as compared to the prior art methods, time and labor for designing can be reduced considerably.

This method is also effective for the actual design investigation since both coordinate information and twists of the wires 21 can be investigated. Accordingly, an efficient wire layout investigation can be made by virtually investigating the wire layout confirming to the result of the design without actually producing a trial product. Thus, as compared to the prior art methods, time and labor for designing can be reduced considerably.

The curved state of the wiring harness can be subjected to a polygon processing and displayed by dividing the wiring harness into wire segments. Thus, an operation load of the control means can be reduced as compared to performing an operation assuming an actually curved state as a physical data.

Furthermore, the continuous state of wire segments can be maintained even after the deformation by dividing the wiring harness into a plurality of wire segments. Thus, processing can be performed to deform the wiring harness in a manner that approximates an actual curved state of the wiring harness.

Data on the phase difference between adjacent wire segments is given to each wire segment. Thus, unnatural twists can be confirmed visually by displaying a change in this phase difference on the display means.

Figure 16:
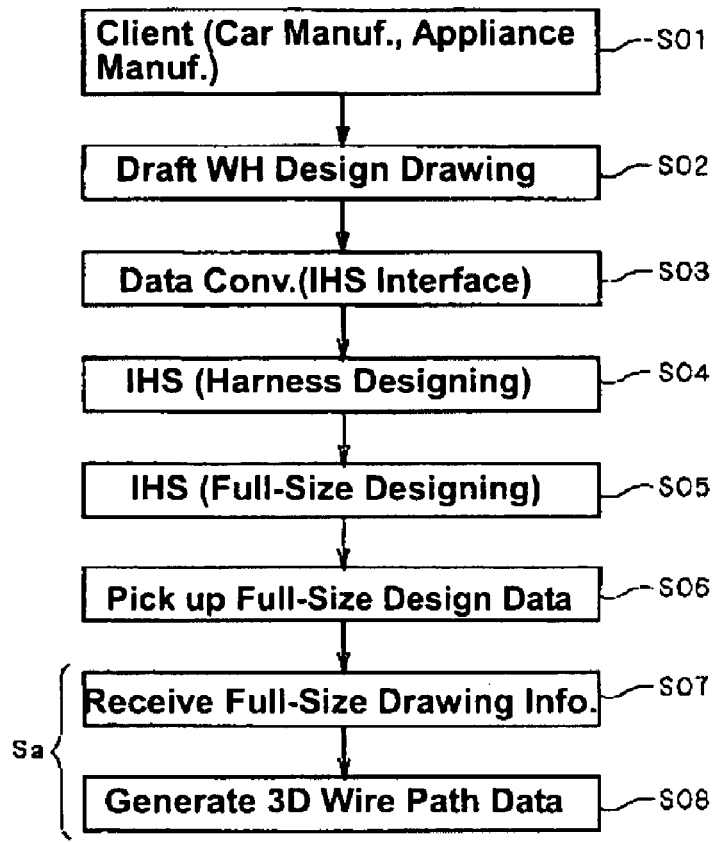
FIG. 16 is a flow chart showing a method for designing a wiring harness assembling table according to one embodiment of the invention.

FIG. 16 is a flow chart showing a method for designing a wiring harness assembling table according to the invention.

First, a client or a design provider, such as a car manufacturer or an appliance manufacturer written in Step S01 of FIG. 16, drafts a design drawing of a wiring harness divided according to the type of object (e.g. automotive vehicle, electric appliance, etc.) and according to sections (Step S02). At a later stage, a wiring harness is designed for each type and for each section. This design drawing includes information on the specifications of various parts, such as electric circuits, wires and accessories. An information output form of the design drawing to be drafted includes electronic information of two-dimensional 2D or 3D coordinates and a drawing printed as a plan based on the electronic information.

Subsequently, in Step S03, the electronic information obtained in Step S02 is converted to have a data format suited to a computer software program called IHS (wiring harness production designing system).

Figure 17:
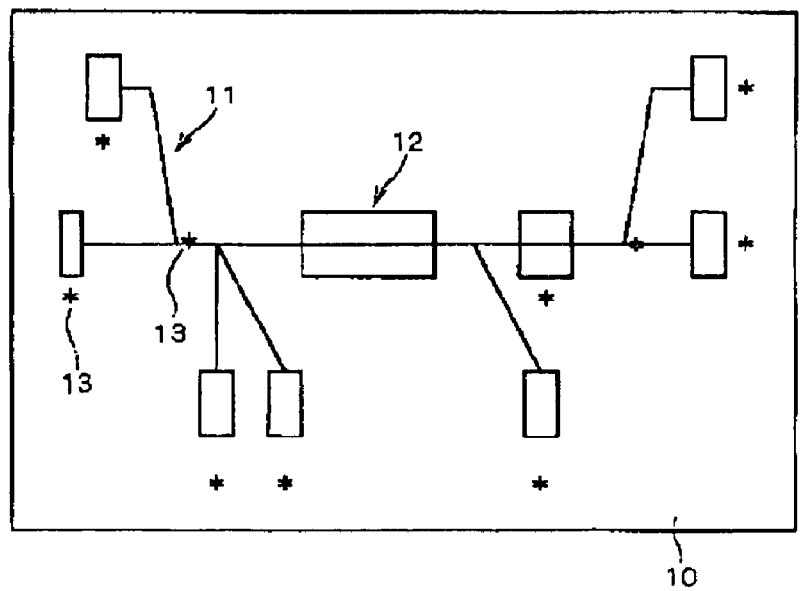
FIG. 17 is a diagram showing a wiring harness, accessories and assisting jigs in a 2D plane.

A skilled operator designs the wiring harness on the computer in Step S04 and a full-size production design drawing is drafted (Step S05). This full-size drawing is a simulation corresponding to the wiring harness 3 on the assembling table 1 shown in FIG. 15 and is, for example, a drawing in 2D coordinates, as shown in FIG. 17. This full-size drawing includes: information on circuits 11, each of which is one or more wires; information on terminals, such as connectors and ground terminals; information on accessories 12 including protecting members or covering parts, such as clamps, clips, tubes, tape and/or protectors; and information on dimensions and tolerances necessary for the production in a 2D space assuming the surface of the assembling table 1. This drawing also includes information on jigs (a multitude of jigs for terminals, clamping and/or branching are newly designed or selected according to application) 13 indicated by * in FIG. 17.

In Step S06, the full-size drawing design data for the full-size drawing drafted in Step S05 are sampled. The full-size drawing design data include information on nodes through which the respective circuits pass, information on spans connecting the respective nodes and information on accessories or parts to be connected with some of the nodes. The node information includes numbers and coordinates of the nodes. The span information includes numbers of the nodes connected with each other, a diameter of the wiring harness, and coordinates of passing points and bending points. The part information includes: the numbers of the nodes with which the respective accessories are connected; information on the name of terminal parts or part codes; information on the types, specifications and mounting directions of the parts. Other information included in the full-size drawing design data includes wire information, circuit construction information and circuit processing information.

A 3D wire path data is generated based on these pieces of information using a 3D simulation system (Step Sa). Specifically, the 2D full-size drawing design data obtained in Step S06 is received as full-size drawing information in Step S07. Then, the 3D wire path data is generated in Step S08.

The operations performed in Step S08 are described in detail with reference to FIGS. 18 to 21. Here, it is assumed that the node numbers of the opposite end points of the wiring harness are node No. 1—1 and node No. 2-1 and the node numbers of the passing points are passing point 1-$a$ and passing point 1-$b$. The operations of Step S08 are realized by a CPU that operates in accordance with a software program stored beforehand in a specified storage medium, such as a hard disk drive in the computer.

Figure 18:
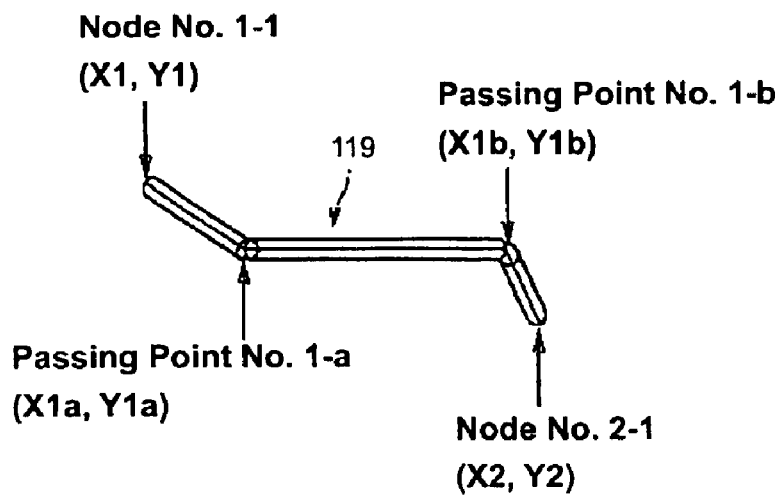
FIG. 18 is a diagram showing a 3D shape of a wiring harness developed in a 3D space.

First, the respective pieces of the span information are obtained. For example, the node numbers of the opposite end points of the span, node No. 1—1, node No. 2-1, are sampled as first span information as shown in FIG. 18. Further, the information on the diameter of the harness at this span is sampled. In this case, the thickness of the wire aggregate is calculated as a wire diameter in the displayed drawing and preferably is expressed in numerical value. Further, the passing points 1-$a$, 1-$b$ that need to be passed when the wiring harness has a bending point are obtained. The span information similarly is obtained for the remaining spans.

The 2D coordinates [X1, Y1], [X2, Y2] of the nodes are retrieved from the node information after the span information is obtained for all spans. The coordinates of node No. 1—1, node No. 2-1 and the coordinates [X1$a$, Y1$a$], [X1$b$, Y1$b$], . . . [X1$n$, Y1$n$] of the passing points then are plotted.

Figure 15:
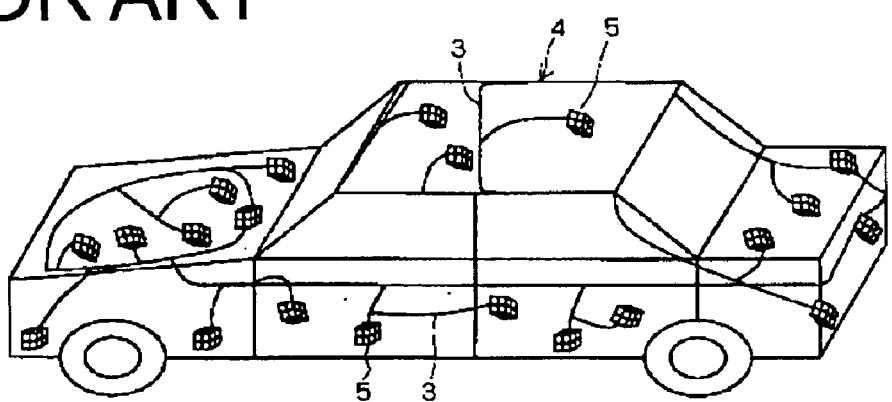
FIG. 15 is a diagram virtually showing a state where a wiring harness is laid in a three-dimensional manner in a wire layout object.

The coordinates of the respective nodes then are grasped as 3D coordinates by setting a z-coordinate in a height direction normal to the 2D space at a constant value (Z) for the coordinates of the respective nodes in the 2D x-y coordinate systems. The value of Z at this time is set at a distance (e.g. 100 mm) of the wiring harness supported by the jigs 2 from the assembling table 1, as shown in FIG. 15. An operator may manually input this dimension. However, the respective dimensions of the jigs 2 are known, and hence the computer may give a value in Z-axis automatically.

Subsequently, two adjacent plotted points are designated, data (D1) on the "harness diameter" are obtained, and cylindrical shape data having a straight line connecting the two points as a center axis and having a diameter D are generated. Such cylindrical shape data are obtained for all pairs of adjacent points and, consequently, the 3D wire path data are generated.

At this stage, the 3D coordinates of the respective nodes are as follows (see FIG. 18):

Node No. 1—1 . . . (X1, Y1, Z)
Node No. 2-1 . . . (X2, Y2, Z)
Passing point 1-$a$ . . . (X1$a$, Y1$a$, Z)
Passing point 1-$b$ . . . (X1$b$, Y1$b$, Z).

Thus, a virtual wiring harness 119 modelled into an aggregate of cylindrical shapes is represented in the 3D space as shown in FIG. 18.

Next, the part information described below is obtained from the full-size drawing design data obtained in Step S06.

First, the node No. 1 is obtained as a node number representing origin coordinates where this accessory is to be mounted. However, additional coordinates are designated by the node No. 2 as the node number of the additional node if the origin coordinates cannot designate the mount position of the accessory.

The mounting direction of the accessory then is designated. This direction information is included in the information of the node No. 1 or node No. 2. For example, if the node No. 1 is inputted, it means that the accessory is mounted at the coordinate position of the node No. 1 or is mounted toward the node No. 2 with the node No. 1 as an origin.

Further, accessory specification data (name, code, type, length, etc. of the part) are sampled as a number by a uniformly administrable numerical value or by a specified data standard.

The 3D shape of the part is stored in the storage device such as a hard disk of the computer beforehand. Parts for a wiring harness include wires, terminals, connectors, clamps, clips, tubes, protectors (e.g. molded parts), fuse boxes, junctions positions, etc. The 3D shape data of these parts are obtained by the following method.

Figure 19:
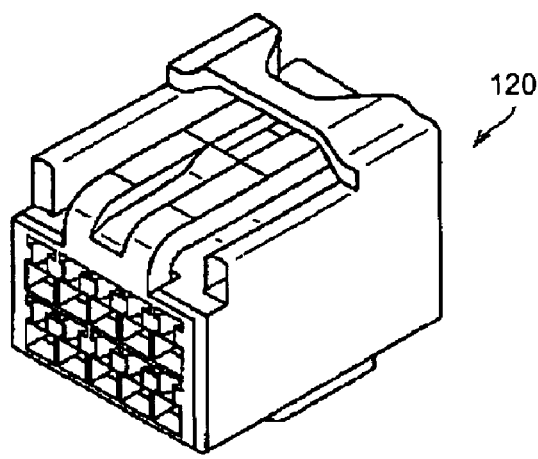
FIG. 19 is a perspective diagram showing the 3D shape of a connector as an accessory.

First, 3D shape information registered in or generated by an existing CAD system is copied at the development and design stage of the accessories, and one data file is generated for data of one part. FIG. 19 is a perspective view showing the 3D shape of a connector housing as an exemplary part. The name or code of the part preferably is used as the name of this data file.

Actual accessories or 2D drawings are obtained if 3D shape data are not available, and the 3D shape data of these accessories are set and inputted using a 3D CAD system. One data file is generated for data of one part after the data has been inputted and the name or code of the part is used as the name of this data file.

Peculiar retrieval indices are added to the 3D shape data of various parts obtained by the above method, and are stored in the storage device, such as a hard disk drive, as a part information database.

Figure 20:
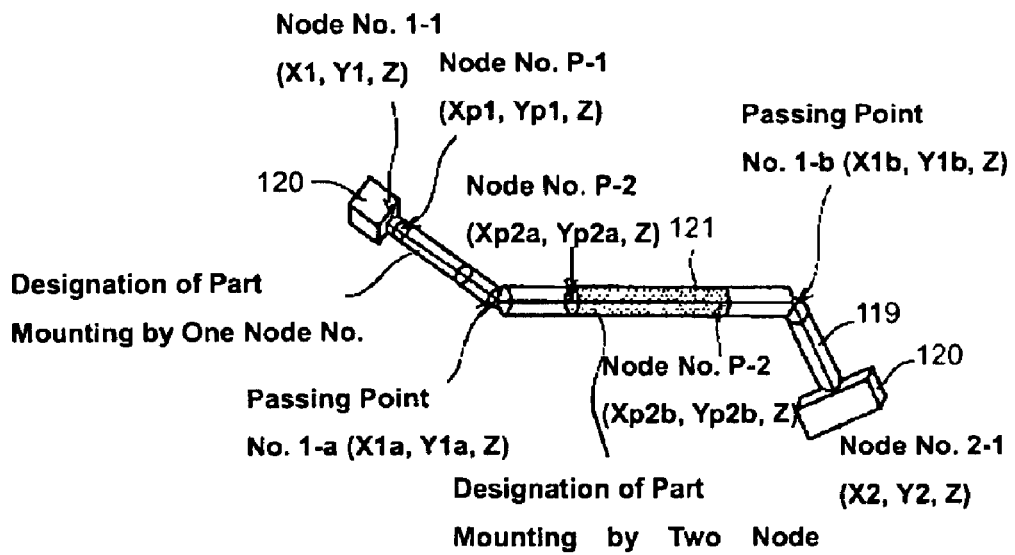
FIG. 20 is a diagram showing a 3D shape developed in the 3D space in which accessories are connected with the wiring harness.
Figure 21:
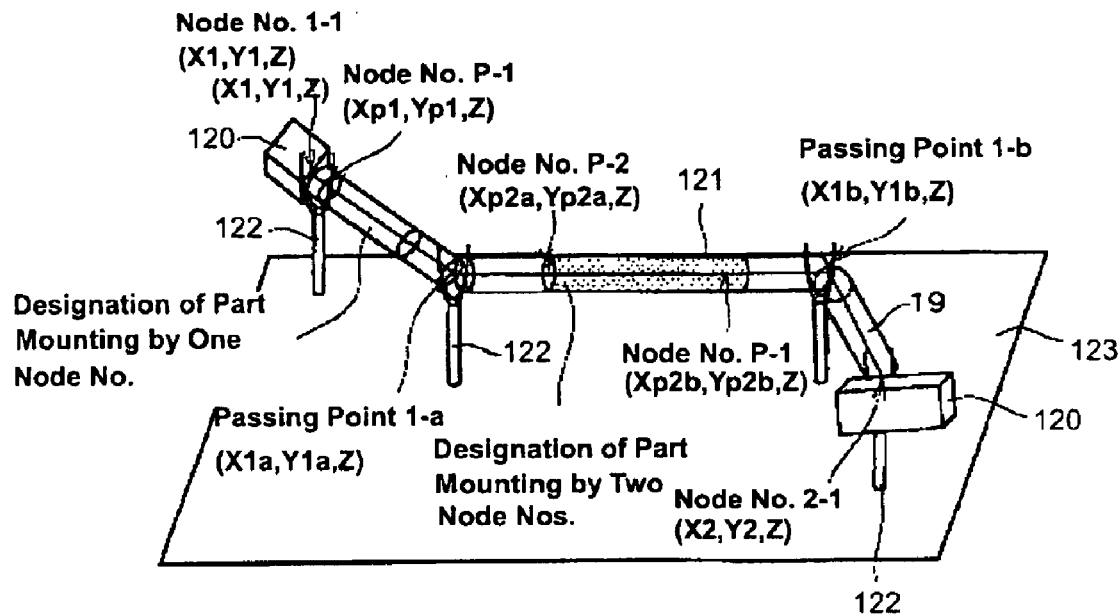
FIG. 21 is a diagram showing a state where an assembling table and assisting jigs are displayed together.

The 3D shape data are connected with the 3D wire path data (see FIG. 20). First, the name or the code of the part is obtained from the part information, and the obtained information is used as a retrieval key to obtain the 3D shape data file of this accessory from the part information database.

Subsequently, the node No. 1 and the node No. 2 if necessary are obtained to obtain the coordinates of the mounting position of the accessory from the part information. Such node information is retrieved to provide the 2D coordinates [Xpan, Ypan].

The 3D shape data of the accessory then is attached at a specified coordinate position. First, one node number information is designated for a connector 20 at one end and the coordinates of a center point of a plane where terminals are to be inserted are obtained. These coordinates are made to coincide with the node coordinates where the connector is mounted. Thus, the 3D shape data of the accessory shown in FIG. 19 is attached to the 3D wire path data (see FIG. 20).

For a clamp or clip, one node number information is designated. The coordinates of a center point of this accessory are obtained and these coordinates are made to coincide with the node coordinates where this accessory is to be mounted. Thus, the 3D part shape data is attached to the 3D wire path data.

For the covering member (such as a corrugate tube, vinyl tube or tape: see 121 in FIG. 20), data on the type, diameter and/or length of the part are obtained based on information on the name and specification of the part. Then 3D cylindrical shape data are generated in conformity with the diameter and length data of the part. Special display designs (color, surface design, etc.) for the types of the parts can be determined beforehand to enable a visual judgment of the type of the part. The display design is selected based on the part type information and is reflected on the previously generated 3D cylindrical shape data. Subsequently, the node coordinates are obtained from the node number information. A point expressed by these node coordinates is assumed to be a base point where the 3D cylindrical shape data is attached. There may be two pieces of the node number information. In this case, the direction data is referred to and a point expressed by the node number indicated there is assumed to be a base point. The coordinates of the base point and those of an end point of a centerline of the 3D cylindrical shape data are made to coincide with each other. Thus, the data are attached by a method for superimposing the 3D cylindrical shape data on the 3D wire path data. For example, in FIG. 20, the opposite end points of the cylindrical shape of the covering part 21 are expressed by the coordinates [Xp2a, Yp2a, Z], [Xp2b, Ypb, Z] at the opposite ends of a long node No. P-2.

If the diameter and length data cannot be obtained, 3D cylindrical shape data are generated using the coordinates of two node numbers and the diameter of the 3D wire path data including these node numbers.

The 3D cylindrical shape data may be attached after erasing the 3D wire path data within a range where the 3D cylindrical shape data are set. The "3D wiring harness shape data" shown in FIG. 20 can be obtained by the above procedure.

There are various kinds of supporting or assisting jigs 2 (see FIG. 15) depending on their functions. Generally used assisting jigs 2 include U-shaped jigs for fixing the terminal parts (connectors, terminals, etc.) and the wires, branch jigs used at branched points of the wires, and/or clamping jigs for positioning the clamps.

The jigs may be designed and produced individually or 2D drawing information of the jigs are obtained and 3D shape data are set and registered as in the above for setting the 3D shape of the parts. A jig database is generated or used, preferably using the names or codes of the parts as file names, as in the setting the 3D shape of the parts.

U-shaped jigs are used widely and are not selected in one-to-one relationship to the part name or part code. Thus, the name or code may be determined separately and registered therefor.

The width and length of the assembling table 1 (See FIG. 15) for assembling the wiring harness are obtained from the full-size drawing information obtained in Step S07. Several sizes of the assembling table are available as production standards (e.g. 870 mm (width)×3600 mm (length)), and a designer selects an optimal size in drafting a full-size drawing.

The jigs 2 are selected for the node coordinates in the part information. A desired selection method is adopted, and an optimal jig is selected within a range so as not to impair operability and not to hinder quality (positioning precision, dimensional precision, etc.) in view of the type, shape, size and the like of the parts and the wire diameter. Some jigs 2, such as clamps, are determined in one-to-one relationship to the part names or codes.

The operator may arbitrarily select the jigs 2. However, the dimension data of, e.g. the U-shaped jig, such as the inner diameter of its holding section, can be recognized by the computer. Thus, the type of the jigs 2 may be computer-selected automatically according to the diameter of portions of the respective wires held by the jig 2.

The 3D shape data (see 122 in FIG. 21) of the selected jigs 2 are retrieved from the jig database and attached to the assembling table 123 for assembling the wiring harness.

The assembling table data-generating step is completed by the above operations.

The 3D wiring harness 19, the jigs 122 and the assembling table 123 thus generated are displayed on a display screen of the computer or printed by a printer, so that they can be visually grasped without producing any trial product at an assembling site of the wiring harness.

Figure 22:
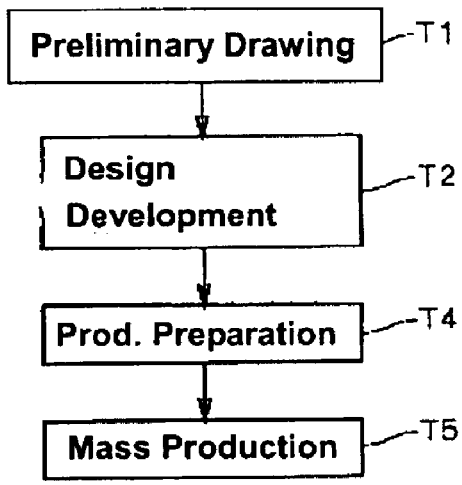
FIG. 22 is a flow chart showing an overall designing flow of an object to which the wiring harness assembling table designing method according to the embodiment of the invention is applied.
Figure 23:
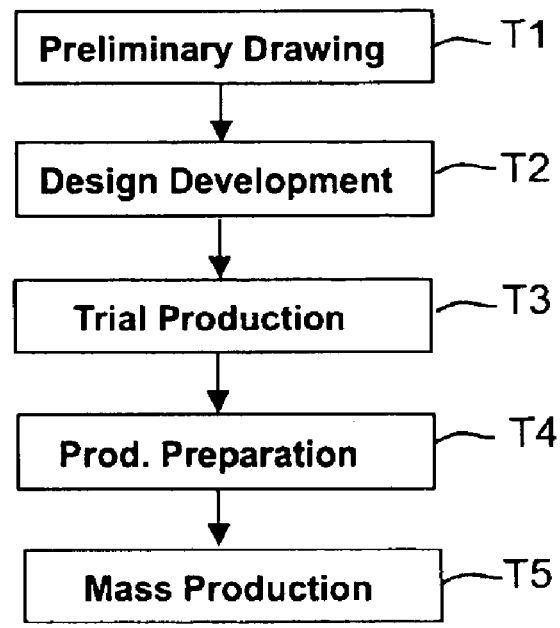
FIG. 23 is a flow chart showing an overall conventional designing flow of an application object.

The computer can model the wiring harness and the assembling site. Thus, problems of the design can be pointed out and improvements can be made within a short time. Specifically, the wiring harness assembling table designing method may be used at the design and development stage of the object in which the wiring harness is to be used, as in Step T2 of FIG. 22. Accordingly it is unnecessary to produce a trial product of the wiring harness as in Step T3 of the prior art method of FIG. 23, and a development period of the object in which the wiring harness is to be used is shortened considerably.

Moreover, an easily visualized 3D model for an actual situation can be obtained based on the accessories to be mounted on the wiring harness.

Furthermore, the coordinate axis in the normal direction to the 2D plane of the wire layout path is added to the coordinate systems of the 2D plane in the jig selecting and mounting step, and the value of the height at which the wiring harness is supported by the jigs above the assembling table is set in the normal direction, thereby arranging the wire layout path in the 3D space. Thus, the coordinates of the wire layout path can be converted easily from the 2D coordinates to the 3D coordinates.

Figure 24:
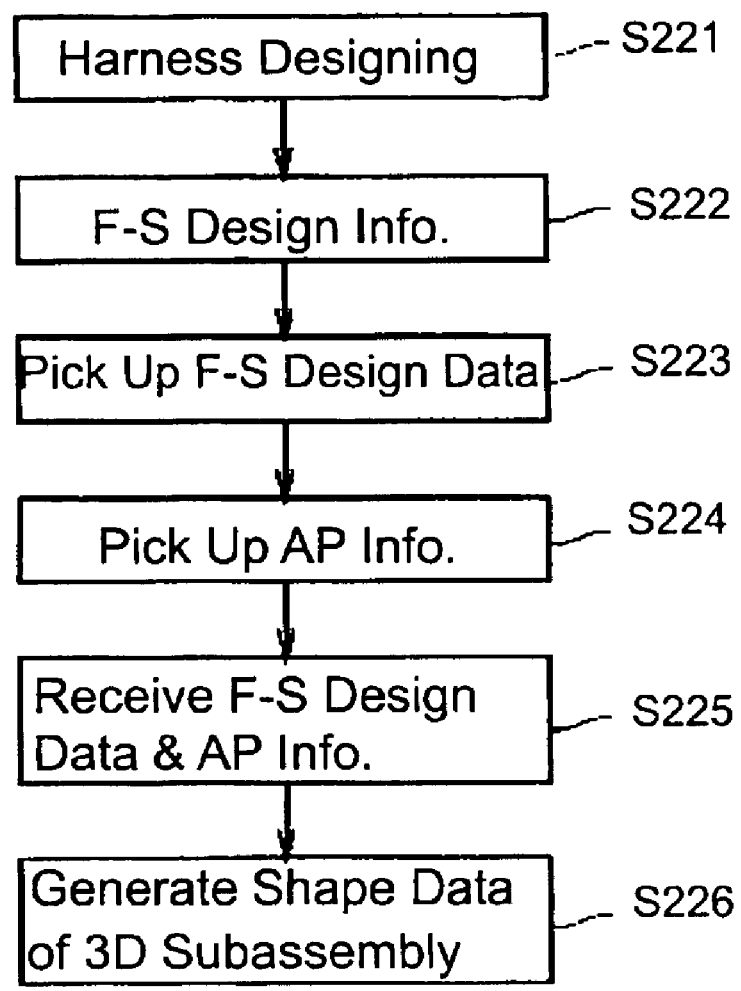
FIG. 24 is a flow chart showing a summary of a method for designing a wiring harness according to one embodiment of the invention.

FIG. 24 is a flow chart of a wiring harness designing method according to the invention. As shown in FIG. 24, 3D virtual simulation technology is utilized from the separate designing of subassemblies of a wiring harness to the arrangement of these subassemblies on a harness assembling table, as described with reference to FIGS. 1 to 13. The method generates a wiring harness and a harness assembling table that have precise 3D structures in a virtual space. A trial product of the wiring harness can be produced virtually by simulation, and productivity- and quality-related hindering factors are pointed out to study methods for improving such hindering factors.

The above operations are carried out in a computer system e.g. as shown in FIG. 1 preferably provided with a ROM, a RAM and a CPU, while 3D images are displayed on a display 11. A method for these operations is described in detail below.

Figure 46:
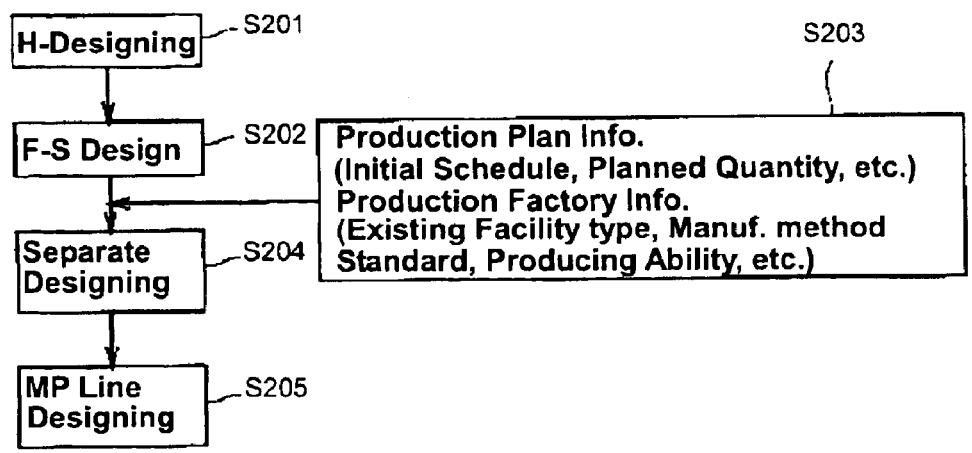
FIG. 46 is a flow chart showing a general wiring harness designing method.
Figure 47:
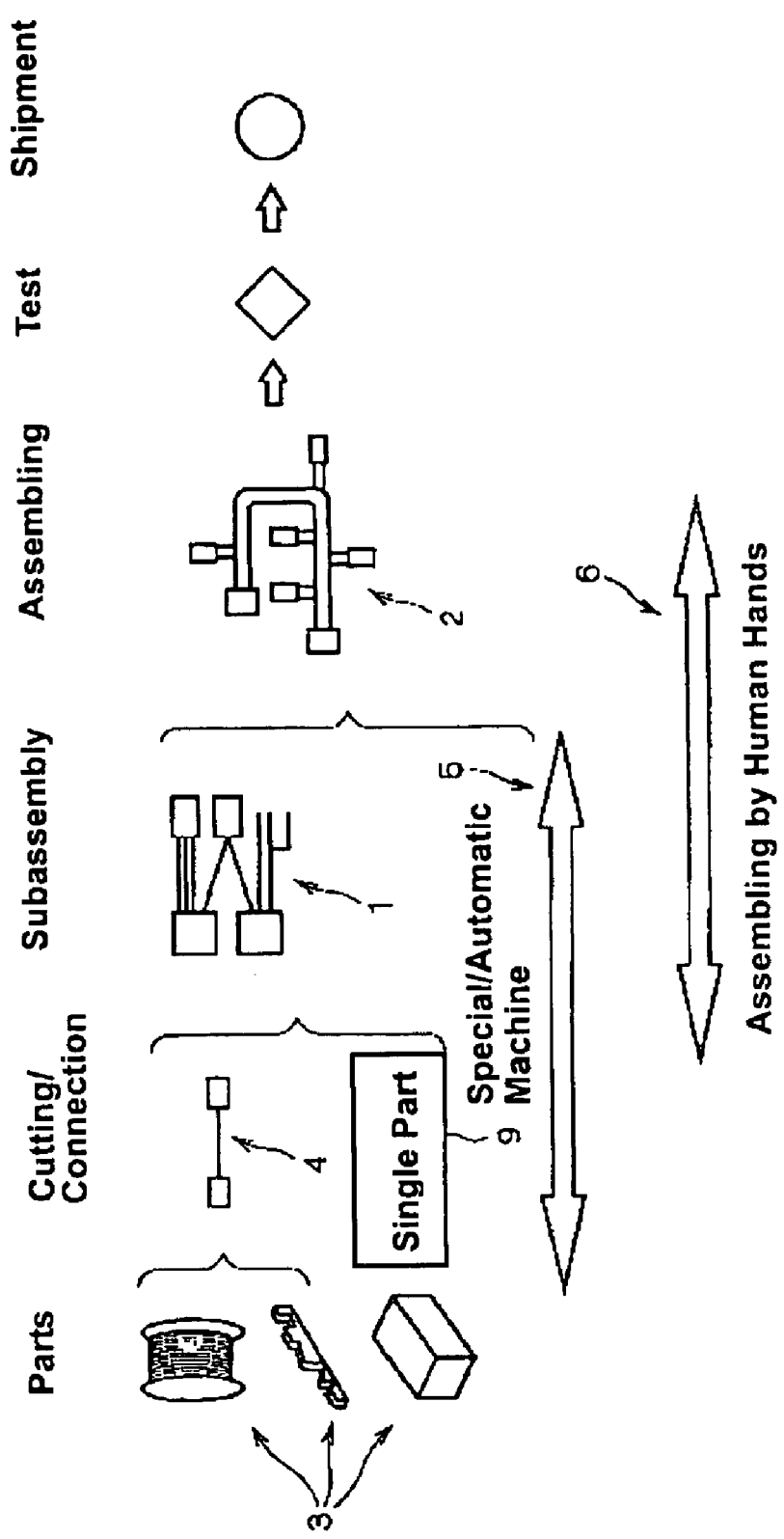
FIG. 47 is a flow diagram showing a general wiring harness producing method.
Figure 48:
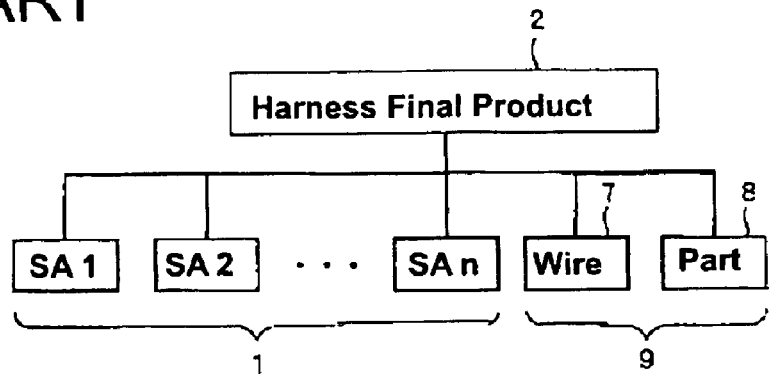
FIG. 48 is a diagram showing a construction of a wiring harness of a plurality of subassemblies.
Figure 49:
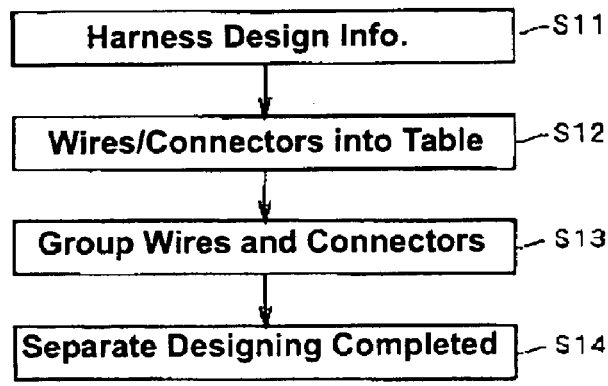
FIG. 49 is a flow chart showing a subassembly designing method.
Figure 50:
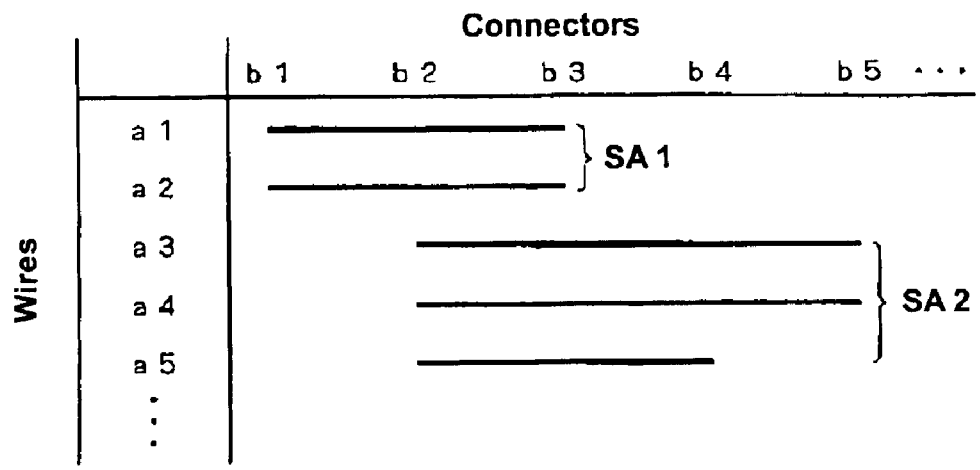
FIG. 50 is a matrix table showing a connection relationship between wires and connectors of a subassembly.
Figure 51A:
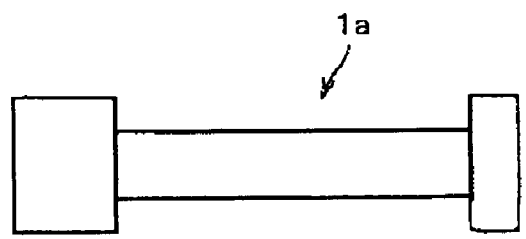
FIG. 51A is a diagram of an example of the subassembly.
Figure 51B:
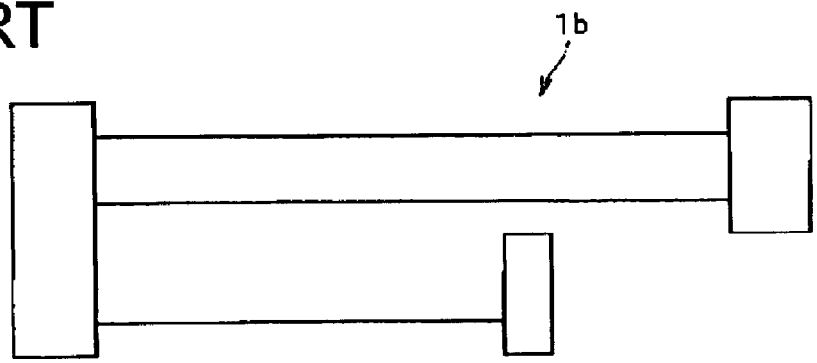
FIG. 51B is a diagram showing another example of the subassembly.

First, a full-size drawing is drafted in a procedure similar to the one shown in Steps S201 and S202 of FIG. 46. As a result, a harness design information (full-size design information: Step S222) is obtained from a production designing system (IHS: Step S221) as a software program of the computer, preferably as already described with reference to FIGS. 1 to 13.

The harness design information is drawing information developed in a 2D plane and includes information necessary to draft a 2D drawing. Additionally, 3D shape data as electronic data processable in the computer system are generated based on the harness design information. Alternatively or additionally at least part of the harness design information may be inputted as 3D data e.g. as possibly received from a car manufacturer.

Specifically, in Step S223, data are sampled from or inputted to the computer system for various items including the 3D shapes of the respective parts, such as wires, connectors and covering parts and a part information, considering the full-size designing. These data are compiled using a storage device, such as a hard disk of the computer system.

The full-size design information obtained in Step S222 and subassembly composition information on a plurality of separately designed subassemblies of the wiring harness are formed into a database.

The full-size design data to be sampled or inputted include: node information and part information, such as the type of information described above with respect Step S05 of FIG. 15; subassembly information including identification numbers for distinguishing subassemblies and information on parts (e.g. circuit parts) of the subassemblies; circuit information, including types, sizes, colors, processed lengths, diameters of the wires, the names of terminals mounted at the opposite ends of the wires, the part codes, the node Nos. of the connectors into which the terminals at the opposite ends of the wires are to be inserted, the names and codes of the connectors, and cavity numbers in the connectors to have the terminals inserted; circuit construction information; and circuit processing information.

A preferred data configuration of the subassembly information is shown in FIG. 2. The subassembly information is organized in a retrieval tree structure as shown in FIG. 25.

Figure 25:
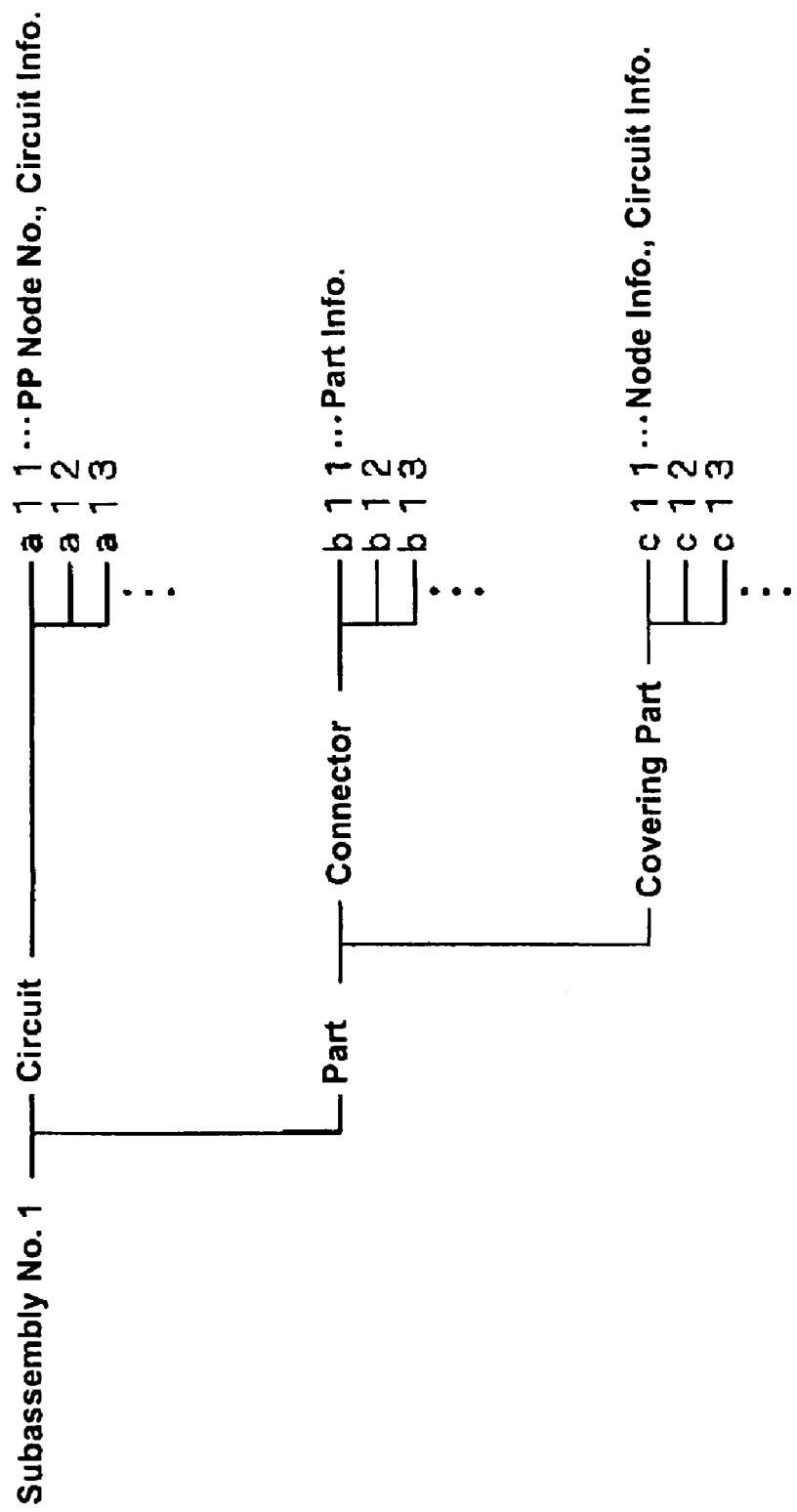
FIG. 25 is a diagram showing a retrieval tree structure showing a subassembly information.

In FIG. 25, circuits a11, a12, a13, . . . of subassembly No. 1 are an index information of each wire, and include circuit information to define various pieces of information, such as passing nodes Nos. to detect coordinates where the wires pass on the full-size drawing and diameters of the wires.

Connectors b11, b12, b13, . . . are index information of the connectors and include connector specification information linked with the part information, and information on positions of nodes where the connectors are located.

Covering parts c11, c12, c13 such as clamps, clips, protectors, tubes and tape are index information of covering parts and include relationship information linked with the circuit information to indicate which circuit is joined with which covering part, and an information on the positions of the nodes where the respective covering parts are located.

These pieces of the full-size design information are stored as a database (DB3 in FIGS. 26 and 27) in the storage device.

Information on the 3D shapes of the connectors b11, b12, b13 . . . , the covering parts c11, c12, c13, . . . such as clamps, jigs and other parts is stored as a database (DB2 in FIGS. 26 and 27) beforehand, and the data of the 3D shape information can be retrieved by referring to the above index information.

Information on the wiring harness assembling procedure also is inputted or retrieved in Step S224 and stored as a database in the storage device. This includes subassembly assembling procedure information and on-the-board assembling procedure information.

The subassembly assembling procedure information includes: an order index (serial No.) indicating an assembling order; the names or codes of the parts, such as connectors to be assembled; the circuit Nos. of the wires; terminal symbols indicating at which ends of each wire the terminals are mounted (one terminal "A" and the other terminal "B"); flags indicating the presence of the covering part to be mounted first, specifications of the first mounting parts, and other operation codes and specifications.

Data of the subassembly assembling procedure is stored as a database DB1A. This subassembly assembling procedure information DB1A is linked with the database DB2 of the 3D shape and the database DB3 of the full-size design information, FIG. 26, with the subassembly Nos. as link keys.

The on-the-board assembling procedure information includes: an order index indicating an assembling order on the harness assembling board; the subassembly Nos. for specifying the subassemblies to be brought onto the harness assembling table; operation codes for identifying the operations as wire laying, terminal insertion, bundling, mounting of the covering parts, and branching; the circuit Nos. of the wires to be assembled independently not as part of the subassembly; terminal symbols indicating at which ends of each of these wires to be assembled the terminals are mounted (one terminal "A" and the other terminal "B"); and the specifications of other operations.

Figure 27:
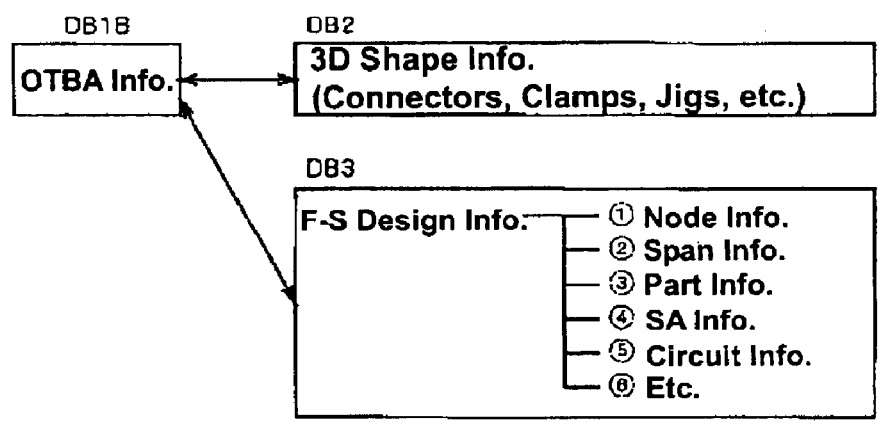
FIG. 27 is a diagram showing a relationship between an on-the-board assembling procedure information and the other databases.

Data of this on-the-board assembling procedure information also are stored as a database DB1B. This on-the-board assembling procedure information DB1B also is linked with the database DB2 of the 3D shape information and the data base DB3 of the full-size design information, as shown in FIG. 27, with the part information and the like as link keys.

Figure 28:
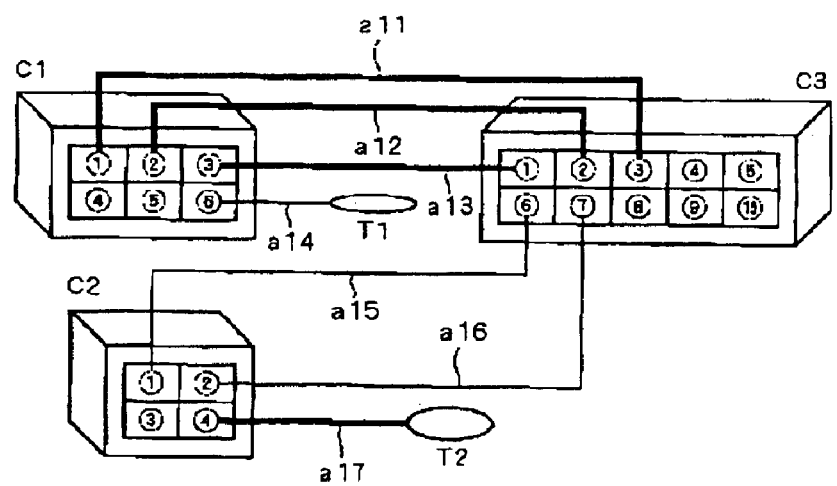
FIG. 28 is a diagram showing an exemplary subassembly.

Here, a specific example of the subassembly is shown in FIG. 28 and a procedure of assembling this subassembly is shown in TABLE-2.

TABLE 2

| ORDER | CONTENTS OF OPERATION |
|---|---|
| 1 | Take connector C3 out and hold it by left hand |
| 2 | Pull B-terminal side of circuit a15 out by right hand, and at least partly insert it into cavity ⑥ of connector C3 |
| 3 | Pull B-terminal side of circuit a16 out by right hand, and at least partly insert it into cavity ⑦ of connector C3 |
| 4 | Pull A-terminal side of circuit a13 out by right hand, and at least partly insert it into cavity ① of connector C3 |
| 5 | Pull A-terminal side of circuit a12 out by right hand, and at least partly insert it into cavity ② of connector C3 |

TABLE 2-continued

ORDER CONTENTS OF OPERATION

| | |
|---|---|
| 6 | Pull A-terminal side of circuit a11 out by right hand, and at least partly insert it into cavity ③ of connector C3 |

In FIG. 28, cavities ①, ②, ③ of a connector C1 and cavities ③, ②, ① of a connector C3 are connected by circuits a11, a12, a13, and cavities ①, ② of a connector C2 and cavities ⑥, ⑦ of the connector C3 are connected by circuits a15, a16. Further, a circuit a14 connected with a cavity ⑥ of the connector C1 is connected with a free terminal T1, and a circuit a17 connected with a cavity ④ of the connector C2 is connected with a free terminal T2. The free terminals T1, T2 are not inserted into cavities at a subassembly assembling stage, but are inserted into connectors on the harness assembling table 216 later on.

Figure 29:
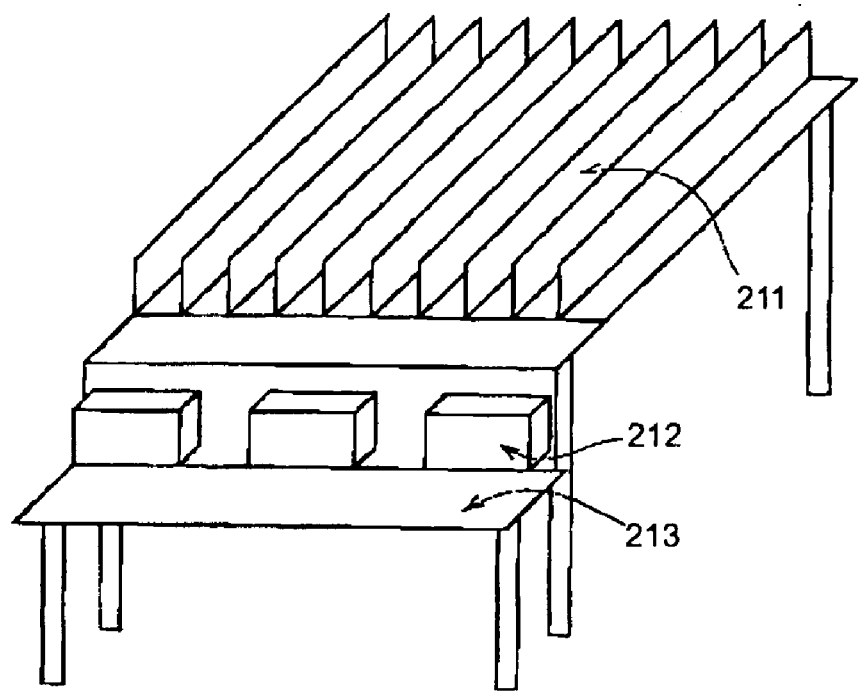
FIG. 29 is a perspective view showing a subassembly assembling site.

Wires for the subassembly of FIG. 28 are stored in a wire accommodating tray 211 shown in FIG. 29, and parts stored in cases 212 are connected with ends of the wires toward the front side in FIG. 29. Connecting operations are performed on a work table 213.

Figure 30:
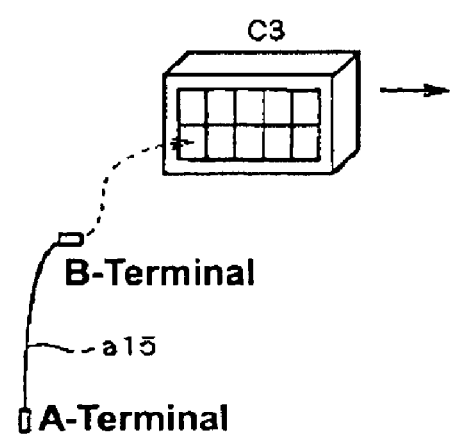
FIG. 30 is a perspective view showing a subassembly assembling operation.
Figure 31:
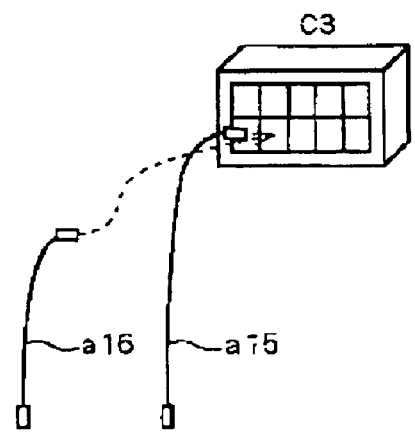
FIG. 31 is a perspective view showing a subassembly assembling operation.
Figure 32:
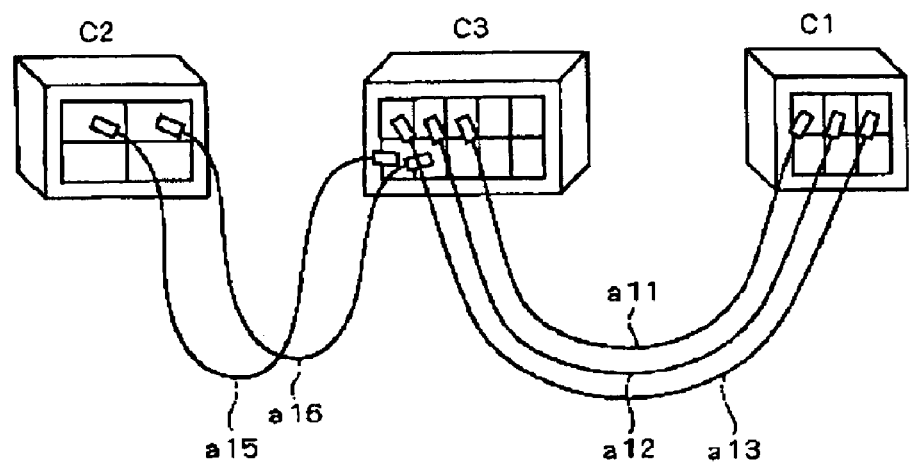
FIG. 32 is a perspective view of a subassembly assembling operation.

A procedure for assembling the circuits a11, a12, a13, a15, a16 into the connector C3 is shown in TABLE-2. First, the connector C3 is taken out of the case 212 and held by the left hand. Then, the B-terminal of the circuit a15 in the tray 211 is pulled out by the right hand and inserted into the cavity ⑥ of the connector C3 (FIGS. 28 and 30). Similarly, the B-terminal of the circuit a16 is pulled out by the right hand and inserted into the cavity ⑦ of the connector C3 (FIGS. 28 and 31); the A-terminal of the circuit a13 is pulled out by the right hand and inserted into the cavity ① of the connector C3; the A-terminal of the circuit a12 is pulled out by the right hand and inserted into the cavity ② of the connector C3; and the A-terminal of the circuit a11 is pulled out by the right hand and inserted into the cavity ③ of the connector C3 (FIGS. 28 and 32).

Subassembly assembling procedure information is generated based on these manual operations (see FIG. 26), as shown in TABLE-3 below.

TABLE 3

| SUBASS. NO. | SERIAL NO. | PART CODE | CIRCUIT NO. | TERMINAL SYMBOL | ... |
|---|---|---|---|---|---|
| | 001 | C3, 2 | | | |
| | 002 | | a15, 1 | B | |
| | 003 | | a16, 1 | B | |
| | 004 | | a13, 1 | A | |
| | 005 | | a12, 1 | A | |
| | 006 | | a11, 1 | A | |

Information "C3, 2" in TABLE-3 means the connector C3 is held by the left hand ("2") and is stored in a part code column in a row of serial No. 001. Subsequently, information "a15, 1" means the circuit a15 is held by the right hand ("1") and is stored in a circuit No. column and in a row of the serial No. 002. Similarly, information "a16, 1", "a13, 1", "a12, 1" and "a11, 1" are stored in rows of succeeding serial Nos. The terminal symbols (A or B) also are stored together.

Figure 26:
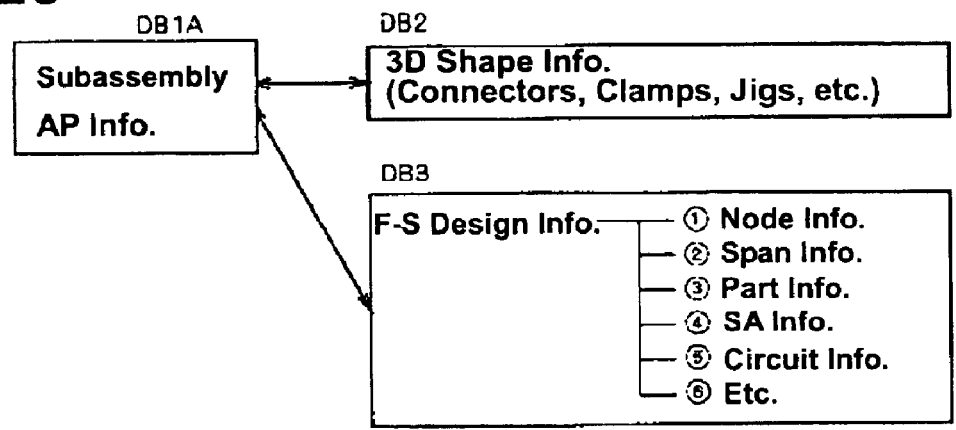
FIG. 26 is a diagram showing a relationship between a subassembly assembling procedure information and other databases.

This subassembly assembling procedure information is formed into a database as indicated by DB1A in FIG. 26.

Figure 33:
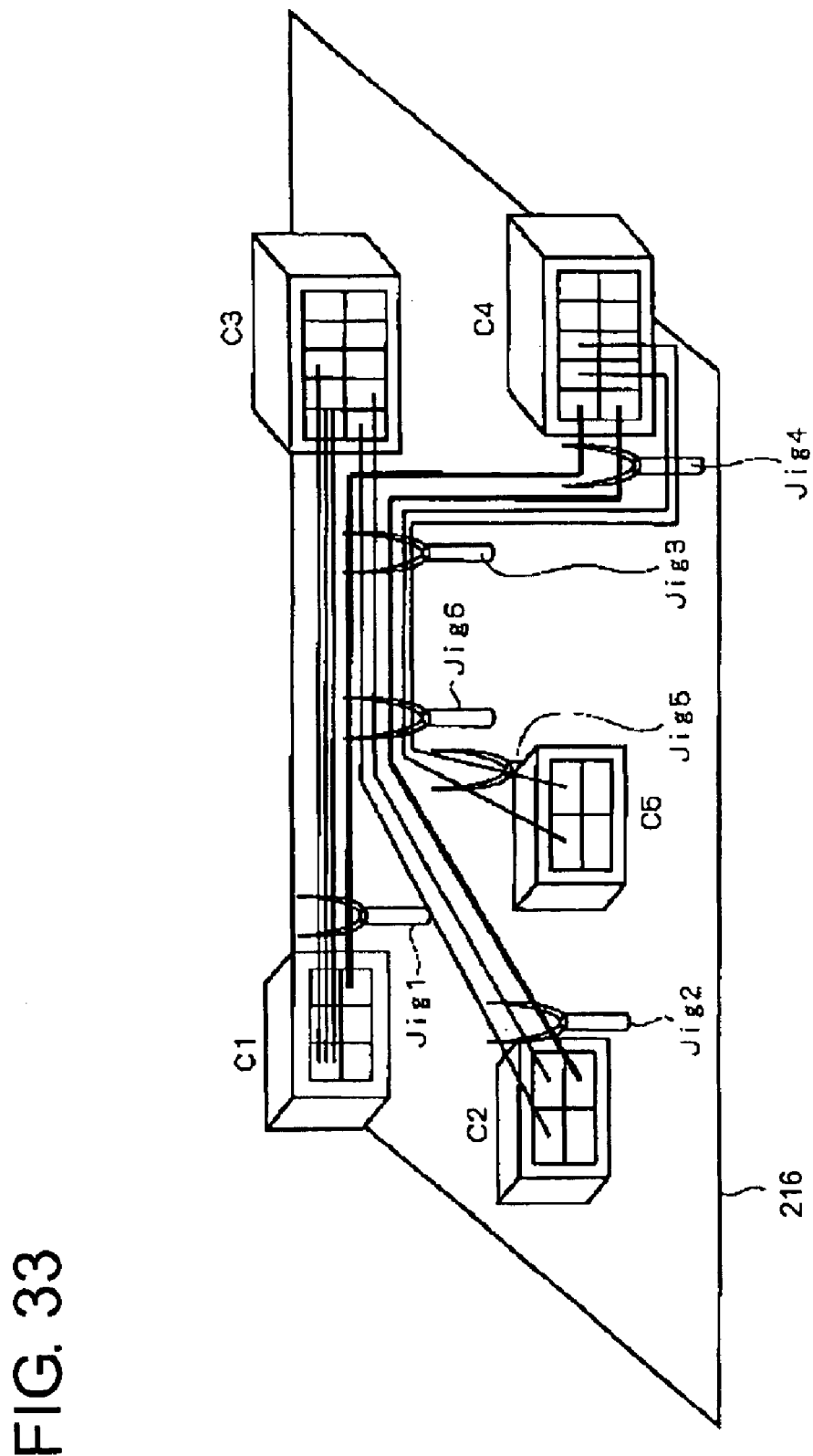
FIG. 33 is a perspective view showing a state where subassemblies are arranged on a harness assembling table to form a wiring harness.

A state of a subassembly laid on a harness assembling table is shown in FIG. 33 and a corresponding wire laying procedure is shown in TABLE-4.

TABLE 4

ORDER CONTENTS OF OPERATION

| | |
|---|---|
| 1 | Pass wires from connector C1 through a specified U-shaped jig |
| 2 | Pass wires from connector C2 through a specified U-shaped jig |
| 3 | Lay wires connected with connector C3 and free terminals along specified paths |
| 4 | Pass wires from connector C3 through a specified U-shaped jig |
| 5 | Lay wires connected with free terminals to the vicinity of connector C4 |
| 6 | Pass wires from connector C5 through a specified U-shaped jig |
| 7 | Lay wires connected with connector C4 along a specified path |
| 8 | Pass wires from connector C4 through a specified U-shaped jig |
| 9 | Insert free terminal connected with connector C2 into cavity ⑤ of connector C4 |
| 10 | Insert free terminal connected with connector C1 into cavity ① of connector C4 |

Figure 34:
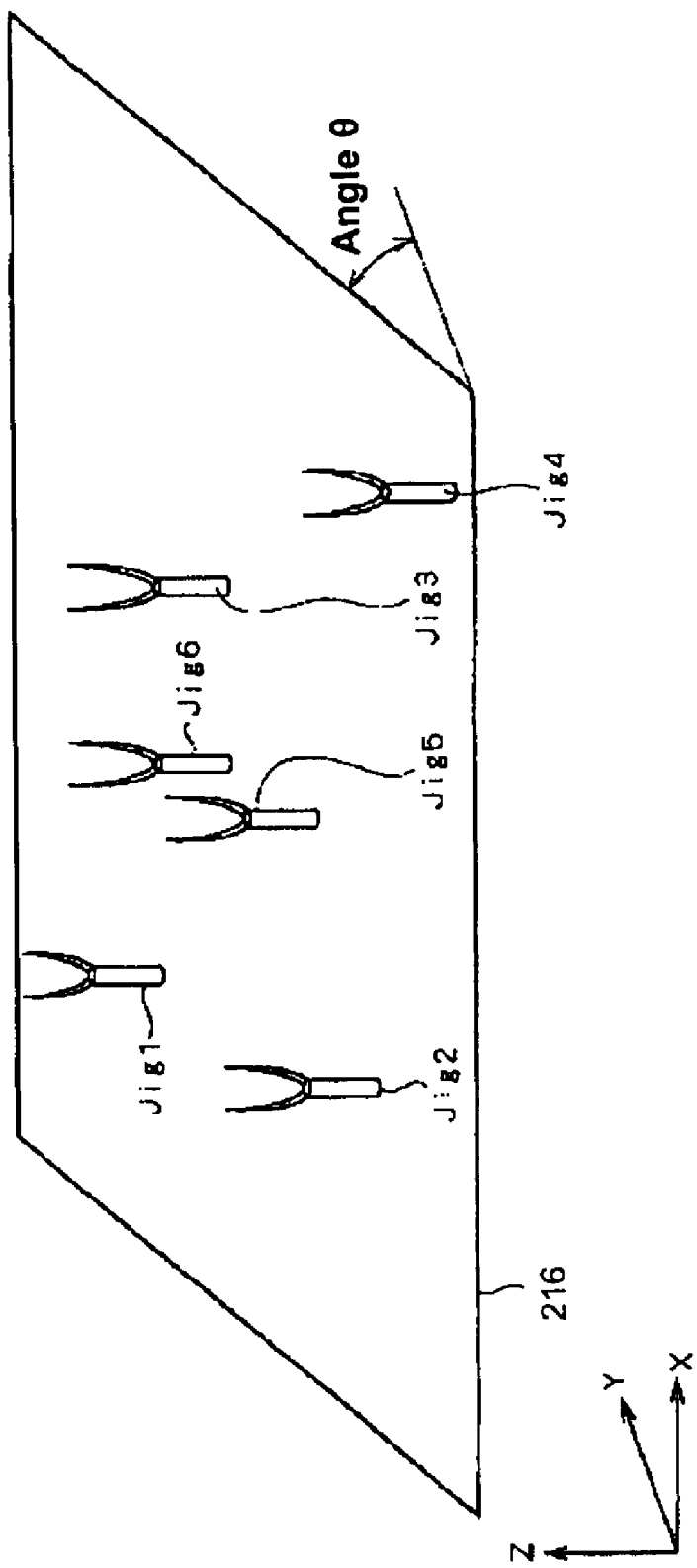
FIG. 34 is a perspective view showing the harness assembling table.

The harness assembling table 216 is used for assembling the wiring harness while being inclined only by an angle of θ with respect to a horizontal plane defined by X-axis and Y-axis as shown in FIG. 34. U-shaped jigs Jig1 to Jig6 for holding the wires and connectors C1 to C5 are mounted on the harness assembling table 216. The design of the harness assembling table 216 with respect to the arrangement of the single subassemblies Sub1, Sub2, Sub3, . . . and/or of the jigs Jig1, Jig2, Jig3, . . . may be designed according to a method as described with reference to FIGS. 24 to 50.

Figure 36:
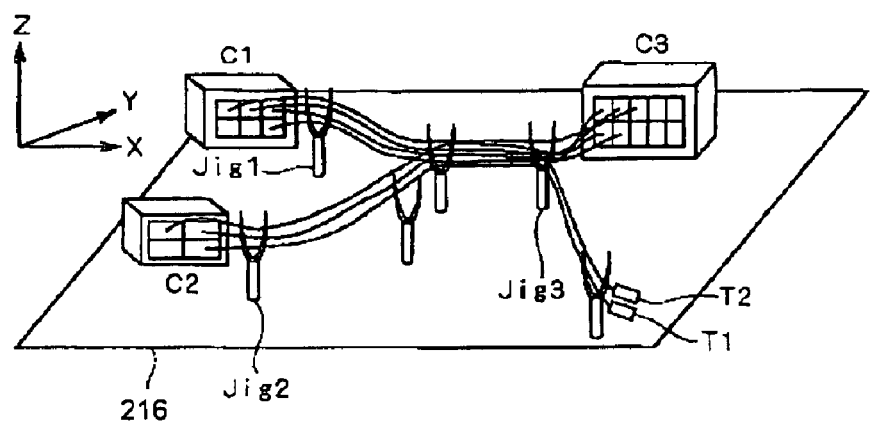
FIG. 36 is a perspective view showing the operation of arranging subassemblies on the harness assembling table.
Figure 37:
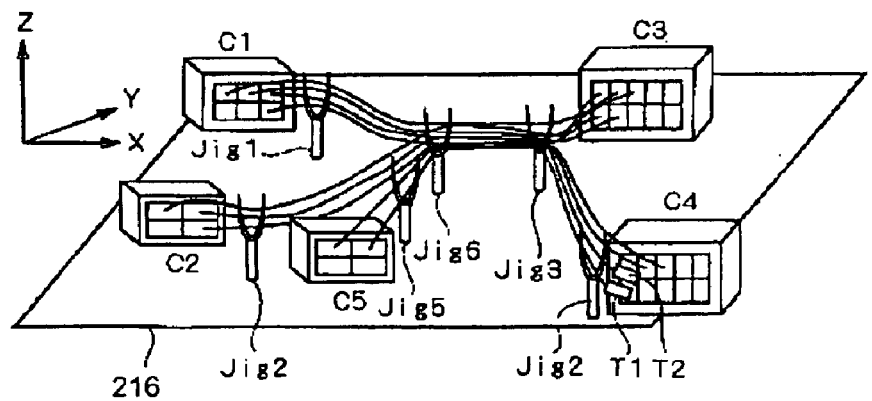
FIG. 37 is a perspective view showing the operation of arranging subassemblies on the harness assembling table.
Figure 38:
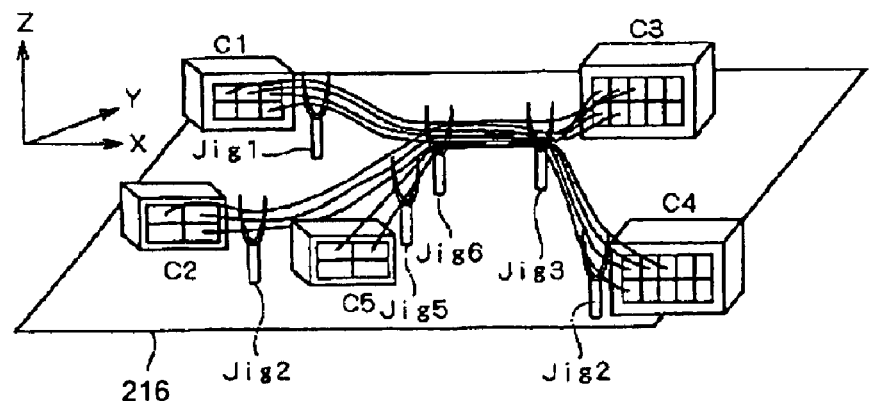
FIG. 38 is a perspective view showing a state where the wiring harness is formed by arranging the subassemblies on the harness assembling table.

As shown in TABLE-4, the wires connected with the connector C1 of the subassembly shown in FIG. 28 are passed through the U-shaped jig Jig1 on the harness assembling table 216. Similarly, the wires connected with the connector C2 of the subassembly are passed through the U-shaped jig Jig2. Subsequently, the wires connected with the connector C3 and the wires having free terminals are laid along specified paths, and the wires connected with the connector C3 are passed through the U-shaped jig Jig3. Then, as shown in FIG. 36, the wires connected with the free terminals T1, T2 are laid near the connector C4. Subsequently, the wires connected with the connector C5 are passed through the specified U-shaped jig Jig5. The wires connected with the connector C4 are laid along a specified path and are passed through the specified jig Jig4. Thereafter, as shown in FIG. 37, the free terminal T2 extending from the connector C2 is inserted into a specified cavity of the connector C4, and the free terminal T1 extending from the connector C1 is inserted into another specified cavity of the connector C4, with the result that a state of FIG. 38 is attained.

The on-the-board assembling procedure information is generated assuming the procedure of these manual operations. The on-the-board assembling procedure information at this time (see FIG. 37) is as shown in TABLE-5 below.

TABLE 5

| SERIAL NO. | SUBASS NO. | OPERATION | PART CODE | CIRCUIT NO. | TERMINAL SYMBOL | ... |
|---|---|---|---|---|---|---|
| 001 | 001 | wire laying | C1 | | | |
| 002 | 001 | wire laying | C2 | | | |
| 003 | 001 | wire laying | C3 | | | |
| 004 | 002 | wire laying | C5 | | | |
| 005 | 002 | wire laying | C4 | | | |
| 006 | 001 | terminal insertion | C4 | a14 | A | |
| 007 | 001 | terminal insertion | C4 | a17 | A | |

TABLE-5 defines that the wires are laid for the connectors C1 to C3 of the subassembly 001 in the rows of the serial Nos. of 001 to 003; the wires are laid for the connectors C5, C4 of the subassembly 002 in the rows of the serial Nos. 004, 005; and the A-terminals of the specified circuits are inserted into the connector C4 of the subassembly 001 in the rows of the serial Nos. of 006 and 007. This on-the-board assembling procedure information is formed into the database as indicated by DB1B in FIG. 37.

After the assembling procedure information sampling step (Step S224) shown FIG. 24 is completed in this way, the full-size design data and the assembling procedure information are received by a 3D simulation system of another computer system via a specified network by a method such as an FTP. Thereafter, the 3D shape data of the subassemblies and that of the wiring harness on the harness assembling table (including the assembling board and the U-shaped jigs) in the virtual 3D space are generated successively in this computer system, and are displayed on a display (Step S226).

The operation in this Step is described, starting with the 3D shape data of the subassemblies, which may be generated by a method or system as described with reference to FIGS. 1 to 13.

First, the part code (C3, 2) is obtained based on the serial No. (001) of the subassembly assembling procedure information DB1A shown in FIG. 26 and TABLE-3.

Subsequently, the 3D shape information of the connector C3 is retrieved from the 3D shape information DB2 of the respective parts shown in FIG. 26, and this 3D shape is displayed on a screen of the display (not shown) of the computer system. A display position of the connector C3 on the screen of the display is set arbitrarily using a pointing device (not shown) such as a mouse, and the connector C3 is displayed such that a circuit insertion surface where the cavities of the connector C3 are formed is faced forward.

The circuit No. (a15, 1) and the terminal symbol (B) then are obtained based on the serial No. (002) of the subassembly assembling procedure information DB1A (see FIG. 26 and TABLE-3). An attribute information of the circuit a15 is retrieved and obtained from the circuit information of the full-size design information DB3 shown in FIG. 26. In this way, the data on the wires, the terminals, the connectors into which the terminals are to be inserted, and the cavity Nos. can be obtained.

After various pieces of information are thus obtained, the 3D shape data of the circuit a15 is generated in the virtual space and displayed on the display 11 (see FIGS. 1 and 30). In particular, a full-size 3D wire having a pipe-like shape is generated and displayed using the information on the diameter, color and length of the wire.

Actual shape data or simplified shape data (e.g. rectangular parallelepiped) are registered beforehand as the 3D shape of the terminals based on the terminal code information of both A-terminal and B-terminal of the circuit a15 (also other circuits), and these registered data are connected with the opposite ends of the wire data (see FIG. 30).

The terminal at the B-end of the circuit a15 to be inserted then is brought to the vicinity of the shape data of the connector C3. This state is displayed on the screen of the display 11 as shown in FIG. 30.

Figure 39:
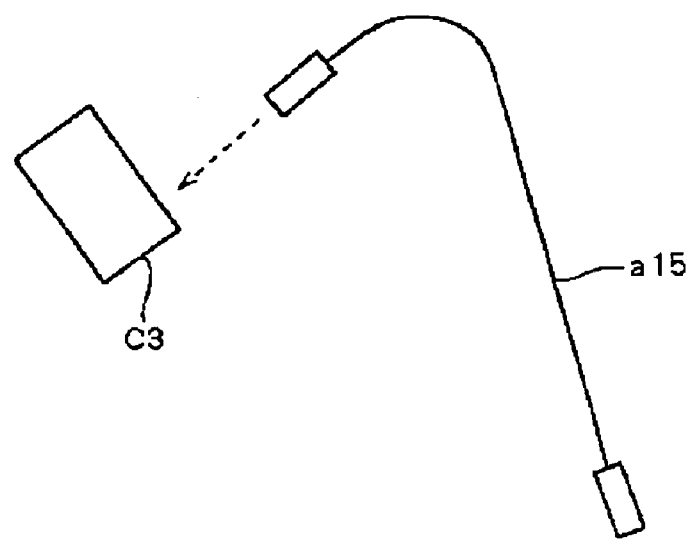
FIG. 39 is a perspective view showing the subassembly assembling operation.

Next, a trace of movement from the center of the leading end of the B-terminal of the circuit a15 as a reference end toward a center point of the corresponding cavity of the connector C3 is set (see FIG. 39). In other words, a general trace of operation by human hands or other operating means is measured and inputted using a pointing device such as a mouse 13. Thus, moving images can reproduce a state approximate to an actual operation. Although a speed at which the trace of operation is followed is set at a value based on an actually measured value, there is also a function of arbitrarily changing or inputting such a speed.

In the serial Nos. of 003 and succeeding numbers of the subassembly assembling procedure information DB1, the pieces of the procedure information are obtained and the method is repeated. Thus, a virtual assembling operation of the subassembly shown in FIG. 28 proceeds by the calculation of the computer system (see FIG. 31) as described with reference to FIGS. 1 to 13.

Figure 40:
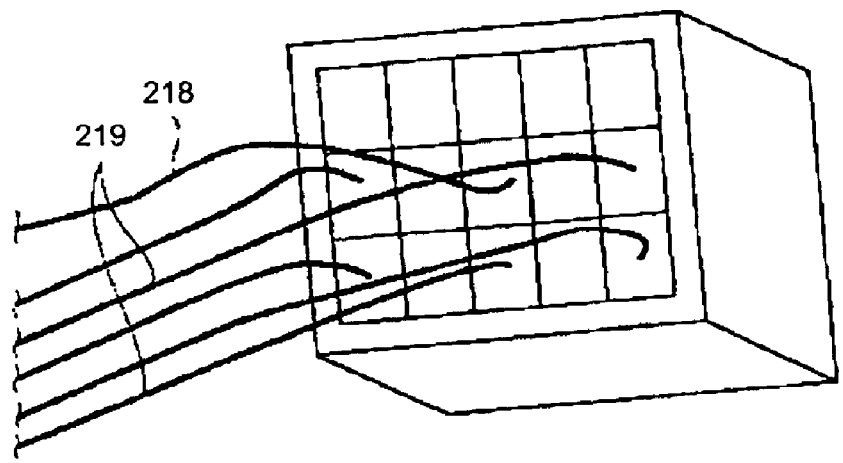
FIG. 40 is a perspective view showing the subassembly assembling operation.

Later-inserted circuits should avoid the circuits inserted earlier. Thus, a trace of insertion of the terminal of a circuit 18 to be inserted later is selected and set so as not to interfere with circuits 19 inserted earlier. An example shown in FIG. 40 is a simulation of the circuit insertion into the multi-contact connector. The position of the cavity into which the later-inserted circuit 18 is to be inserted is at the center of the connector, and the circuits 19 already are inserted into the cavities around the former cavity. Thus, a supplementary operation of avoiding the circuits 19 inserted earlier is required. Poor operability can be displayed visually when moving images are reproduced on the display. Similarly, the insertion of the circuits all to a15 into the corresponding cavities of the connectors C1, C2 is displayed virtually.

Upon completion of all the procedures, the virtual assembling of the corresponding subassembly (001) is completed and an image is displayed on the screen of the display as shown in FIG. 32.

By representing the subassembly producing operation by the 3D virtual data by the above method without using an actual product, people in charge can objectively inspect whether the subassembly producing procedure decided by the research engineer is optimal and improve if necessary while looking at the display screen displaying the virtual operation. As a result, an optimal producing procedure can be decided or designed sooner.

Further, by using the traces of operation and the actually measured values as the operation speed, the operation steps can be understood as if an actual operation were performed and the remedy of the operation can be investigated for improved operation efficiency.

The work table 213 shown in FIG. 29 is installed and the cases 211, 212 for accommodating the wires (a11, a12, . . . ) and the connectors (C1, C2, . . . ; b11, b12, . . . ) as components of the subassemblies are provided in the actual subassembly producing operation by human hands. Thus, operability including the layout of the work table 213 and the trays 211 and cases 212 is studied. In other words, the arrangement of the trays 211 and cases 212 is investigated so that the wires can be drawn out of the trays 211 and the connectors can be taken out of the cases 212 in a shorter time. This simulation can be carried out to approximate an actual operation by generating the 3D shape data of the work table 213, the trays 211 and cases 212 and the like and linking them with the simulation data of the subassembly producing procedure.

Next, a preferred method is described for virtually arranging and assembling the subassemblies, the independent parts and the like on the harness assembling table 216 in the computer system using the 3D shape information DB2, the full-size design information DB3 (see FIG. 27) and the on-the-board assembling procedure information DB1B which are stored as databases in the storage device of the compute system.

As shown in FIG. 34, the harness assembling table 216 is imaged and displayed on the display while being inclined by an angle θ with respect to the horizontal plane defined by X-axis and Y-axis by an empirical rule conforming to an efficient actual operation.

The subassembly No. (001), the type of the operation (wire laying) and the part code (C1) are obtained based on the serial No. (001) of the on-the-board assembling procedure information DB1B shown in FIG. 27 and TABLE-5. This subassembly No. (001) means the subassembly shown in FIG. 28.

The composition information of the subassembly No. (001) is obtained from the subassembly information of the full-size design information DB3.

Figure 35:
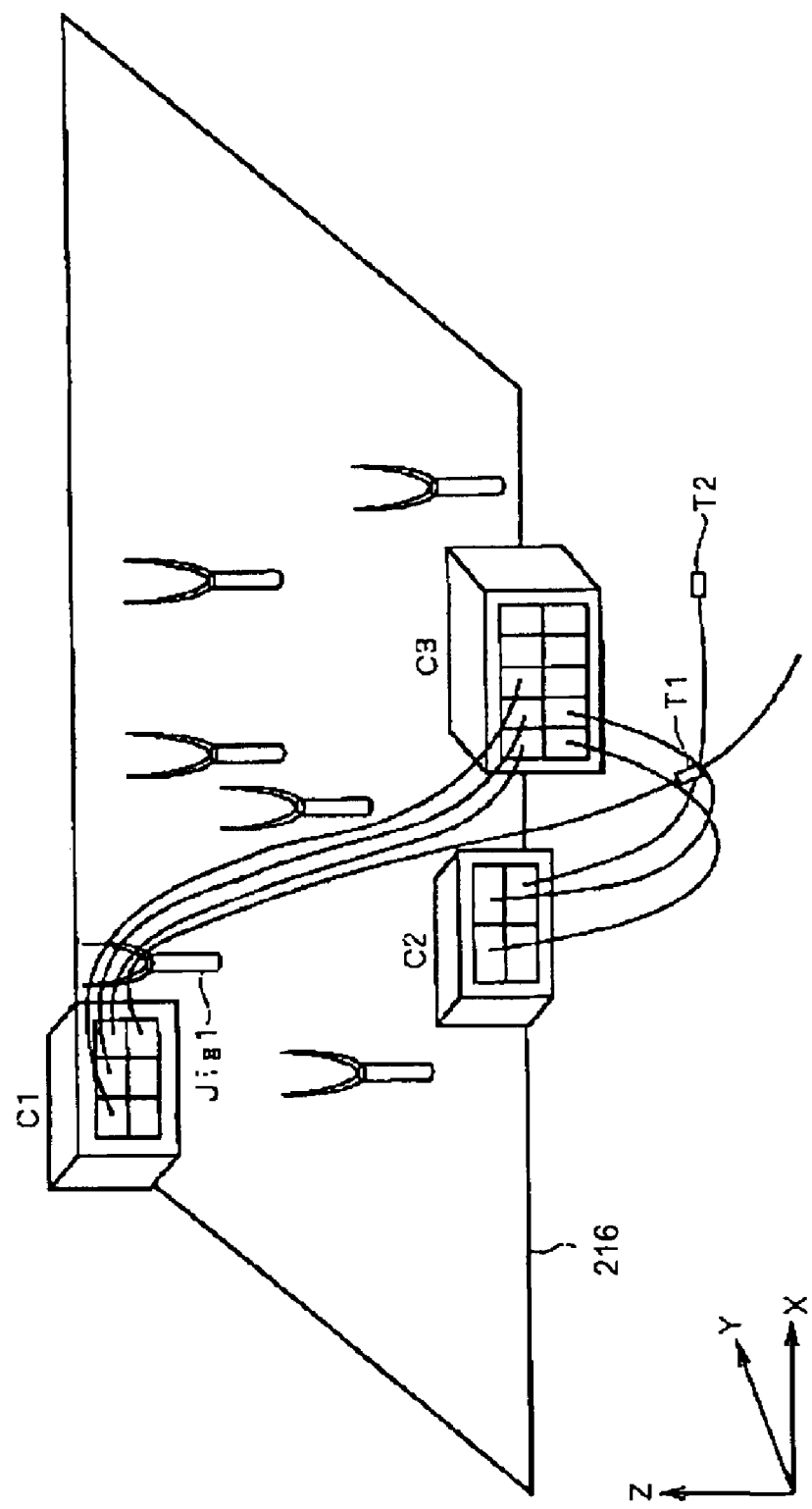
FIG. 35 is a perspective view showing an operation of arranging subassemblies on the harness assembling table.

Subsequently, the node information of the connector C1 is obtained, and the connector C1 of the subassembly No. (001) is imaged in a 3D shape while being positioned at the specified node coordinates. The construction of the subassembly No. (001) connected with the connector C1 is imaged as shown in FIG. 35. At this time, the components other than the connector C1 actually hang down due to gravity, and they are imaged in consideration of such an influence. Again, for this purpose, a method based on the one described with reference to FIGS: 1 to 13 may be used.

Subsequently, the subassembly No. (001), the type of the operation (wire laying) and the part code (C2) are obtained based on the serial No. (002) of the on-the-board assembling procedure information DB1B (see TABLE-5). The connector C2 is positioned at specified node coordinates, and all the circuits all to a17 (see FIG. 28) extending from the connectors C1 and C2 are retrieved from the composition information of the subassembly No. (001). The wire layout paths of the respective circuits a11 to a17 are obtained from the span information of the full-size design information DB3, and the passing node coordinates of the respective circuits a11 to a17 are obtained.

Any circuit connecting the two positioned connectors C1, C2 is imaged to follow the wire layout path precisely while the other circuits are represented in an arbitrary manner.

Subsequently, the subassembly No. (001), the type of the operation (wire laying) and the part code (C3) are obtained based on the serial No. (002) in TABLE-5. The connector C3 is positioned at specified node coordinates. Then the circuits connecting the connectors C1 and C3 and connecting the connectors C2 and C3, and the wire layout paths thereof are obtained, and the connecting circuits are displayed on the display. The connector C4 (see FIGS. 37 and 38) into which the free terminals T1, T2 are to be finally inserted, the node coordinates thereof, and the wire layout paths to the connector C4 are obtained from the circuit information of the full-size design information DB3, and a display as shown in FIG. 36 is made on the display.

Subsequently, the subassembly No. (002), the type of the operation (wire laying) and the part code (C5) are obtained based on the serial No. (004) of the on-the-board assembling procedure information DB1B (see TABLE-5). Further, the subassembly No. (002), the type of the operation (wire laying) and the part code (C4) are obtained based on the serial No. (005) of the on-the-board assembling procedure information DB1B (see TABLE-5). Then, the other subassembly No. (002) is imaged by a procedure similar to the above. A state at this time is displayed on the display as shown in FIG. 37.

Thereafter, the subassembly No. (001), the type of the operation (terminal insertion), the part code (C4), the circuit No. (a17) and the terminal symbol (A) are obtained based on the serial No. (006) of the on-the-board assembling procedure information DB1B (see TABLE-5). Likewise, the subassembly No. (001), the type of the operation (terminal insertion), the part code (C4), the circuit No. (a14) and the terminal symbol (A) are obtained based on the serial No. (007) of the on-the-board assembling procedure information DB1B (see TABLE-5).

The numbers of the cavities into which the A-terminals of the respective circuits are to be inserted then are retrieved based on the circuit Nos. of the full-size design information DB1B, the procedure of inserting the terminals into the connector C4 is displayed by moving images and a final display will be as shown in FIG. 38.

A state where the subassemblies, the independent parts and the like are arranged on the harness assembling table 216 by the above procedure is represented as 3D moving images. An operation of assembling a similar wiring harness on the harness assembling table is observed, data thereof are collected for the traces of operation and the operation speed, and the speed of the operation and a behavior characteristic of the product shape approximate to an actual product are generated as the 3D shape data and simulated.

Figure 41:
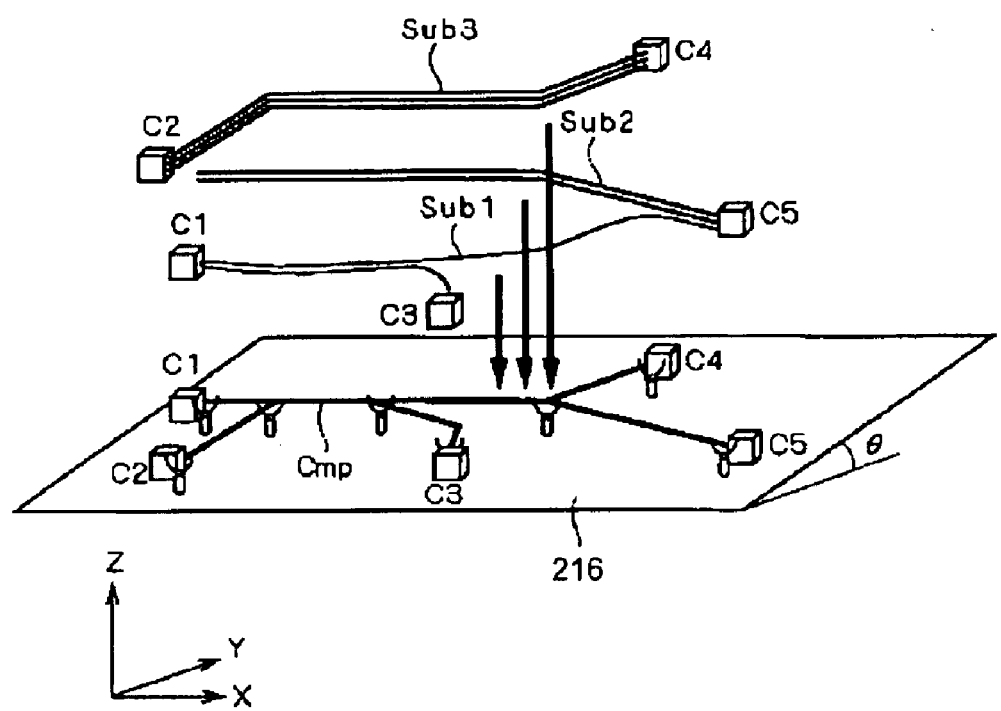
FIG. 41 is a perspective view showing a state where a subassembly assembling procedure is displayed on a display.
Figure 42:
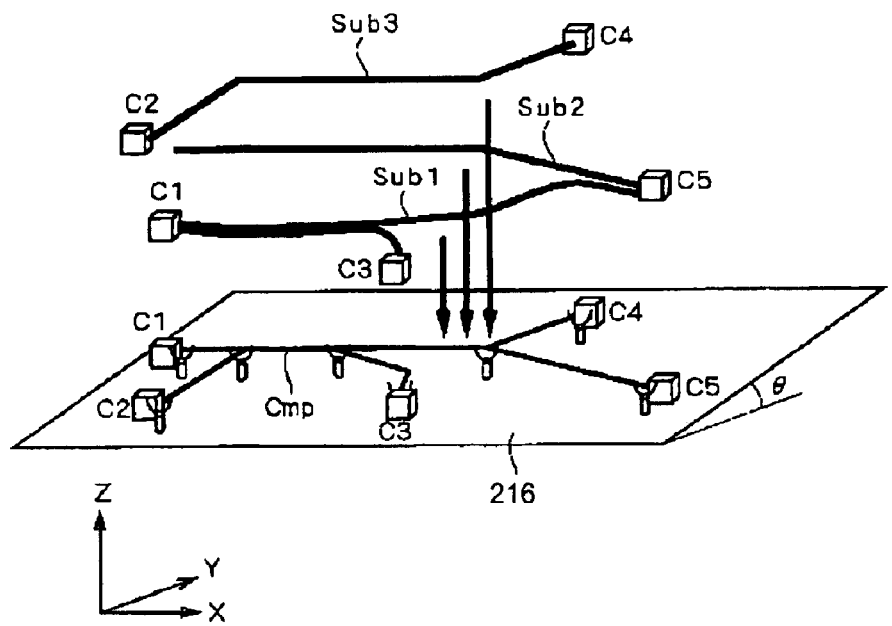
FIG. 42 is a perspective view showing a state where the subassembly assembling procedure is displayed on the display.

Based on the design information in which the wiring harness as a final product is divided into a plurality of subassemblies, the 3D virtual data of all the subassemblies are generated (e.g. by the method as described with reference to FIGS. 1 to 13), and all the 3D virtual data including the harness assembling table and the jigs generated based on the full-size design information are displayed (see FIGS. 41 and 42).

The wires are represented in the display one by one as shown in FIG. 41 and the wires, the connectors and other components of the same subassembly are displayed in the same color. Different subassemblies have different display colors. Instead of representing the wires one by one, aggregates of wires are displayed collectively in FIG. 42. Whether the wires are represented one by one, as shown in FIG. 41, or collectively, as shown in FIG. 42, can be selected easily using a specified selection menu.

The assembling procedure is designed so that the subassemblies are assembled in the order of Sub1, Sub2, Sub3 to form a wiring harness as a final product Cmp. Thus, the virtual data of respective subassemblies Sub1, Sub2, Sub3 are displayed in a three-dimensional manner while arbitrarily changing only the coordinate value of the vertical axis (Z-axis) of the virtual 3D space as shown in FIGS. 41 and 42. Further, the display order of the respective subassemblies Sub1, Sub2, Sub3 can be changed freely by dragging the images thereof using a pointing device, such as a mouse 13. Further, the shapes of the respective subassemblies Sub1, Sub2, Sub3 and the detailed shapes of the parts forming these subassemblies can be seen realistically and visually in terms of size, color and shape from every 3D angle.

Normally, there is a limit in the size of the subassemblies efficiently handled by one worker. For example, the number of connectors and the number of wires are desirably less than 5 and less than 20, respectively. If the subassemblies Sub1, Sub2, Sub3 have excessively large sizes, it results in reduced production efficiency. However, since the forms of all the subassemblies Sub1, Sub2, Sub3 can be computed and/or seen in detail, it can be detected automatically and immediately if the subassemblies are improper.

Ease in laying the respective subassemblies Sub1, Sub2, Sub3 on the harness assembling table 216 can be judged. The more easily the subassemblies are laid, the better the production efficient can be improved.

It usually is desirable to lay the wires linearly from left side to right side, and it is undesirable to have such a path that, for example, returns in an opposite direction, has an excessively large number of branched points, and/or has branches extending in many directions. Such points can be judged immediately and automatically by simulating and/or looking at the visual shapes of the respective subassemblies Sub1, Sub2, Sub3.

Overlapping paths invariably exist if the shapes of the respective subassemblies Sub1, Sub2, Sub3 obtained by dividing the wiring harness into a plurality of sections are placed one over another. More the overlapping paths require more overlapping operations by the worker and reduced production efficiency. Thus, it is effective to investigate the divided forms such that a sum of the overlapping paths is minimized. The shape data of the subassemblies Sub1, Sub2, Sub3 can be moved freely and placed one over another in this embodiment, and hence the investigation can be efficiently made.

Free terminals need to be inserted into the connectors on the harness assembling table 216 later on (see T1, T2 in FIG. 37). However, the free terminals may be caught, twisted and/or deformed by the other circuits, terminals or jigs (see Jig1 to Jig6 in FIG. 37) when the subassemblies Sub1, Sub2, Sub3 are laid on the harness assembling table 216. The worker is obliged to correct the free terminals, which leads to a poor operability. Theoretically, more free terminals (T1, T2 in FIG. 28) exist when the wiring harness is divided into smaller subassemblies.

The number of free terminals immediately can be confirmed visually for each of the subassemblies Sub1, Sub2, Sub3, and the subassemblies and connectors that have many free terminals can be pointed out. Investigation can concentrate on improvements for the free terminals.

As shown in FIGS. 41 and 42, the respective subassemblies Sub1, Sub2, Sub3 are placed one over another at a position distanced from the position of the 3D shape of the final product Cmp in the assembling procedure decided by the process design. Successively laying the respective subassemblies Sub1, Sub2, Sub3 in one direction, for example, from left side to right side (or from upper side to lower side) is optimal to minimize unnecessary operations by the worker.

Figure 43:
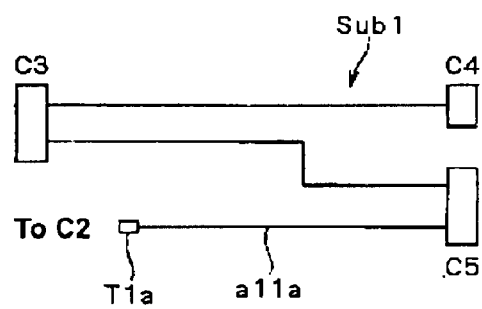
FIG. 43 is a diagram showing an example of the subassembly.

For example, a subassembly Sub1 in FIG. 43 has connectors C3 to C5 and a free terminal T1$a$ to be connected with another connector C2. Usually, one end of a circuit a11$a$ is connected with the connector C5, and then a free terminal T1$a$ is mounted on the other end of the circuit a11$a$. However, the circuit connected with the free terminal T1$a$ extends from the connector C5 in a direction (from right side to left side) opposite from the operating direction from left side to right side.

Figure 44:
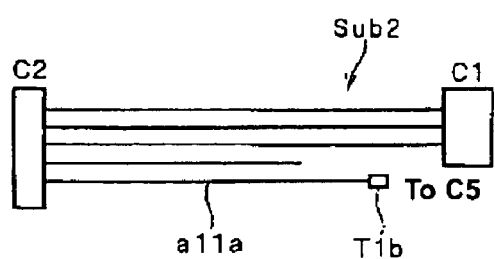
FIG. 44 is a diagram showing another example of the subassembly.

In such a case, the operating direction from left side to right side is realized in the subassembly Sub2 by connecting the circuit a11$a$ with the connector C2 of the subassembly Sub1 to change the internal constructions of the subassemblies Sub1, Sub2 as shown in FIG. 44. Alternatively, the connector C5 may be included in the subassembly Sub2 instead of being included in the subassembly Sub1. The constructions of the subassemblies can be restudied easily in this way.

Such a change is converted immediately into the 3D virtual information and the result is displayed on the screen 11 by changing the content of the composition information of the subassembly to a specified content. Thus, the subassemblies put in an improper order are detected immediately and automatically to study improvements.

The production designing system (IHS) preferably carries out a unitary administration and a history administration of the generated (inputted) full-size design information, and is linked with various other production administering systems for information administrations. Accordingly, if the division of the wiring harness into the subassemblies is changed, it is necessary to transmit the resulting information to the IHS, to generate and store a new information file in which history code information of the full-size design information is renewed.

Figure 45:
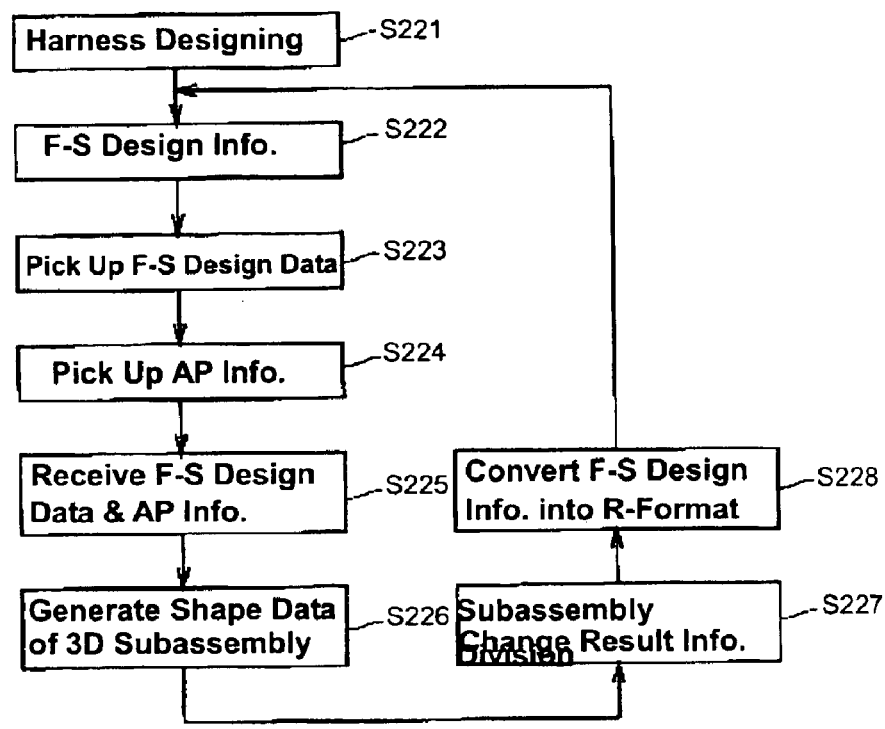
FIG. 45 is a flow chart showing the wiring harness designing method according to the embodiment of the invention.

In this case, harness designing proceeds but returns from Step S226 to Step S222 of the flow chart of FIG. 24, as shown in FIG. 45. Specifically, an operator using a keyboard and/or a mouse inputs the subassembly division change result information in Step S227, and this change result information is data-converted into a receiving format of the full-size design information in Step S228. Thereafter, the resulting data is transferred via a network (e.g. a LAN) for a feedback to the full-size design information of the IHS.

This method allows the operator to change the full-size design information easily while looking at the screen. Adjustments, such as an automatic extension of the circuit having no sufficient length, can be made automatically by the computer system. Thus, trial and error testing can be carried out virtually, and the quality of the trial product design can be improved at an early stage without producing actual trial products. Therefore, design of the wiring harness can be made easier by reducing the number of productions of the actual trial products and the number of operation steps.

The virtual data of the subassemblies Sub1, Sub2, Sub3 are displayed and moved arbitrarily along the vertical axis (Z-axis) of the virtual 3D space as shown in FIGS. 41 and 42. However, they may be displayed and moved arbitrarily, for example, in a direction normal to the assembling table 216.

The 3D shapes of the subassemblies are movable in the specified direction on the harness assembling table. Thus, the subassembly assembling order can be displayed understandably at a glance by moving the display position of the subassembly in one direction in accordance with the subassembly assembling order.

The on-the-board assembling procedure information for assembling the subassemblies on the harness assembling table and the subassembly assembling procedure information that defines procedures for assembling the respective wires and other parts of the subassemblies is inputted between the full-size design data generating step and the 3D shape displaying step. Additionally, the operation of assembling the subassemblies is represented and displayed by moving images on the 3D image of the harness assembling table in accordance with the procedure defined by the on-the-board assembling information in the 3D shape displaying step. Thus, the operation process on the harness assembling table can be understood as if it were actually performed, and such a virtual process can be used to study improvements in the operation for better operation efficiency.

The wiring harness designing system enables 3D wiring harness design data A (see, e.g. FIG. 52) to be displayed in a virtual 3D space on the display device 11 to virtually assemble and design the wiring harness and the assembling board therefor.

The harness design data A generated by the wiring harness designing system and 3D assembling board design data D (see, e.g. FIG. 52) are saved in the storage device 15. The board design data D also include jig data E1, E2, E3, . . . (reference numeral "E" is given when these data are named collectively) (see FIG. 52) corresponding to assisting jigs provided on the board for holding the wiring harness on or above the assembling board. These jig data E may be computed by a method described with reference to FIGS. 16 to 23.

Figure 52:
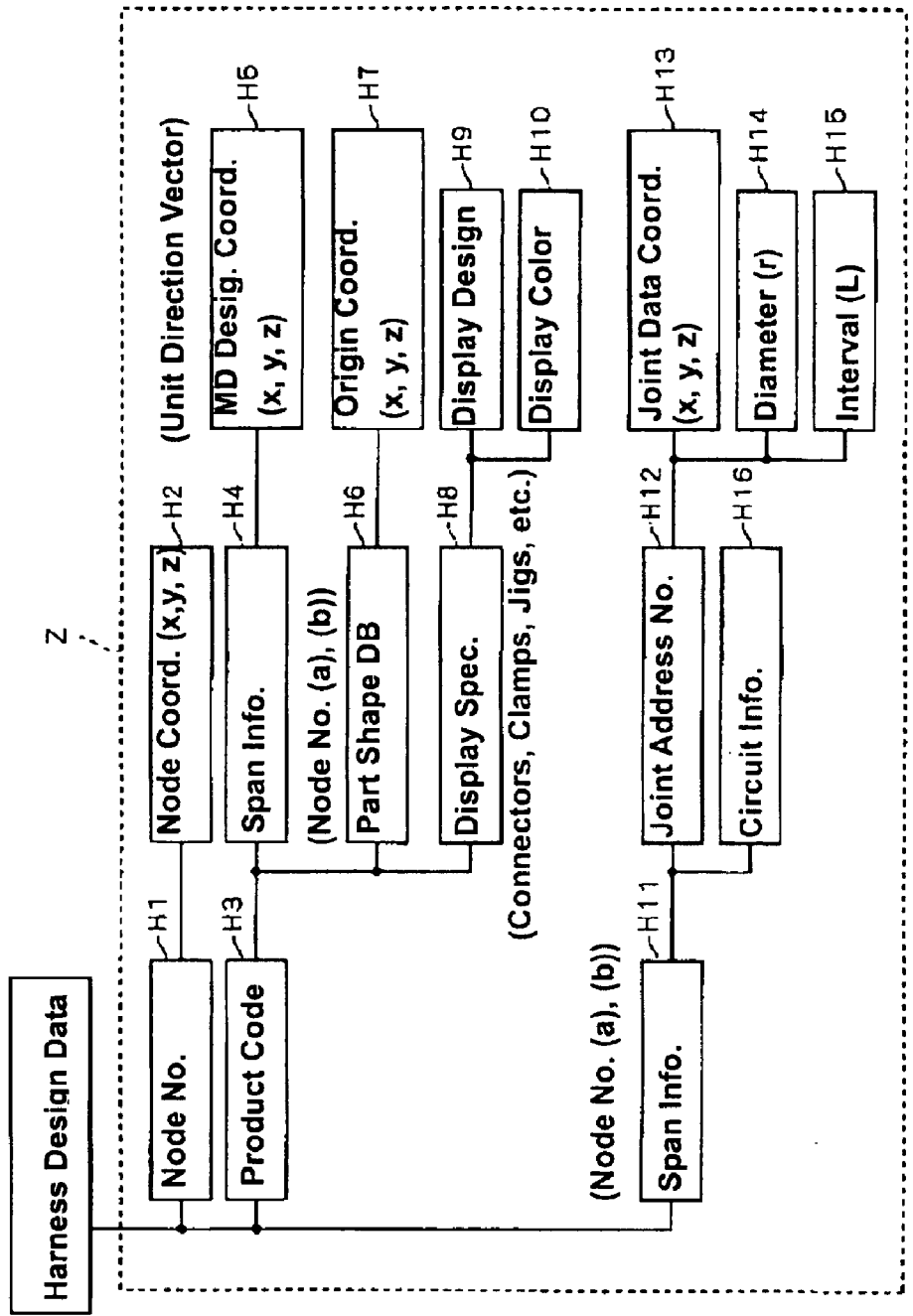
FIG. 52 is a diagram showing a data configuration of a harness design data.

A method for generating the harness design data A and the contents thereof are described above, and the harness design data so constructed has, for example, a data configuration Z as shown in FIG. 52. Data H1 in this data configuration Z include information on the numbers of the respective nodes at specified intervals along the wire path of the harness design data; and data H2 below the data H1 include information on the coordinates of the corresponding nodes in the virtual 3D space.

Data H3 to H10 include accessory data for the accessories to be attached to the harness design data. Data H3 include part codes for specifying the accessories; data H4 include a span information of the accessory data; data H6 include information on the 3D shapes of the accessory data; data H7 include information on the coordinates of mounting origins as references for specifying the display positions of the accessory data in the virtual 3D space; and data H5 include information on unit vectors for specifying a mounting method and for specifying a display direction when the accessory data is displayed in the virtual 3D space. Data H8 to H10 include information on how the accessory data are displayed (e.g. display specifications H8, display designs H9 and display colors H10).

Data H11 to H15 include span information corresponding to the wire path of the harness design data. Data H11 include information for specifying the corresponding spans in the harness design data A (including an information on the corresponding node numbers); data H12 include information on the data addresses of the wire segments 22 (joints) of the respective spans; data H13 include information for specifying the display coordinates and display methods (directions) of the respective wire segments 22 in the virtual 3D space; data H14 include information on the diameters of the respective spans; and data H15 include information on the length "a" of the respective spans or wire segments 22 or on the length L of the wire 21. Data H16 include information on the circuits formed by the respective spans. The harness design data A may comprise information on subassemblies generated by a method or system as described with reference to FIGS. 24 to 51.

In the wiring harness designing system according to this embodiment, the harness design data A preferably configured as above are displayed in the virtual 3D space on the display device 11 and are superimposed on the board design data D by the control of the computer 16. If the harness design data is changed by input made by the designer via the input device 14, a section of the harness design data A corresponding to a content of the change is corrected automatically; and a correction result is reflected automatically on display contents of the display device 11 and stored contents of the storage device 15.

Figure 53:
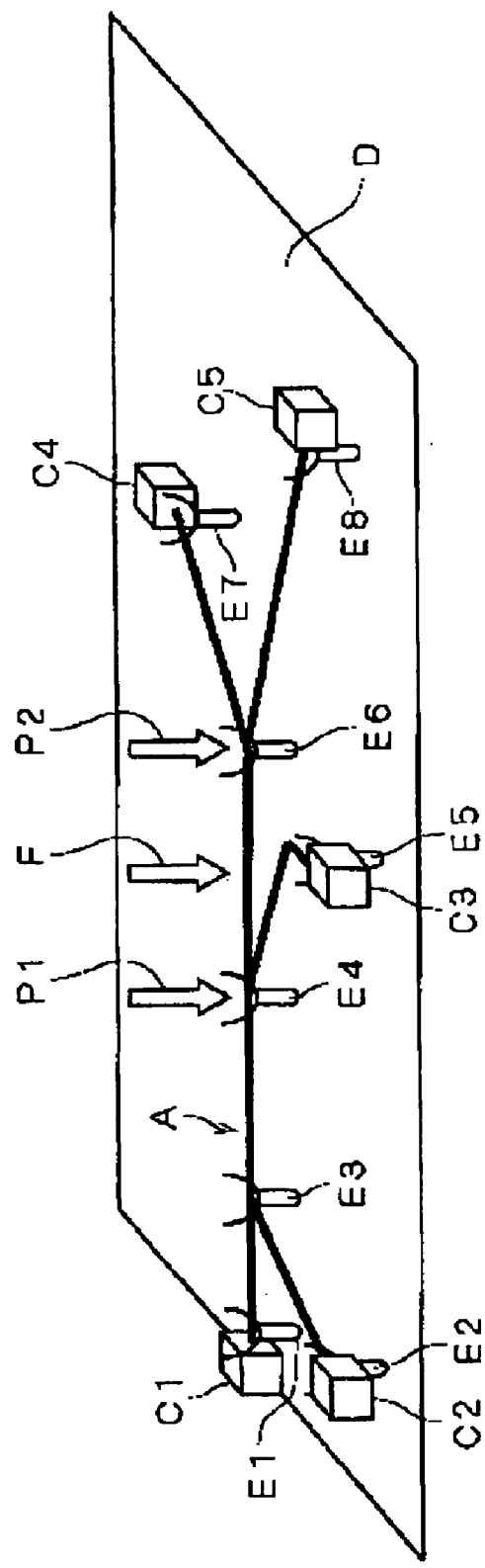
FIG. 53 is a perspective view showing a harness design data of a display mode developed in a plane.
Figure 54:
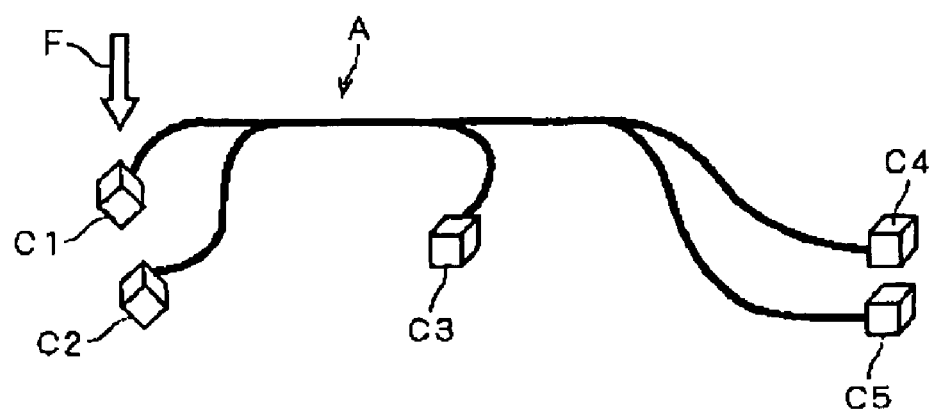
FIG. 54 is a diagram showing a harness design data of a display mode corresponding a layout in a vehicle body.

There are two display modes of the harness design data A, namely, a display mode in which data are developed in a plane as shown in FIG. 53 and a display mode in which data are deformed or displayed three-dimensionally as shown in FIG. 54 in the configuration in which the wiring harness can be laid in a vehicle body.

The harness design data A of the display mode shown in FIG. 53 corresponds to a state where the wiring harness is laid on or above the assembling board (including the jigs), and is used to attain improved productivity and quality of the wiring harness and to verify, for example, whether or not the assembling operation holds. C1 to C5 in FIG. 53 identify the accessory data of the connectors (merely "C" when they are named collectively). The harness design data A are displayed in FIG. 53 superimposed on the board design data corresponding to the assembling board. However, the display of the board design data can be deleted depending on the setting. The board design data D, including possible jig data E, may be generated by a method or system as described with reference to FIGS. 16 to 23. The harness design data A of the display mode shown in FIG. 54 is used to verify the mounted state of the wiring harness.

Figure 55:
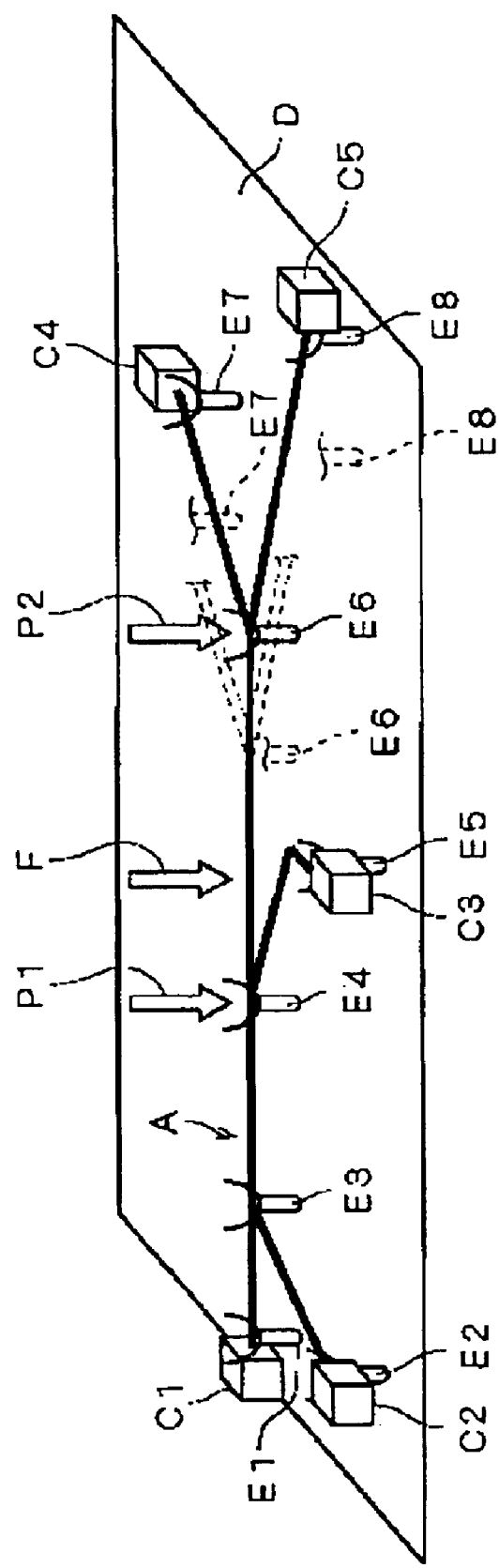
FIG. 55 is a perspective view showing a state where the length of a section of the harness design data of FIG. 53 is changed.

A case where a change is made to the harness design data A of the display mode is described with reference to FIG. 53. For example, a length between points P1 and P2 in a main part corresponding to the wire path of the harness design data A shown in FIG. 53 may be changed by an instruction inputted by a designer via the input device 14 (e.g. designation of a section whose length is to be changed, a designation of an amount of change, etc.). A correction is made by the corresponding processing of the computer 16 by moving the coordinates in the virtual 3D space of an end section of the harness design data A more toward an end than the changed section when viewed from a reference portion F as a reference of the harness design data A according to a changed amount of the length without changing the 3D shape of this end section (parallel movements, rotational movements and combinations of these movements) as shown in FIG. 55. The section of the harness design data A set as the reference portion F can be changed arbitrarily by the instruction inputted via the input device 14. For example, the origin coordinate position in the middle of the harness design data A is set as the reference portion F.

As the end section of the harness design data is moved, the coordinates of the corresponding jig data E6 to E8 included in the board design data D are moved according to the amount of the change in the length for corrections by the processing of the computer 16. These correction results are reflected immediately on the display contents of the display device 11 and the stored contents of the storage device 15.

Figure 56:
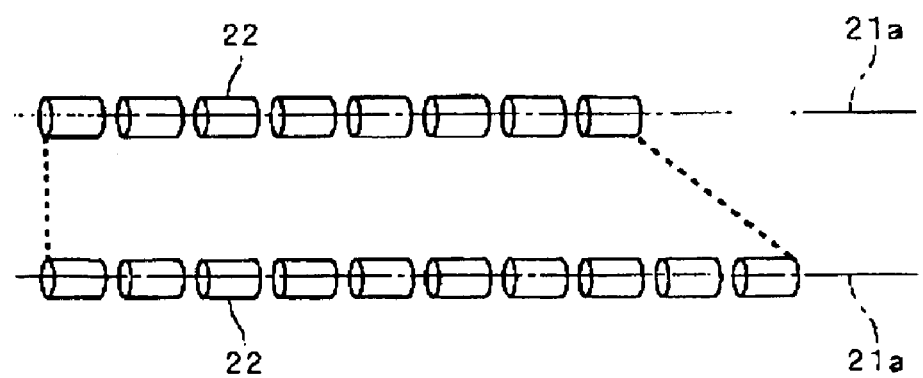
FIG. 56 is a diagram showing a state where the length of a section of the harness design data is increased or decreased by increasing or decreasing the number of the wire segments in this section.

The change in the length of a section of the harness design data A is made by inputting an instruction via the input device 14. This may involve changing the length by varying the number of the wire segments 22 included in that section as shown in FIG. 56 or changing the length by varying the length "a" of all or some of the wire segments 22 in that section. The designer selects the method to change the length.

Figure 57:
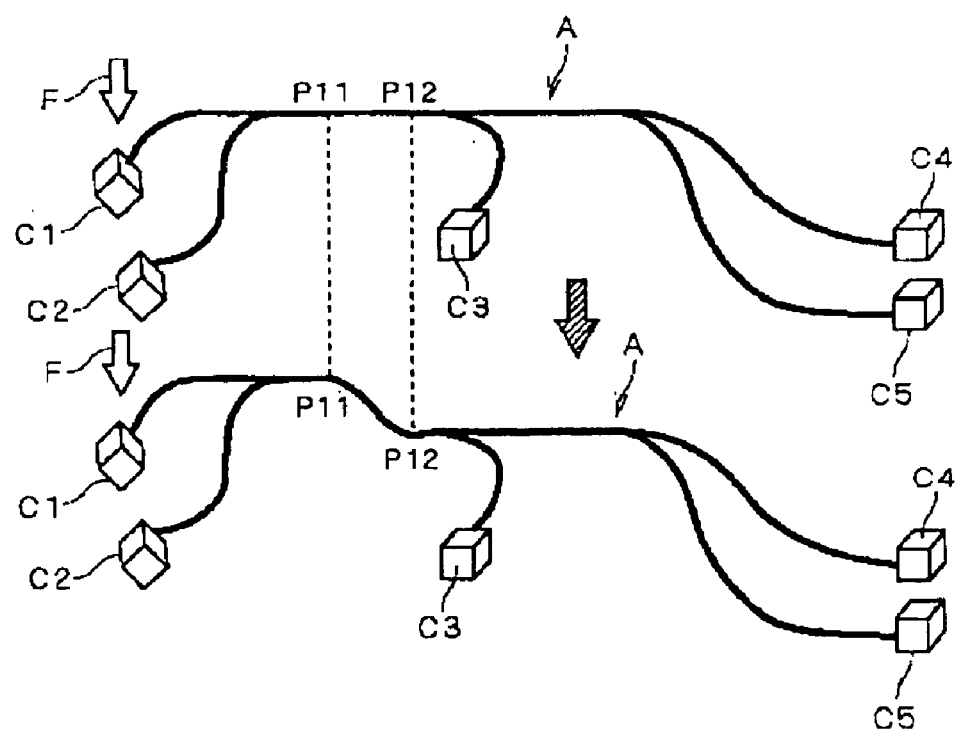
FIG. 57 is a diagram showing a state where the length and path shape of a section of the harness design data of FIG. 54 are changed.

A change also may be made to the harness design data A of the display mode, as shown in FIG. 54. For example, the length and path shape (including a twist degree) of a section between points P11 and P12 of the main part of the harness design data A may be changed e.g. by an instruction inputted by the designer via the input device 14 as shown in FIG. 57. Thus, a correction is made automatically by the corresponding processing of the computer 16 to move the coordinates in the virtual 3D space of an end section of the harness design data A located more toward a corresponding end than the changed section when viewed from a reference portion F according to a changed amount of the length and a changed content of the path shape without changing the 3D shape of this end section. This correction result is reflected immediately on the display contents of the display device 11 and the stored contents of the storage device 15.

Contents to be changed for the harness design data A may include changes in the accessory data. For example, the types of the jigs on the assembling board may differ depending on the types of the connectors. Thus, the accessory data C of a plurality of types of usable connectors are stored in correspondence with at least one type of jig data E applicable for the accessory data C. Accordingly, if the designer changes the accessory data C of the connector, information on the jig data E applicable for the accessory data C after such a change is read from the storage device 15 and displayed in a list format on the display device 11. The designer then selects jig data E from this list, and the old jig data E is replaced by the selected jig data E, and this correction result is reflected on the displayed contents of the display device 11 and the stored content of the storage device 15.

As a modification, the designer may change the accessory data of the connector. Thus, the computer 16 automatically selects the jig data E optimal for the accessory data C and replaces the old jig data E.

The storage device 15 stores harness design data A that have a common data configuration (e.g. data configuration Z shown in FIG. 52), that are mutually compatible with each other and that are related to each other. Basic harness design data A (e.g. harness design data A of FIG. 53) developed in a plane, and a harness design data A (e.g. harness design data A of FIG. 54) generated by the basic harness design data A in the virtual 3D space as described above and corresponding to a layout in a vehicle body are, for example, set as harness design data A related to each other. If necessary, harness design data A having a transitional shape created while the 2D shape of the basic harness design data A is transitioned to the 3D shape of the latter harness design data A may also be set.

If any of the harness design data A are changed by an instruction e.g. inputted via the input device 14, a section of these harness design data A relating to a content of the change is corrected automatically, and the content of the change and a content of the automatic correction are reflected automatically on the other harness design data A related to the changed harness design data A. For example, assume the harness design data of FIG. 53 and that of FIG. 54 are related to each other. If the length between the points P1 and P2 is changed for the harness design data A of FIG. 53, as shown in FIG. 55, by an instruction inputted via the input device 14. Then the harness design data A of FIG. 53 is corrected automatically according to the content of such a change. The length of a section of the harness design data of FIG. 54 corresponding to the section between the points P1 and P2 also is corrected automatically by the same amount of change as the harness design data A of FIG. 53. Additionally, the coordinates of an end of the harness design data A located more toward a corresponding end than the changed section when viewed from the reference portion F are corrected automatically by being moved according to an amount of the change in the length without changing the 3D shape of this end section.

Another example relates to a change of the accessory data C of connectors, covering parts (protectors, etc.), clamps and the like attached to the harness design data A of FIG. 53. Thus, the type of accessory may be changed, the mount position may be changed or the accessory may be added or deleted. The change may be made by an instruction inputted via the input device 14, and the content of such a change is reflected automatically on the related harness design data A of FIG. 54.

As described above, when the designer changes the harness design data A, a correction is made automatically, for example, by moving the coordinates according to the content of such a change for the corresponding sections of the harness design data A and the board design data D which are related to the content of the change of the changed section. The correction results are reflected automatically and immediately on the display contents of the display device 11 and the stored contents of the storage device 15. Thus, it is not necessary for the designer to correct all the data related to the content of the change via the input device 14, and the forms of the harness design data A can be confirmed immediately after the change. As a result, the wiring harness can be designed more efficiently.

Further, if any of the harness design data A related to each other is changed by an instruction inputted via the input device 14, a section of this harness design data A corresponding to the content of the change is corrected automatically, and the content of the change made in this one harness design data A also is reflected automatically on the other harness design data A related to this one harness design data A. Thus, plural related harness design data A can be changed easily at once. Data administration, such as data renewal (including corrections) and deletion, also can be performed easily.

The main part of the harness design data A corresponding to the wire path is formed by connecting a plurality of wire segments 22 along the wire path. Thus, the length of a specific section of the main part or the wire path can be changed easily by increasing or decreasing the number of the joints in the section or increasing or decreasing the length of the joints in the section, and a deformation characteristic of real wires can be represented realistically.

Moreover, if the length or path shape of the section of the harness design data is changed, a correction is made automatically by moving the coordinates in the virtual 3D space of the end section of the harness design data located more toward the corresponding end than the changed section when viewed from the reference portion of the harness design data according to the amount of the change in the length of the changed section or the changed content of the path shape without changing the 3D shape of the end section. Additionally, the coordinates of the jig data in the board design data and corresponding to the end section of the harness design data are changed according to the amount of the change in the length of the changed section of the changed content or the path shape. Further, if the accessory data in the harness design data are changed, the assisting jig data included in the board design data and related to the accessory data are corrected automatically.

Figure 58:
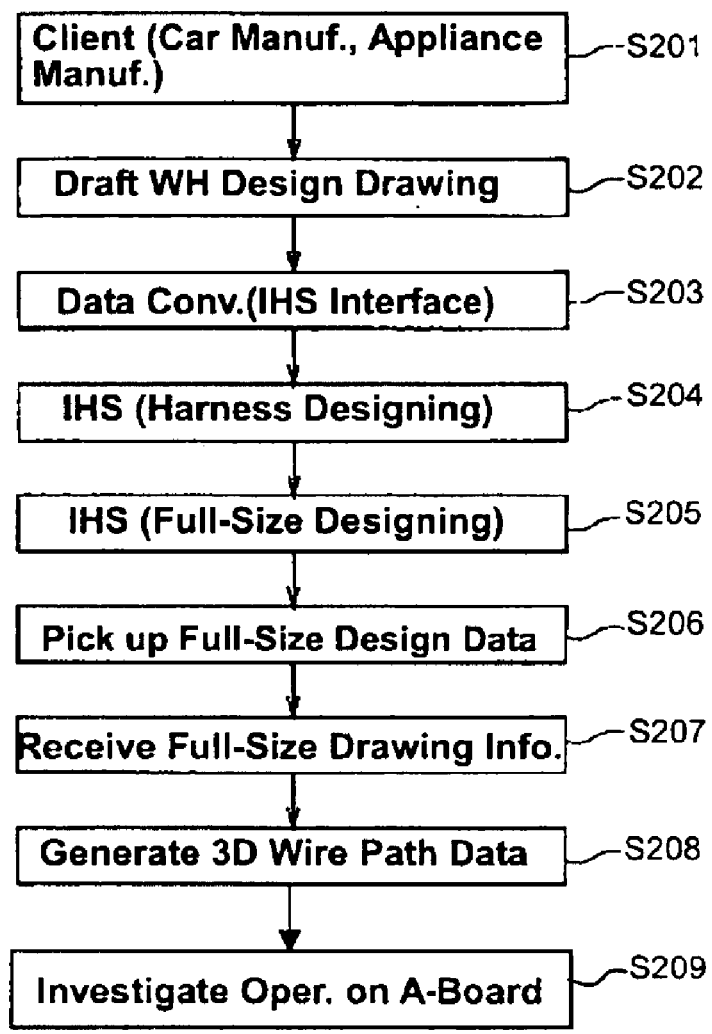
FIG. 58 is a flow chart showing a process of designing a wiring harness assembling board and a wiring harness by the wiring harness designing method according to a further preferred embodiment.

FIG. 58 is a flow chart showing a process of designing a wiring harness assembling board and a wiring harness according to a further embodiment of the invention, and Steps S201–S206 of FIG. 58 are identical to the Steps S01-S06 of the flow chart of FIG. 16. Thus, a further detailed description of those is omitted here.

In Steps S207 and S208, 3D wire path data are generated using the wiring harness designing system of FIG. 1 based on these pieces of information. First, in Step S207, the wiring harness designing system receives 2D full-size drawing design data obtained in Step S206 as full-size drawing information. Then, in Step S208, the 3D design data are generated. Here, the 3D design data are electronic data representing coordinates of 2D electronic data used to produce a wiring harness on a two-dimensional assembling board in the 3D space.

Dimensions, such as lengths between the branches of the wiring harness and the mount positions of connectors, are designed based on the 2D electronic data. A 2D drawing of the wiring harness is generated in the form of 2D electronic data using a design assisting software program such as a CAD, considering actual production of the wiring harness on the assembling board.

Next, in the computer 16, a coordinate axis (z-axis) normal to the coordinate plane of the inputted 2D electronic data is added to the 2D electronic data, and the resulting data are stored as a 3D design data in the storage device 15. The 2D electronic data may be inputted manually to the computer 16 using the input devices 14. Alternatively, the 3D electronic data generated by another CAD system may be transferred to the computer 16 via communication or a specified storage medium, such as a magnetic disk.

Pieces of information to be inputted as the 2D data include: 2D coordinate information of nodes n01 to n20 for specifying the shape of the respective wires forming the wiring harness on the assembling board; as shown in FIG. 3; wire link information on links of the nodes n01 and n20; and information on diameters r01 to r14 of the wires linking the nodes n01 to n20.

To enable realistic deformation of the wires of the wiring harness in a 3D design data deforming step to be described later, each wire 21 is divided along its longitudinal direction into a plurality of short wire segments 22 of length "a", as shown in FIG. 5, and as described above the length "a". Similarly, weight data, as described above, is also inputted.

The 3D shape of data of accessories, such as connectors 18 (see FIG. 3), clamps, and covering parts (such as protectors, vinyl tubes and corrugate tubes) to be mounted on the wiring harness are generated beforehand, and are assigned to corresponding sections of a wire path after a main part of the 3D design data of the wire path of the wiring harness is formed. In this way, the 3D design data is completed.

The assembling board used to assemble the wiring harness corresponding to the 3D design data also is designed using the wiring harness designing system.

In Step S209, an investigation is made on designing the wiring harness assembling board and an operation of assembling (laying) the wiring harness based on the 3D design data of the wiring harness generated in Step S208 and the assembling board data. The investigation results are fed to the client of Step S201 or the harness designing step of Step S204, and the wiring harness designing step is restudied and corrected.

Figure 59:
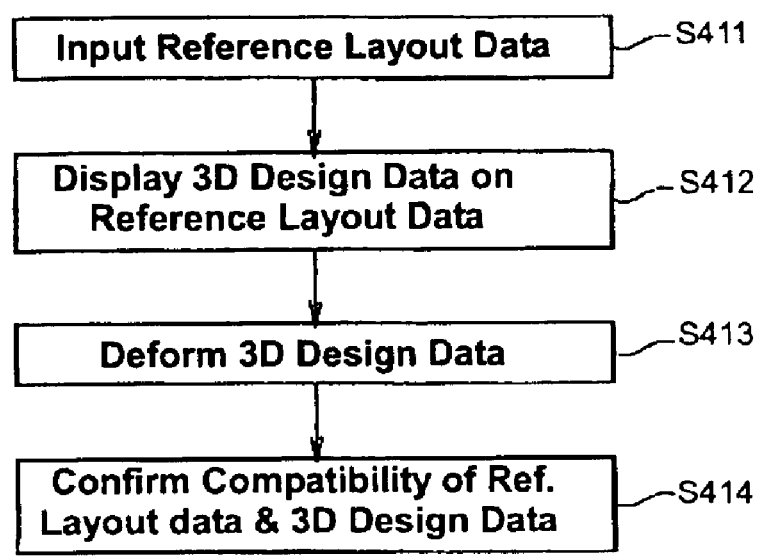
FIG. 59 is a flow chart showing a virtual layout process according to the wiring harness designing method of the preferred embodiment.

FIG. 59 is a flow chart showing a virtual harness laying operation according to the wiring harness designing method of this embodiment.

In Step S411, reference layout data are inputted to the computer 16. The reference layout data are 3D electronic data of a 3D layout of the wiring harness in a 3D space modeling the wire layout object. For example, the 3D layout of the wiring harness is designed beforehand for a wire layout object, such as an automotive vehicle or an electric appliance, based on, e.g. the mount positions of various parts in the wire layout object. Coordinate information on the shape of the wiring harness in the 3D space at that time and coordinate information of parts to be mounted on the wiring harness are generated into 3D electronic data as a 3D drawing using a design assisting software program, such as a CAD. The 3D electronic data are inputted to the computer 16 and stored in the storage device 15 (see FIG. 1). The CAD software program may be implemented on the computer 16 and the data on the shape of the wiring harness be input manually by the input devices 14. Alternatively, the 3D electronic data generated in another CAD system may be transferred to the computer 16 via communication or a specified storage medium, such as a magnetic disk.

In Step S202, the reference layout data inputted are plotted in a virtual 3D space to be displayed three-dimensionally on the display device 11. A virtual viewpoint can be changed in the virtual 3D space in accordance with an operation of the input device 14, such as the mouse 13.

This reference layout data represents a background image when the 3D design data are displayed. To distinguish this data from the 3D design data, the virtual 3D display of the wiring harness specified by the reference layout data is made, for example, in achromatic color.

The 3D design data generated in Step S208 then are displayed in the 3D space while being superimposed on the reference layout data.

Shape representation by the 3D design data, the individual wires 21 or the wire segments 22 of a plurality of wires are represented using cylindrical shapes as shown in FIGS. 4 and 5.

Specifically, as shown in FIG. 6, a vector S is defined for data of the wire segment 22. The vector S extends in a direction passing the center of a cylinder and has a length "a". The vector S can specify a single absolute position or a twisting degree by specifying direction information and length information in a 3D space defined by x-axis, y-axis and z-axis. Angle of rotation information from a reference point can be defined by a twist angle between this wire segment and the other wire segment adjacent thereto.

The data of the individual wire segments 22 are displayed connected with each other. Here, a method of continuous connection is, as shown in FIG. 7, such that the coordinates of end points of center axes 23a, 23b coincide in the case that wire segments 22a, 22b are to be connected.

The entire 3D design data is moved within the virtual 3D space using the input device 14, such as the mouse 13, to adjust an overall positional relationship between the 3D design data and the reference layout data. Step S412 is ended when the 3D design data is adjusted (positioned) to a position considered desirable by an operator.

In Step S413, the operator manually deforms the shape of the wire 21 represented by the 3D design data using the input device 14, such as the mouse 13, so that this shape coincides with the image of the reference layout data displayed as a background image.

It is possible to represent the flexibility of the wire segment 22 by data using a known 3D simulation system. However, such an operation is quite cumbersome, and the result may not reflect the operator's intention. Accordingly, in this wiring harness designing system, processing can be performed to enable the representation of a flexible characteristic as intended by the operator, which is similar to the processing described regarding the 3D virtual assembling system and method described with reference to FIG. 8.

Figure 9:
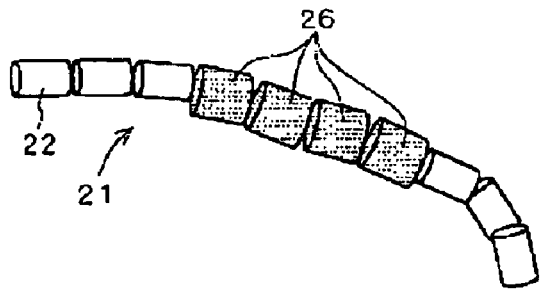
FIG. 9 is a diagram showing a state where covering part segments are used instead of the wire segments.

Often, the wiring harness is comprised of both wires 21 and covering parts (e.g. vinyl tubes, corrugate tubes, various taping, etc.) 26 mounted around the wires 21, as shown in FIG. 9. Accordingly, the shapes of the covering parts 26 need to be represented in association with the shape data of the wires 21.

As described above, in Step S413, the deformation results of the 3D design data of the wires 21 are displayed on the display device 11 while being superimposed on the image of the reference layout data displayed as a background image, and a degree of coincidence or a degree of discrepancy of the two images is confirmed visually.

In Step S414, the compatibility of the reference layout data and the deformed 3D design data is investigated based on the deformation result of the 3D design data and the displayed content in Step S413, and whether there is any problem in the wire harness laying operation virtually performed in Step S413 is investigated. The investigation results are fed back to the client of Step S201 and the harness designing step of Step S204, and the wiring harness designing step is restudied and corrected. For example, if loosening of an image of the 3D design data with respect to an image 28 of the reference layout data as a background image is considerably large, as shown in FIG. 12, it means that this wire is excessively long. Further, if a branch wire 29a of the 3D design data is drawn out from base wires 28, 29 in a direction opposite from the one in which a branch wire 28a of the reference layout data as a background image is drawn, as shown in FIG. 13, a design change is made to change a forming direction of the branch wire 29a with respect to the base wire 29. Other problems including excessively short wires and excessive twists can be confirmed easily using the display result or content on the display device 11.

In the wiring harness designing method of this embodiment a plurality of 3D design data having a common data configuration and different 3D shapes are generated by three-dimensionally deforming the basic 3D design data of the wiring harness to be displayed in the virtual 3D space on the display device and stored in the storage device 15 while being formed into the database. Any of the stored 3D design data are selected and displayed in the virtual 3D space via the display device 11.

Figure 60:
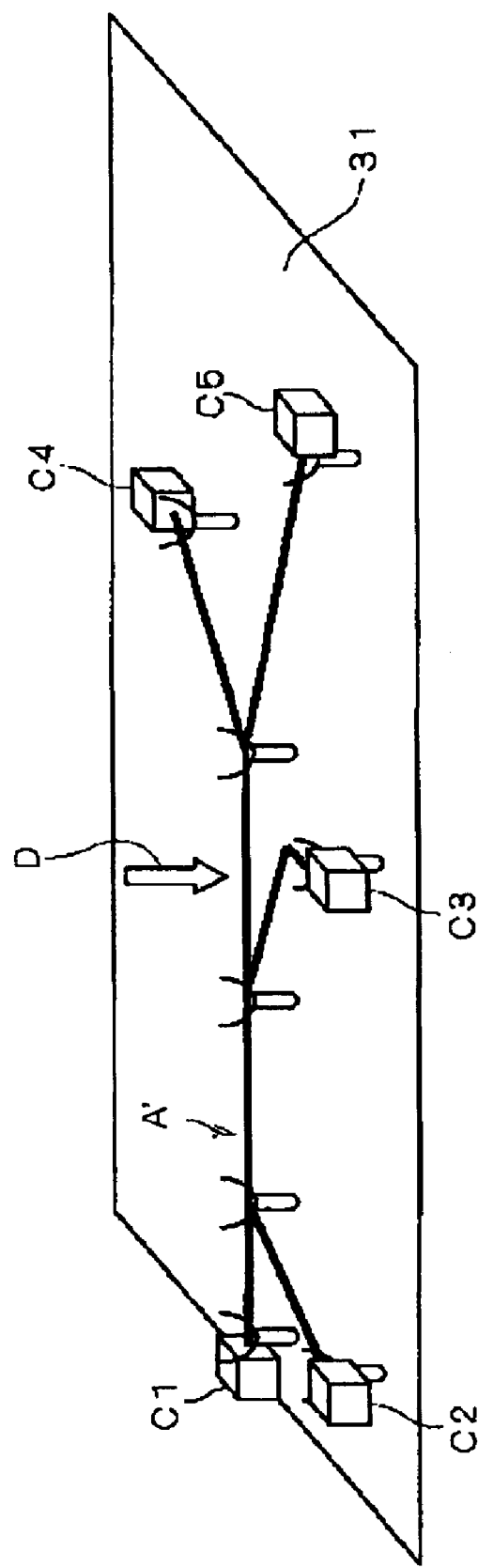
FIG. 60 is a diagram showing a 3D design data of a display mode developed in a plane.

Specifically, the basic 3D design data A' (see FIG. 60) of the wiring harness generated in Step S208 corresponds to a layout of the wiring harness, including connectors C1 to C5, on the assembling board (including the jigs), and is used to attain various improvements for better productivity and quality of the wiring harness at the production of the wiring harness and to verify, for example, whether the assembling operation holds. Thus, as shown in FIG. 60, the 3D design data A' generated in Step S208 has a form developed in a plane in the virtual 3D space. Although the 3D design data A' is displayed while being superimposed on an assembly board 31 in an example of FIG. 60, the display of the assembling board can be deleted.

Figure 61:
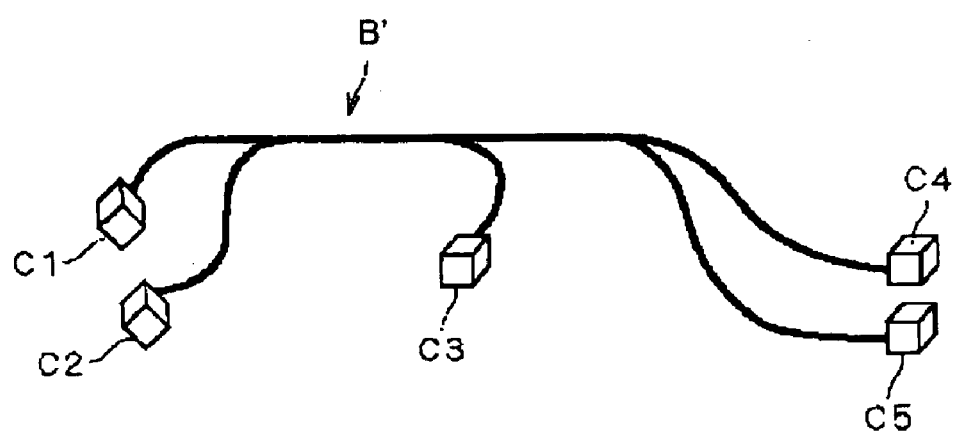
FIG. 61 is a diagram showing a 3D design data of a display mode corresponding to a layout in a vehicle body.
Figure 62:
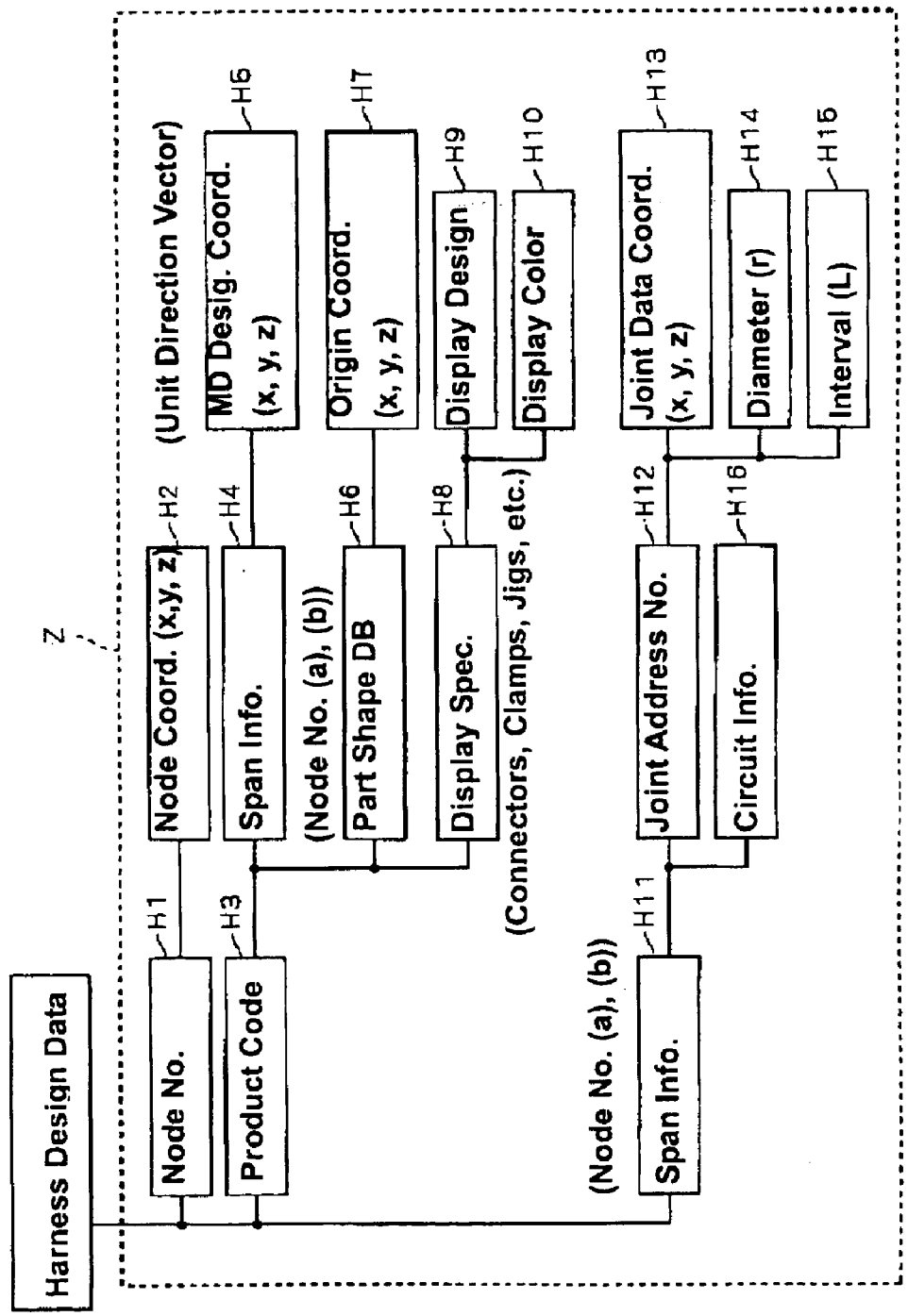
FIG. 62 is a diagram of a data configuration of the 3D design data.

On the other hand, 3D design data B' (see FIG. 61) correspond to a layout in a vehicle body and are generated by three-dimensionally deforming the basic 3D design data A' to follow the layout path of the reference layout data for verifying, for example, the mounted state of the wiring harness.

These 3D design data A', B' have a common data configuration Z with a data compatibility, for example, as shown in FIG. 52, are related to each other and stored in the storage device 15 while being formed into a database. The contents of the data configuration Z is described above in the previous discussion of FIG. 52, and for simplicity, is not repeated here.

At least one 3D design data E' having intermediate shapes (see FIGS. 63(a) to 63(c)) created during a shape transitioning process of generating the 3D design data B' by deforming the 3D design data A' in Step S413 are stored in the storage device 15 as process shape data representing the shape transitioning process according to an instruction inputted by the designer via the input device 14. These 3D design data of intermediate shapes have the data configuration Z common to the 3D design data A', B' and stored in the storage device 15 while being formed into a database.

Figures 63, 64:
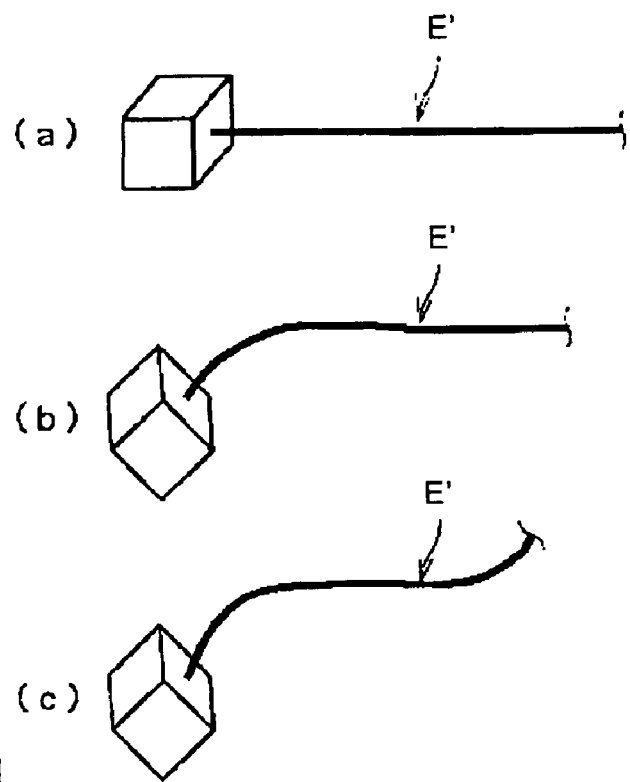
FIG. 64 is a table showing a stored format of the 3D design data when being stored as a database.

The 3D design data A', B', E' are formed into data files Z1, Z2, . . . for each data, as shown in FIG. 64, and are stored in the storage device 15 with identification data (here, identification numbers of, e.g. No. 1, No. 2, . . . ) affixed thereto. Since the respective 3D design data B', E' are generated by three-dimensionally deforming the basic 3D design data A', the data items H1 to H16 of the data configuration Z that have different data contents among the respective 3D design data A', B', E' are only those concerning the wire segments 22, the display positions of the parts and the like (coordinates) and the directions (e.g. H2, H5, H7, H13) in the virtual 3D space.

If the identification numbers corresponding to the 3D design data A', B', E' to be displayed on the display device 11 are inputted via the input device 14, the 3D design data A', B', E' corresponding thereto are read from the storage device 15 and are displayed in the virtual 3D space via the display device 11. Thus, contents of the design can be investigated while easily switching the 3D design data A', B', E' displayed on the display device 11 from one to another by inputting the identification numbers corresponding to the desired 3D design data A', B', E'.

Further, the basic 3D design data A', at least one 3D design data E' having an intermediate shape, and the 3D design data B' representing the layout in the vehicle body are switched and displayed successively in the virtual 3D space via the display device 11 in an order corresponding to the shape transitioning process by inputting a specified instruction via the input device 14. A switching timing of the displays of the 3D design data A', B', E' can be adjusted by an instruction inputted via the input device 14.

Here, a method for setting the display positions when the 3D design data A', B', E' are displayed on the display device 11 is described. For example, in the case of the 3D design data A', a position indicated by an arrow D in FIG. 60 is determined as data origin coordinates, and the 3D design data A' is displayed to be at a specified reference position (for example, center position) in the virtual 3D space. Thus, the coordinate positions of the sections of the 3D design data A' are specified by relative coordinates with respect to the data origin coordinates as a reference point. Similarly, the data origin coordinates are set and the data is constructed and displayed with respect to the set data original coordinates in the case of the 3D design data B' as well.

Further, if any one of the 3D design data A', B', E' is changed e.g. by an instruction inputted via the input device 14, a content of the change is automatically reflected on the others of the plurality of 3D design data related to the changed 3D design data by the processing of the computer main body 16.

For example, the length of a section of the 3D design data A' may be changed by an instruction inputted via the input device 14. In this situation, the lengths of corresponding sections of the other 3D design data B', E' are changed automatically by the computer main body 16 according to an amount of the change in the length made in the 3D design data A'. Similarly, the accessory data of the connectors, covering parts (such as protectors), clamps and the like attached to the 3D design data A' may be changed. These changes may include changing the type of the accessories, moving the set positions of the accessories, adding and deleting accessories, etc. based on an instruction inputted via the input device 14. In this situation, a content of the change is reflected automatically on the other 3D design data B', E'.

As described above, a plurality of 3D design data B', E' of different 3D shapes generated by deforming one kind of 3D design data A' of the wiring harness in the virtual 3D space are stored together with the 3D design data A' in the storage device 15 while being formed into the database. Any one of the 3D design data A', B', E' is selected and displayed in the virtual 3D space via the display device 11. Thus, the 3D design data A', B', E' displayed in the virtual 3D space can be switched easily to the other 3D design data A', B', E'. Therefore, the contents of the design can be inspected while switching the 3D design data A', B', E' displayed in the virtual 3D space, thereby making the wiring harness designing operation more efficient.

The basic 3D design data A' developed in a plane is used to attain various improvements for better productivity and quality of the wiring harness at the production of the wiring harness and to verify, for example, whether the assembling operation holds, and the 3D design data B' representing the layout in the vehicle body is used to inspect the layout of the wiring harness in the vehicle body. Thus, the designing operation can be made even more efficient by making verifications and inspections while switching the 3D design data displayed in the virtual 3D space between the basic 3D design data A and the 3D design data B' representing the layout in the vehicle body.

If any of the related and stored 3D design data A', B', E' are changed by an instruction inputted via the input device 14, a content of the change made in the changed 3D design data is reflected automatically on the others of the 3D design data A', B', E' related to the changed 3D design data. Thus, the related 3D design data A', B', E' can be changed easily and at once. Therefore, the effect of a change in one of the 3D design data A', B', E' on the other of the 3D design data A', B', E' can be confirmed easily by switching the 3D design data A', B', E' displayed on the display device 11, and the contents of the designs of the 3D design data A', B', E' can be changed and investigated more efficiently.

Related 3D design data A', B', E' have common data configurations. Thus, if the designer changes any one of them, corresponding sections of the others can be changed automatically, and data administration, such as renewal of data and deletion can be performed easily.

Further, the 3D design data B', E' generated during the shape transitioning process of the 3D design data A' are switched and displayed successively in the virtual 3D space via the display means in the order corresponding to the shape transitioning process. Thus, an operation of laying the wiring harness in the vehicle body can be inspected and demonstrated by means of the 3D design data A', B', E' switched and displayed in this order.

Furthermore, the main part of each 3D design data A', B', E' corresponding to the wire path is formed by connecting a plurality of wire segments 22 along the wire path. Thus, the length of a specific section of the main part or the wire path can be changed easily by increasing or decreasing the number of joints in this specific section or increasing or decreasing the length of the joints in this section, and a deformation characteristic of real wires can be represented realistically.

Accordingly, a plurality of 3D design data of different 3D shapes generated by three-dimensionally deforming one kind of 3D design data of the wiring harness in the virtual 3D space are stored in the storage means while being formed into the database, and any one of the plurality of 3D design data is selected and displayed in the virtual 3D space via the display means. Thus, the 3D design data displayed in the virtual 3D space can be switched easily to the other 3D design data. Therefore, the contents of the design can be inspected while switching the 3D design data displayed in the virtual 3D space, thereby making the wiring harness designing operation more efficient.

Further, if any of the related 3D design data that have been stored is changed by an instruction inputted via the input means, the content of the change is reflected automatically on the other related 3D design data. Therefore, the effect of a change made in one of the 3D design data on the other 3D design data can be confirmed easily by switching the 3D design data displayed on the display means, and the contents of the designs of the 3D design data can be changed and investigated more efficiently.

Further, the related 3D design data have common data configurations. Thus, if the designer changes any one of them, corresponding sections of the others are changed automatically, and data administration, such as renewal of data (including corrections) and deletion, can be performed easily.

Moreover, the basic 3D design data developed in a plane is used to attain various improvements for better productivity and quality of the wiring harness during production and to verify, for example, whether the assembling operation holds. Also, the 3D design data representing the layout in the vehicle body is used to inspect the layout of the wiring harness in the vehicle body. Thus, the designing operation can be made even more efficient by making verifications and inspections while switching the 3D design data displayed in the virtual 3D space between the basic 3D design data and the 3D design data representing the layout in the vehicle body.

The plurality of 3D design data generated during the shape transitioning process of the 3D design data are switched and displayed successively in the virtual 3D space via the display means in the order corresponding to the shape transitioning process. Thus, an operation of laying the wiring harness in the vehicle body can be inspected and demonstrated by the 3D design data switched and displayed in this order.

Still further, the main part of the 3D design data corresponding to the wire path is formed by connecting joints along the wire path. Thus, the length of a specific section of the main part or the wire path can be changed easily by increasing or decreasing the number of the joints in this section or increasing or decreasing the length of the joints in this section.

The wiring harness designing method of the invention also enables the accessory mounting operation to be investigated before the wiring harness is actually produced, as shown in FIGS. 65 to 76. Thus, accessories (covering parts such as protectors and covering tubes, electrical connection means such as electrical connection boxes, etc.) can be mounted virtually on the wiring harness in the virtual 3D space by using the harness design data A", the accessory data F of the accessories, and the contents of the designs of the wiring harness and the accessories.

Figure 65:
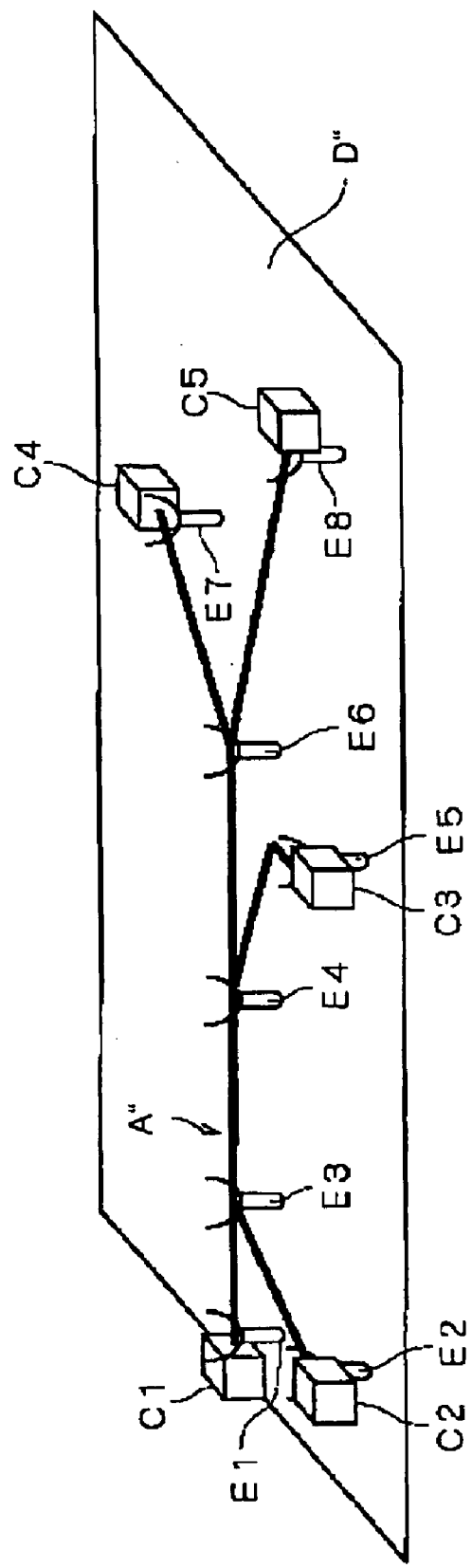
FIG. 65 is a perspective view of a harness design data according to a further preferred embodiment developed in a plane.

First, as a preparatory step, the harness design data A", as shown in FIG. 65, is generated as described above with reference to FIGS. 1 to 13 and 58 to 64. These data A" are developed using the wiring harness designing system or method or the harness design data A" (similar to the previously described harness design data A or basic 3D design data A') generated in another system and need to be transferred to the wiring harness designing system. The 3D design data F of the accessories (see FIG. 66) to be mounted on the wiring harness needs to be generated using the wiring harness designing system or needs to be transferred to the wiring harness designing system. Here, a virtual protector mounting process is described. In FIG. 65, identified by C1 to C5 are connector data, which are 3D design data of the connectors.

Figure 67:
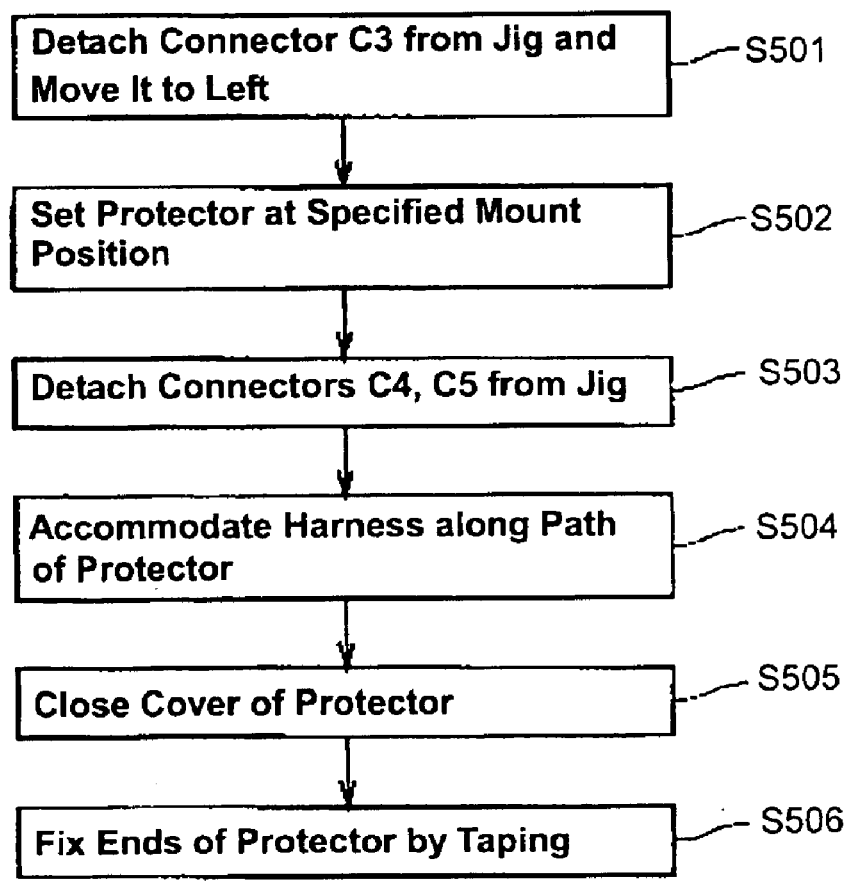
FIG. 67 is a flow chart showing a process of virtually mounting a protector on a wiring harness.
Figure 68:
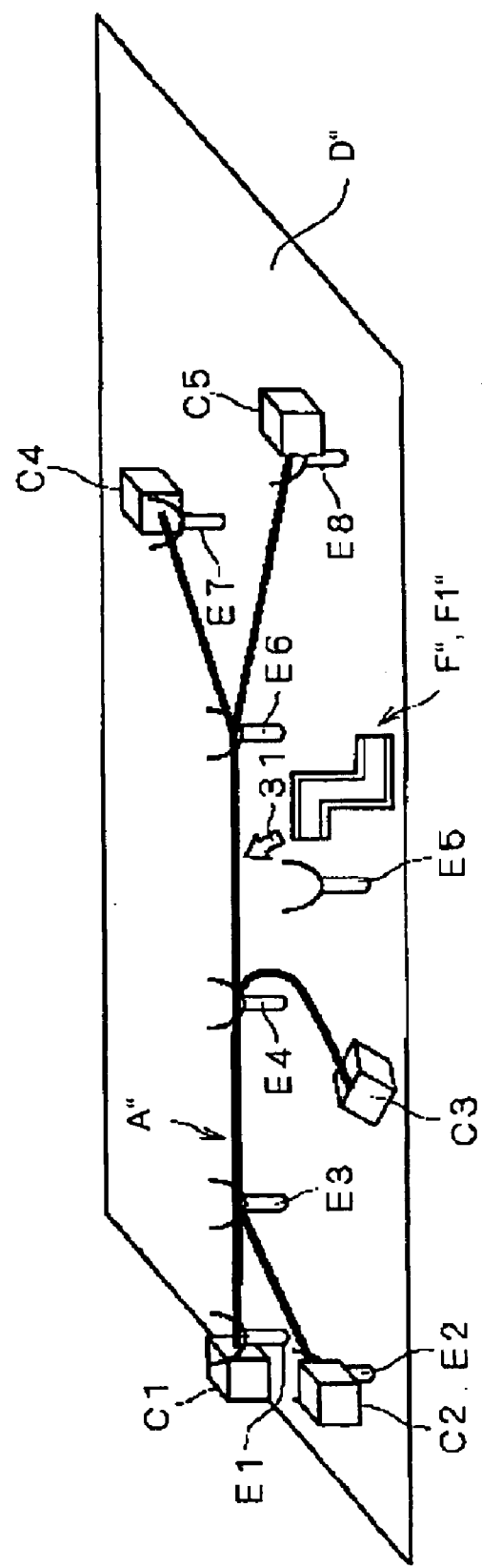
FIG. 68 is a perspective view showing the process of virtually mounting the protector on the wiring harness.

FIG. 67 is a flow chart showing a process of virtually mounting a protector on a wiring harness. First, in Step S501 of FIG. 67, by inputting an instruction to the computer main body 16 via the input device 14, the computer 16 is caused to display the harness design data A" set on the board design data D and accessory data F1 of the protector in the virtual 3D space of the display device 11 as shown in FIG. 68. The connector data C3 are detached from an assisting jig data E5 to move a section of the harness design data A" that hinders the mounting of the protector. The connector data C3 also are moved leftward in FIG. 68 and away from a portion where the protector is to be mounted. Here, the 3D deformation of the harness design data A' (which can be performed with a system or method as described above) and the movement of the accessory data F1 are made by dragging the mouse 13.

Figure 69:
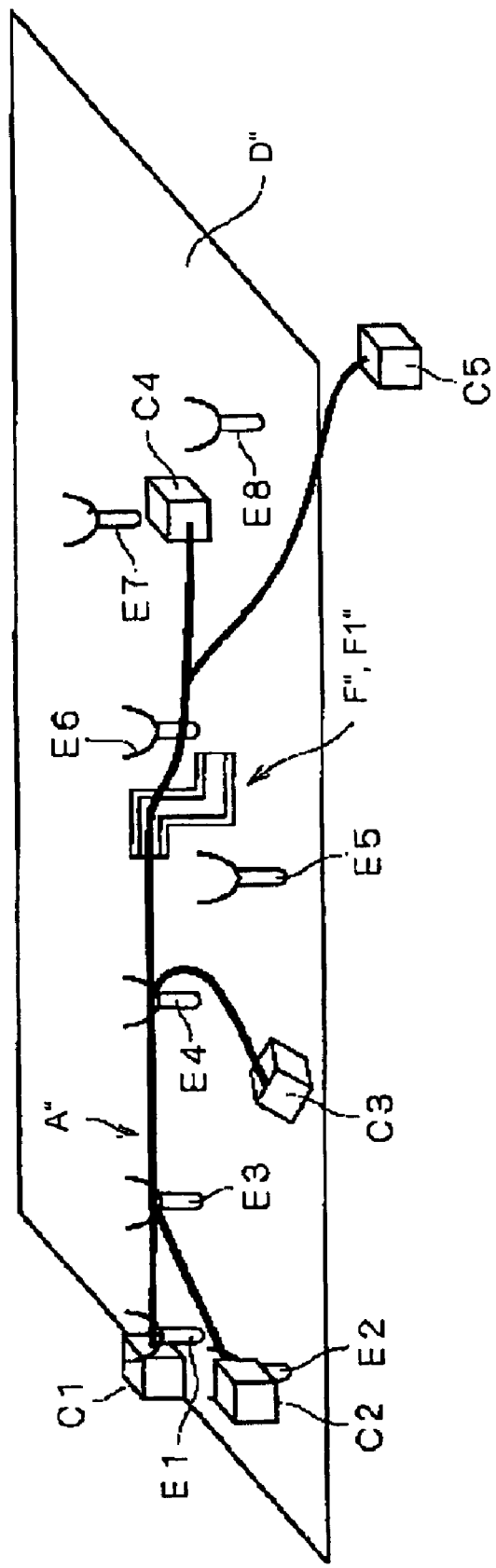
FIG. 69 is a perspective view showing the process of virtually mounting the protector on the wiring harness.

In Step S502, an instruction is inputted via the input device 14 to move the accessory data F1 toward the harness design data A", as shown by arrow 31 in FIG. 68, and set it at a mount position on the harness design data A", as shown in FIG. 69.

In Step S503, an instruction is inputted via the input device 14 to detach the connector data C3, C5 from assisting jig data E7, E8, as shown in FIG. 69.

Figure 70:
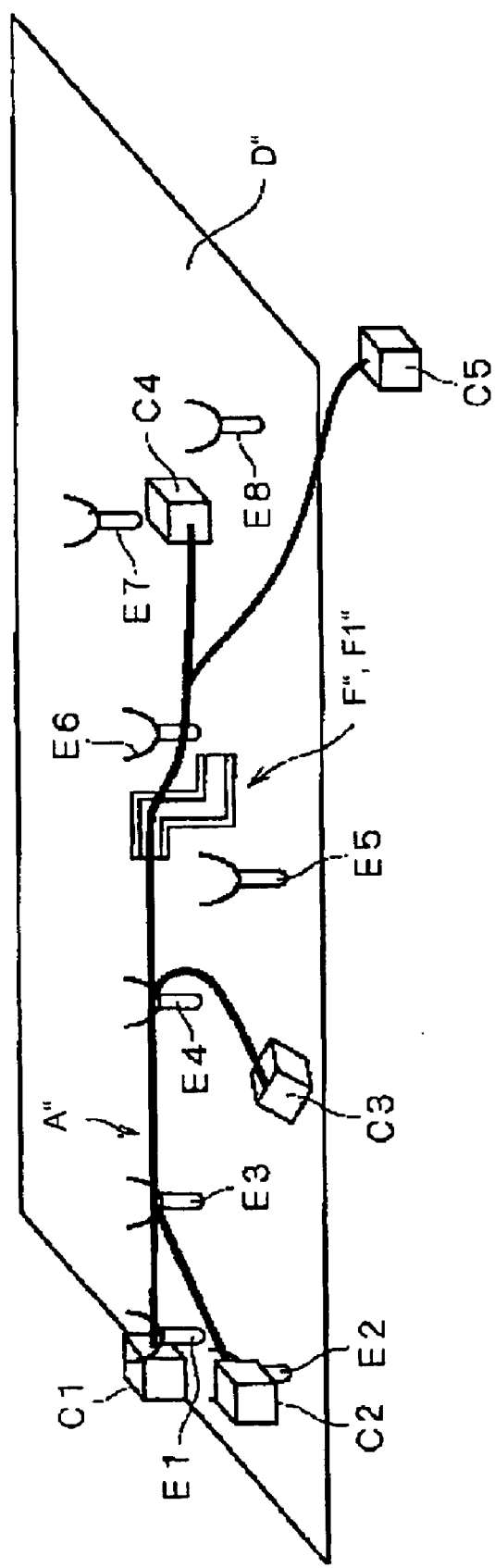
FIG. 70 is a perspective view showing the process of virtually mounting the protector on the wiring harness.
Figure 71:
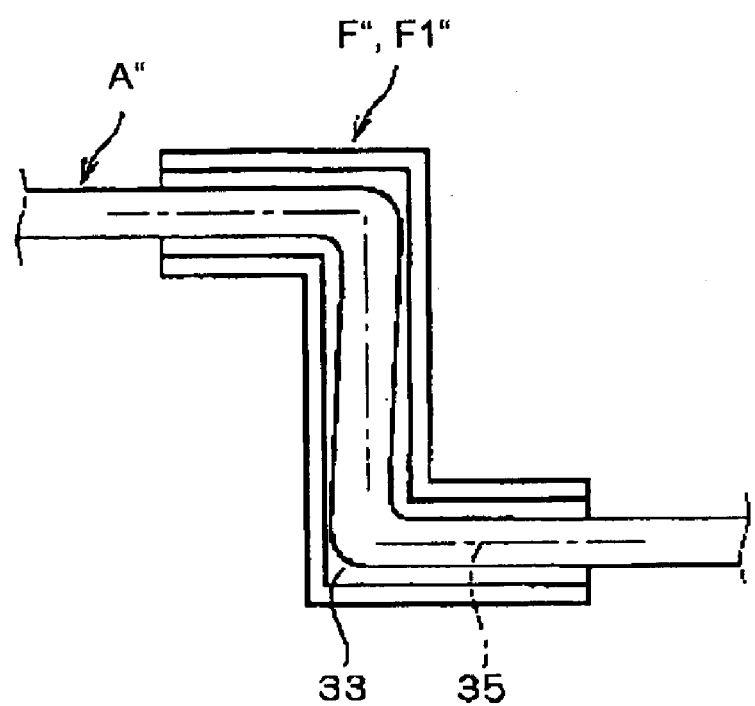
FIG. 71 is a diagram showing the process of virtually mounting the protector on the wiring harness.
Figure 72:
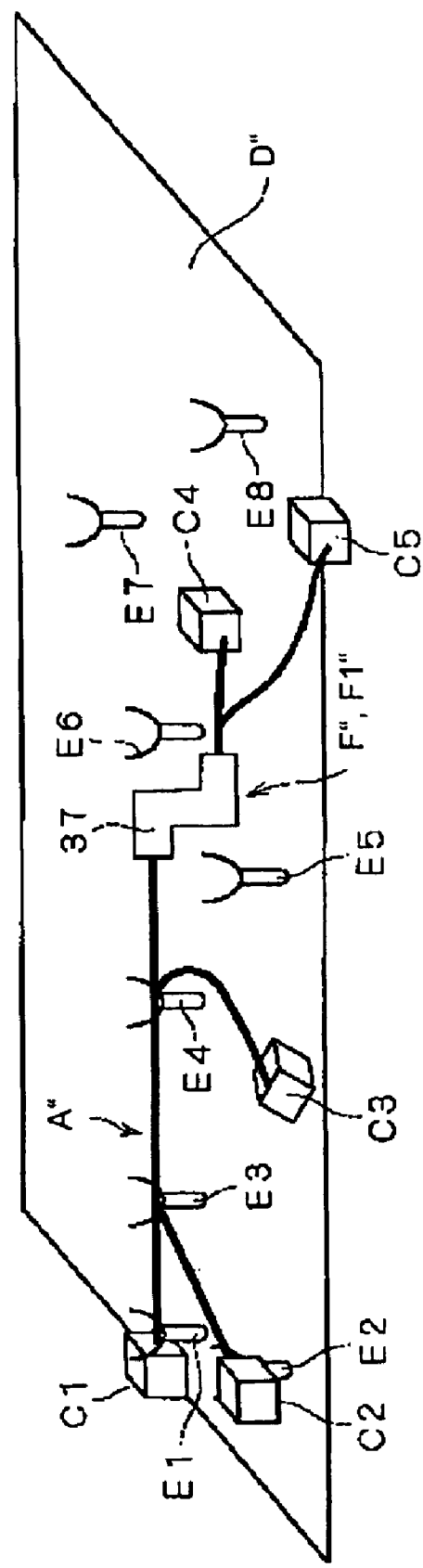
FIG. 72 is a perspective view showing the process of virtually mounting the protector on the wiring harness.

In Step S504, an instruction is inputted via the input device 14 to three-dimensionally deform the wire path at a protector mount of the harness design data A" and to accommodate the protector mount of the harness design data A" in a wire accommodating portion of the accessory data F1, as shown in FIGS. 70 and 71. At this time, the harness design data A" is accommodated such that a center line of the wire overlaps a center line 35 of the accessory data F1, as shown in FIG. 71.

Figure 73:
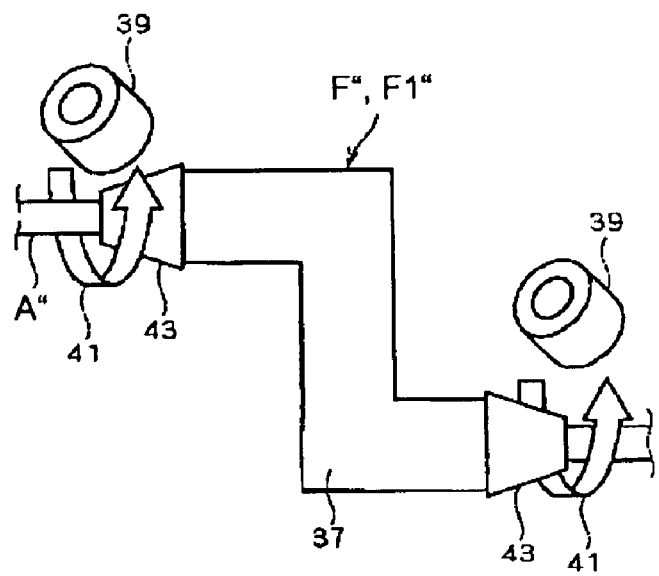
FIG. 73 is a diagram showing the process of virtually mounting the protector on the wiring harness.

In Step S505, an instruction is inputted via the input device 14 to close a cover 37 of the accessory data F1 as shown in FIG. 73.

In Step S506, an instruction is inputted via the input device 14 to perform virtual taping to fix the protector. This virtual taping is performed by generating tape roll data 39 (see FIG. 73) representing a 3D shape of a tape roll beforehand, displaying the tape roll data 39 in the virtual 3D space as shown in FIG. 73, and turning the displayed tape roll data 39 around portions of the harness design data A" where taping should be done, as shown by arrows 41. In this way, a problem in a taping step (e.g. any contact with an obstacle while the tape roll is turned) can be investigated. As this virtual taping is done, a taping data 43 corresponding to a taped portion is attached to each of the opposite ends of the protector mount of the harness design data A", whereupon the virtual protector mounting process is completed.

The virtual protector mounting process enables investigations on the contents of the designs of the wiring harness and the protector, the protector mounting operation and the like. The virtual mounting process may show that a portion of the harness design data A" to be accommodated in the accessory data F1 of the protector bulges out. Thus, this bulging-out portion may be marked for use when the contents of the designs are investigated again.

Further, harness design data A" and accessory data F1 having different forms in the respective scenes of the mounting process of attaching the accessory data F1 to the harness design data A" as described above are stored scene by scene in the storage device 15, so that the harness design data A" and the accessory data F1 of each scene can be outputted for reproduction via the display device 11. Such an output for reproduction is made in response to an instruction inputted via the input device 14. The stored harness design data A" and the accessory data F1 of the respective scenes are switched and displayed successively in the virtual 3D space in an order conforming to the process of attaching the accessory data F1.

The designer decides which scenes of the harness design data A" and the accessory data F1 are stored by inputting an instruction via the input device 14. For example, the harness design data A" and the accessory data F1 of the scenes shown in FIGS. 68 to 73 are stored. A display switching timing during the output for reproduction of the harness design data A" and the accessory data F1 of the respective scenes can be set and changed by an instruction inputted via the input device 14.

The computer 16 detects an interference of the accessory data F1 with a pre-registered structure data (e.g. the assisting jig data E), which can be an obstacle to the attachment of the accessory data F1 in the virtual protector mounting process. The computer 16 outputs a notification upon detecting such interference. The object that interferes in the virtual 3D space is detected automatically based on an instruction inputted via the input device 14. For example, interference of the accessory data F1 of the protector 33 and the jig data E and interference of the tape roll data 39 and the jig data E are detected and notified by the computer 16.

The detection of an interference may initiate a display output via the display device 11 and/or a sound output via an unillustrated loudspeaker. For example, at least some of the display colors on the screen may be changed temporarily or a message may be displayed to indicate an interference.

Figure 74:
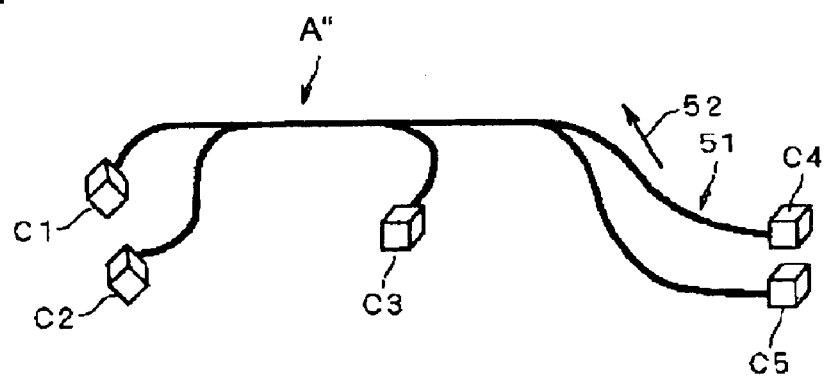
FIG. 74 is a diagram showing the harness design data of a form to be laid in a vehicle body.

Further, the computer 16 can set constraint points fixed at positions on the harness design data A" in the virtual 3D space upon an instruction inputted via the input device 14. For example, as shown in FIG. 74, points (e.g. connectors C1 to C5 and fixing portions realized by clamps) of the harness design data A" to be fixed to or connected with the vehicle body are set as constraint points.

Figure 75:
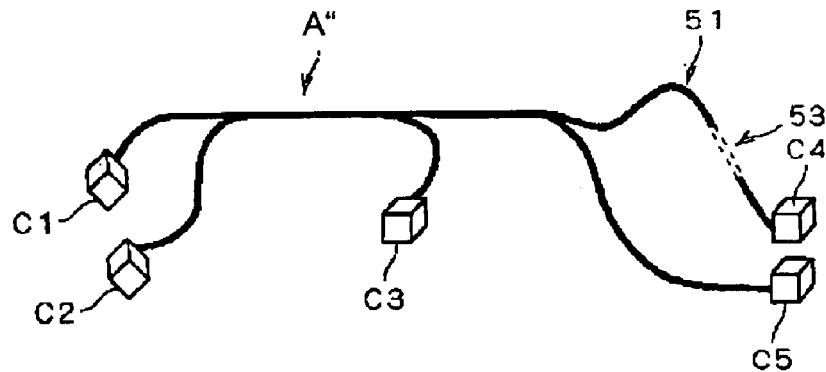
FIG. 75 is a diagram showing the harness design data of another form to be laid in a vehicle body.
Figure 76:
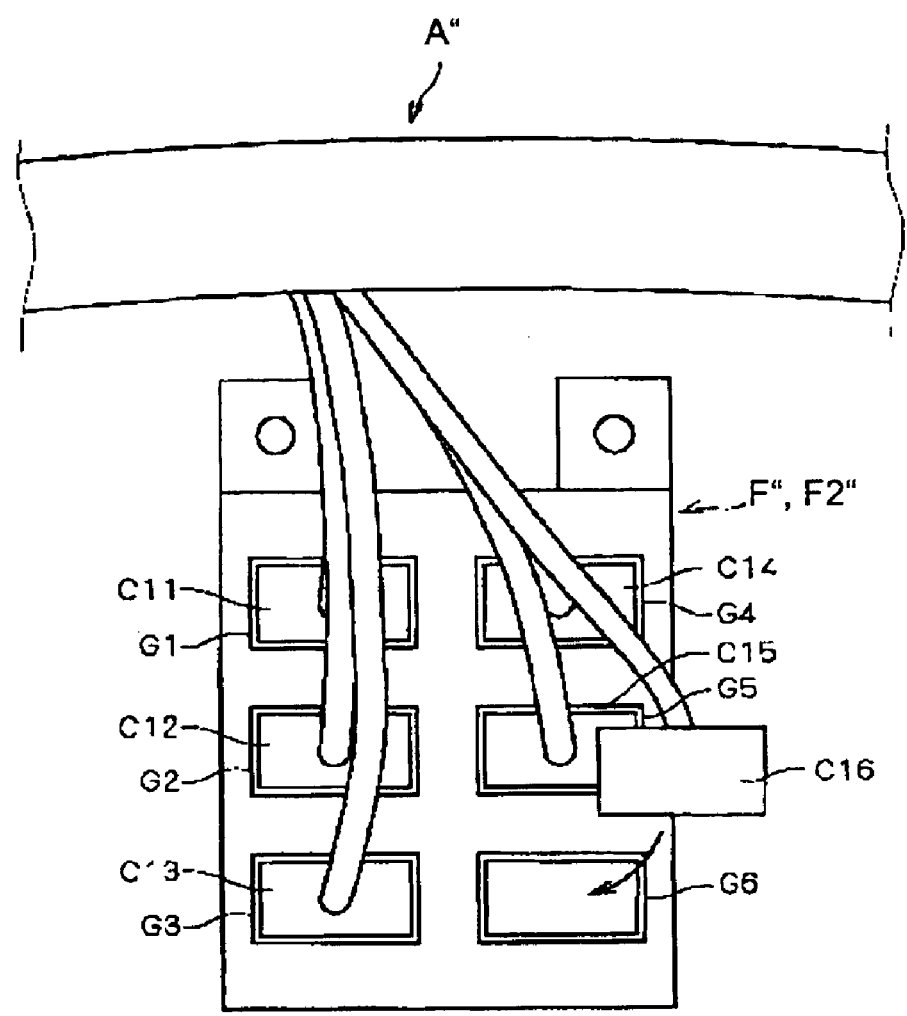
FIG. 76 is a diagram showing a process of virtually connecting the wiring harness and an electrical connection box.

A section (e.g. section 51 in FIG. 74) of the harness design data A" may be moved in the virtual 3D space such that a distance between this section 51 and a constraint point (e.g. connector C4) in the virtual 3D space becomes longer the wire along the wire path between the section 51 and the constraint point C4 (e.g. moved in a direction indicated by an arrow 52 in FIG. 74) in response to an instruction inputted to the computer main body 16 via the input device 14. Thus, the computer 16 creates a lacking portion 53 in the wire path between the section 51 and the constraint point C4 and displays an image representing the lacking portion 53 (here, the wire path corresponding to the lacking portion is displayed in phantom line) via the display device 11, as shown in FIG. 75.

Further, if the length of the wire path between the constraint points (e.g. connector C1 and connector C4) of the harness design data A" in the virtual 3D space is changed to be shorter than a distance between these two constraint points in the virtual 3D space in response to an instruction inputted to the computer 16 via the input device 14, the computer 16 also creates a lacking portion 53 in the wire path between the two constraint points and display an image representing the lacking portion via the display device 11.

Although the process of virtually mounting the protector on the wiring harness is described above, the wiring harness designing method according to this embodiment may be applied to a process of virtually mounting another accessory. For example, connection of the wiring harness and an electrical connection box may be simulated. In such a case, electrical connection box accessory data F2 (see FIG. 76) is generated and stored in the storage device 15 beforehand. During the simulation, the computer 16 reads the accessory data F1 from the storage device 15, displays the accessory data F2 and the harness design data A" in the virtual 3D space of the display device 11 and connects the accessory data F2 and the harness design data A" in response to an instruction inputted via the input device 14.

Figure 66:
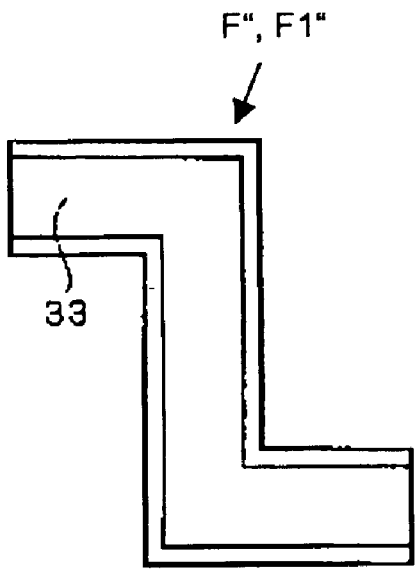
FIG. 66 is a diagram showing an accessory data of a protector.

Connection is made, for example as shown in FIG. 66, by locating the harness design data A" and the accessory data F2 at specified positions in the virtual 3D space where these data can be connected, and successively moving the connector data (here, connector data C11 to C16) of the harness design data A" to be inserted into corresponding connecting portions G1 to G6 of the accessory data F2 by dragging with the mouse 13.

As described above, according to this embodiment, the process of mounting accessories on the wiring harness can be simulated in the virtual 3D space using the harness design data A" of the wiring harness and the accessory data F of the accessories (covering parts such as protectors and covering tubes, electrical connection means such as electrical connection boxes, etc.), and the simulation result can be reflected immediately on the contents of the design of the wiring harness. As a result, the wiring harness designing operation and the like can be made more efficient.

Plural harness design data A" and accessory data F of different forms in the respective scenes of the process of attaching the accessory data F to the harness design data A" in the virtual 3D space are displayed successively on the display device 11 in the order conforming to the attaching process. Thus, an operation of mounting the accessories on the wiring harness can be inspected and demonstrated by the harness design data A" and the accessory data F displayed at the respective stages of the attaching process in this order.

Interference between the accessory data F and the structure data (such as the assisting jig data E) that becomes an obstacle when the accessory data F is attached to the harness design data A" in the virtual 3D space is detected automatically by the wiring harness designing system. Thus, obstacles that hinder the mounting of the accessories on the wiring harness can be found out by the simulation and can be dealt with easily in advance.

If a section of the harness design data A" is moved in the virtual 3D space such that the distance between this section and the constraint point of the harness design data A" in the virtual 3D space becomes longer than the length of the wire path between this section and the constraint point, the insufficient length is image-displayed as a notification. Thus, sections of the harness design data A" with insufficient lengths can be detected automatically.

If the length of the wire path between the constraint points of the harness design data A" in the virtual 3D space is changed to be shorter than the distance between the constraint points in the virtual 3D space, the lacking portion representing an insufficient length of the wire path between these constraint points is image-displayed as a notification. Thus, the sections of the harness design data A" having insufficient lengths can be confirmed confirmed.

A main part of the harness design data A" representing the wire path is formed by connecting wire segments (joints) 22 along the wire path. Thus, the curved shape and the curving characteristic of the wires can be represented realistically. Accordingly, the process of mounting the accessories on the wiring harness can be simulated in the virtual 3D space of the computer using the harness design data of the wiring harness and the accessory data of the accessories, and the simulation result can be reflected immediately on the contents of the design of the wiring harness. As a result, the operation of designing the wiring harness can be made more efficient.

Further, the process of mounting the covering parts on the wiring harness can be simulated easily in the computer.

Moreover, the process of connecting the electrical connection means with the wiring harness can be simulated easily in the computer.

Still further, harness design data and accessory data of different forms are created during the process of attaching the accessory data to the harness design data in the virtual 3D space and are displayed successively on the display device in the order conforming to the attaching process. Thus, the mounting of the accessories on the wiring harness can be inspected and demonstrated by the harness design data and the accessory data displayed at the respective stages of the attaching process.

Interference between the accessory data and the structure data is attached to the harness design data in the virtual 3D space, and can be detected automatically. Thus, obstacles that hinder the mounting of the accessories on the wiring harness can be found out by the simulation and can be dealt with in advance.

Moreover, if the section of the harness design data is moved in the virtual 3D space such that the distance between this section and the constraint point of the harness design data in the virtual 3D space becomes longer than the length of the wire path between this section and the constraint point, the lacking portion representing an insufficient length of the wire path between that section and the constraint point is image-displayed. Thus, the sections of the harness design data having insufficient lengths can be easily confirmed.

Furthermore, if the length of the wire path between the constraint points of the harness design data in the virtual 3D space is changed to be shorter than the distance between the constraint points in the virtual 3D space, the lacking portion representing an insufficient length of the wire path between these constraint points is image-displayed as a notification. Thus, the sections of the harness design data having insufficient lengths can be confirmed easily.

What is claimed is:

1. A 3D virtual assembling method for virtually assembling a wiring harness on a wiring harness assembling board, so that the wiring harness can be transferred from the assembling board for installation in an automotive vehicle or apparatus, comprising:

a data inputting step inputting reference layout data representing a 3D layout of the wiring harness in an automotive vehicle or apparatus, and inputting 3D design data representing a 3D layout of a wiring harness on the wiring harness assembling board;

a reference layout data image displaying step of displaying on a display an image represented by the reference layout data as a background image in a virtual 3D space;

a 3D design data displaying step of displaying the 3D design data superimposed on the background image; and a 3D design data changing step of changing the display of the wiring harness represented by the 3D design data according to input made by a data input means.

2. The 3D virtual assembling method of claim 1, wherein the 3D design data are generated by adding coordinates of a normal direction to a primary plane of the assembling board used during the production of the wiring harness to 2D data which is a 2D representation along the primary plane.

3. The 3D virtual assembling method of claim 1, further comprising dividing the 3D design data into a plurality of wire segments and developing vector information on coordinates of the respective wire segments.

4. The 3D virtual assembling method of claim 3, wherein the 3D design data changing step comprises changing the vector information of each concerned wire segment assuming that center axes of adjacent wire segments are substantially continuous.

5. The 3D virtual assembling method of claim 4, further comprising giving to each wire segment data on phase differences of the adjacent wire segments.

6. The 3D virtual assembling method of claim 5, further comprising virtually drawing a straight surface line substantially parallel with a center axis on an outer surface of the wiring harness before changing the shape of the wiring harness, and displaying the surface line on the display means while being twisted according to a twist angle of the wiring harness caused by the data changing step.

7. The 3D virtual assembling method of claim 5, wherein, the data inputting step comprises inputting 3D design data of at least one covering part, and using the 3D design data of the covering part for each of the corresponding wire segments covered by the covering part instead of the 3D design data of the wire segments.

8. A 3D virtual assembling method for use in designing a wiring harness assembling board, comprising providing an input means for receiving an input;

at least temporarily storing 3D harness design data of at least part of the wiring harness in a storage means;

storing board design data which is a 3D design data of an assembling board corresponding to the harness design data in the storage means, displaying the harness design data and the board design data stored in the storage means in the virtual 3D space on a display means so that the harness design data is set on the board design data;

changing the harness design data by an input made via the input means;

correcting at least one section of the harness design data and at least one section of the board design data related to a content of the change; and reflecting a correction result on display contents of the display means and stored contents of the storage means.

9. The method of claim 8, wherein the step of storing board design data includes storing jig data corresponding to jigs for holding the wiring harness on the assembling board, and in response to the step of changing the harness design data, the method comprises moving the coordinates in the virtual 3D space of an end section of the harness design data located more toward a corresponding end than the changed section when viewed from a reference portion as a reference of the harness design data and the coordinates of the jig data included in the board design data and corresponding to the end section of the harness design data according to an amount of the change in the section.

10. A wiring harness designing method for designing a wiring harness using a wiring harness designing system provided with an input means, a storage means and a display means, comprising the steps of:

at least temporarily storing in the storage means basic 3D design data representing a plane in virtual 3D space and conforming to a form of the wiring harness set on an assembly board and at least temporally storing in the storage means lay out 3D design data representing a lay out of the wiring harness in a vehicle body:

selecting one of the plurality of 3D design data stored in the storage means by an instruction inputted via the input means and displaying the selected 3D design data in the virtual 3D space via the display means;

changing one of the plurality of 3D design data stored in the storage means by an instruction inputted via the input means; and reflecting a content of the chance made in the changed 3D design data on the other 3D design data related to the changed 3D design data.

11. The wiring harness designing method of claim 10, wherein the step of storing the plurality of 3D design data stored in the storage means further includes storing at least one 3D design data of an intermediate shape created during a shape transitioning process when the 3D design data representing the layout in the vehicle body are generated by deforming the basic 3D design data, and successively switching and displaying the basic 3D design data, the at least one 3D data of the intermediate shape and the 3D design data representing the layout in the vehicle body in the virtual 3D space via the display means in an order corresponding to the shape transitioning process.

12. The wiring harness designing method of claim 11, wherein part of the 3D design data (A') representing a wire path is formed by connecting a plurality of joints along the wire path.

* * * * *